United States Patent
Stratton et al.

(10) Patent No.: US 10,913,621 B2
(45) Date of Patent: Feb. 9, 2021

(54) TRANSFORMABLE TRAY AND TRAY SYSTEM FOR RECEIVING, TRANSPORTING AND UNLOADING ITEMS

(71) Applicant: United States Postal Service, Washington, DC (US)

(72) Inventors: Christopher M. Stratton, Springfield, VA (US); Gregory J. Smith, Arlington, VA (US); Thomas C. Potter, Oak Hill, VA (US); Wayne R. Perry-Eaton, Leesburg, VA (US)

(73) Assignee: United States Postal Service, Washington, DC (US)

( * ) Notice: Subject to any disclaimer, the term of this patent is extended or adjusted under 35 U.S.C. 154(b) by 84 days.

(21) Appl. No.: 16/132,178

(22) Filed: Sep. 14, 2018

(65) Prior Publication Data
US 2019/0009997 A1    Jan. 10, 2019

Related U.S. Application Data

(62) Division of application No. 14/869,843, filed on Sep. 29, 2015, now Pat. No. 10,202,248.

(60) Provisional application No. 62/058,407, filed on Oct. 1, 2014.

(51) Int. Cl.
*B65G 65/32*    (2006.01)

(52) U.S. Cl.
CPC .................................. *B65G 65/32* (2013.01)

(58) Field of Classification Search
CPC .... B65D 11/12; B65D 15/22; B65D 83/0083; B65G 65/23; B65G 65/32; B07C 3/008; B07C 3/087; B07C 1/025; B65H 31/30; B65H 2301/422548; B65B 5/10; B65B 5/101
USPC .............. 414/265, 416.12, 422; 221/88, 90; 312/42
See application file for complete search history.

(56) References Cited

U.S. PATENT DOCUMENTS

| | | | |
|---|---|---|---|
| 3,006,640 | A | 10/1961 | Wolfgang |
| 3,102,374 | A | 9/1963 | Lloyd et al. |
| 3,724,640 | A | 4/1973 | Rapparlie et al. |
| 3,752,043 | A | 8/1973 | Rapparlie et al. |

(Continued)

FOREIGN PATENT DOCUMENTS

| | | |
|---|---|---|
| EP | 0049718 A1 | 4/1982 |
| FR | 2680121 A1 | 2/1993 |

OTHER PUBLICATIONS

International Search Report and Written Opinion dated Feb. 1, 2016 for International Patent Application No. PCT/US2015/53029.

(Continued)

*Primary Examiner* — Glenn F Myers
(74) *Attorney, Agent, or Firm* — Knobbe Martens Olson & Bear LLP

(57) ABSTRACT

Features for loading, transporting and unloading of items are disclosed. Systems, devices and methods for such operations using a tray are described. In some embodiments, a tray having a moveable bottom allows for switching between a configuration for loading and unloading items in and out of the tray and a configuration for transportation of items inside the tray. The trays may also be stacked, for transportation of multiple trays at once, and nested, for saving space when storing the trays. In some embodiments, the trays may be used in conjunction with loading and unloading systems.

7 Claims, 33 Drawing Sheets

(56) References Cited

U.S. PATENT DOCUMENTS

| | | | |
|---|---|---|---|
| 4,014,458 A | 3/1977 | Berges | |
| 4,019,640 A | 4/1977 | Marin et al. | |
| 4,040,618 A | 8/1977 | Vermes et al. | |
| 4,044,910 A | 8/1977 | Box | |
| 4,161,092 A | 7/1979 | Buday et al. | |
| 4,239,436 A * | 12/1980 | Wildenaur | B65G 1/06 198/766 |
| 4,432,685 A | 2/1984 | Stauber | |
| D292,743 S | 11/1987 | Hung | |
| 4,750,315 A | 6/1988 | Wadell | |
| 4,805,890 A | 2/1989 | Martin | |
| 4,934,687 A | 6/1990 | Hayden | |
| 5,012,628 A | 5/1991 | Van Oord | |
| 5,104,114 A | 4/1992 | Gillmann | |
| 5,105,392 A | 4/1992 | Stringer et al. | |
| 5,138,817 A | 8/1992 | Mowry et al. | |
| 5,161,709 A | 11/1992 | Oestreich, Jr. | |
| 5,220,536 A | 6/1993 | Stringer et al. | |
| 5,233,814 A | 8/1993 | Bergerioux et al. | |
| 5,235,796 A | 8/1993 | Campbell, III et al. | |
| 5,289,935 A | 3/1994 | Hillis et al. | |
| 5,290,025 A | 3/1994 | Plent et al. | |
| 5,422,861 A | 6/1995 | Stringer et al. | |
| 5,556,252 A | 9/1996 | Kuster | |
| 5,636,723 A | 6/1997 | Bulle et al. | |
| 5,655,668 A | 8/1997 | Drenth | |
| 5,743,518 A | 4/1998 | Takashimizu et al. | |
| H1747 H | 9/1998 | Saeki et al. | |
| 5,803,704 A * | 9/1998 | Lazzarotti | B07C 1/025 414/218 |
| 6,003,861 A | 12/1999 | Iizumi et al. | |
| 6,227,377 B1 * | 5/2001 | Bonnet | B65G 21/12 198/435 |
| D452,820 S | 1/2002 | Hacker | |
| D453,995 S | 3/2002 | Slight | |
| 6,536,191 B1 | 3/2003 | Ruggiero | |
| 6,749,194 B2 | 6/2004 | Hanson et al. | |
| 6,840,513 B1 | 1/2005 | Rabindran | |
| 6,886,710 B2 | 5/2005 | Verna et al. | |
| 7,137,234 B2 | 11/2006 | Caporali et al. | |
| D610,001 S | 2/2010 | McAlpine | |
| 7,699,578 B2 | 4/2010 | Nielsen | |
| 7,731,167 B2 | 6/2010 | Prim et al. | |
| D631,561 S | 1/2011 | Luciano | |
| 7,866,936 B2 | 1/2011 | Schuck et al. | |
| D639,563 S | 6/2011 | Chilewich et al. | |
| 8,020,701 B2 | 9/2011 | Berdelle-Hilge et al. | |
| D658,407 S | 5/2012 | Pung et al. | |
| 8,631,922 B2 | 1/2014 | Stone et al. | |
| D750,892 S | 3/2016 | Rego | |
| 9,302,811 B2 | 4/2016 | Orgeldinger | |
| D780,452 S | 3/2017 | Stratton et al. | |
| 9,796,540 B1 | 10/2017 | Shellenbaum et al. | |
| 2003/0006174 A1 * | 1/2003 | Harres | B65G 1/0435 209/584 |
| 2003/0017034 A1 | 1/2003 | Davis et al. | |
| 2004/0222222 A1 | 11/2004 | Parnall et al. | |
| 2006/0138130 A1 | 6/2006 | Orgeldinger | |
| 2006/0180435 A1 | 8/2006 | Swider et al. | |
| 2009/0028686 A1 | 1/2009 | Tallis et al. | |
| 2009/0173040 A1 | 7/2009 | Carlson et al. | |
| 2009/0272859 A1 * | 11/2009 | Pippin | B62B 3/10 248/99 |
| 2013/0320609 A1 | 12/2013 | Keane et al. | |
| 2014/0093338 A1 * | 4/2014 | Mestrallet | B65G 1/00 414/265 |
| 2014/0239577 A1 | 8/2014 | Kato | |
| 2015/0344258 A1 | 12/2015 | Tsumura et al. | |

OTHER PUBLICATIONS

International Search Report and Written Opinion dated Aug. 12, 2016 for International Patent Application No. PCT/US16/30039.

Written Opinion dated Jul. 14, 2017 for International Patent Application No. PCT/US16/30039.

* cited by examiner

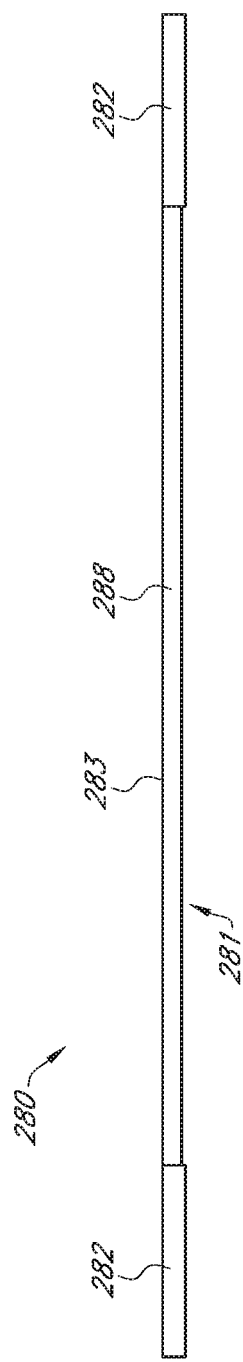

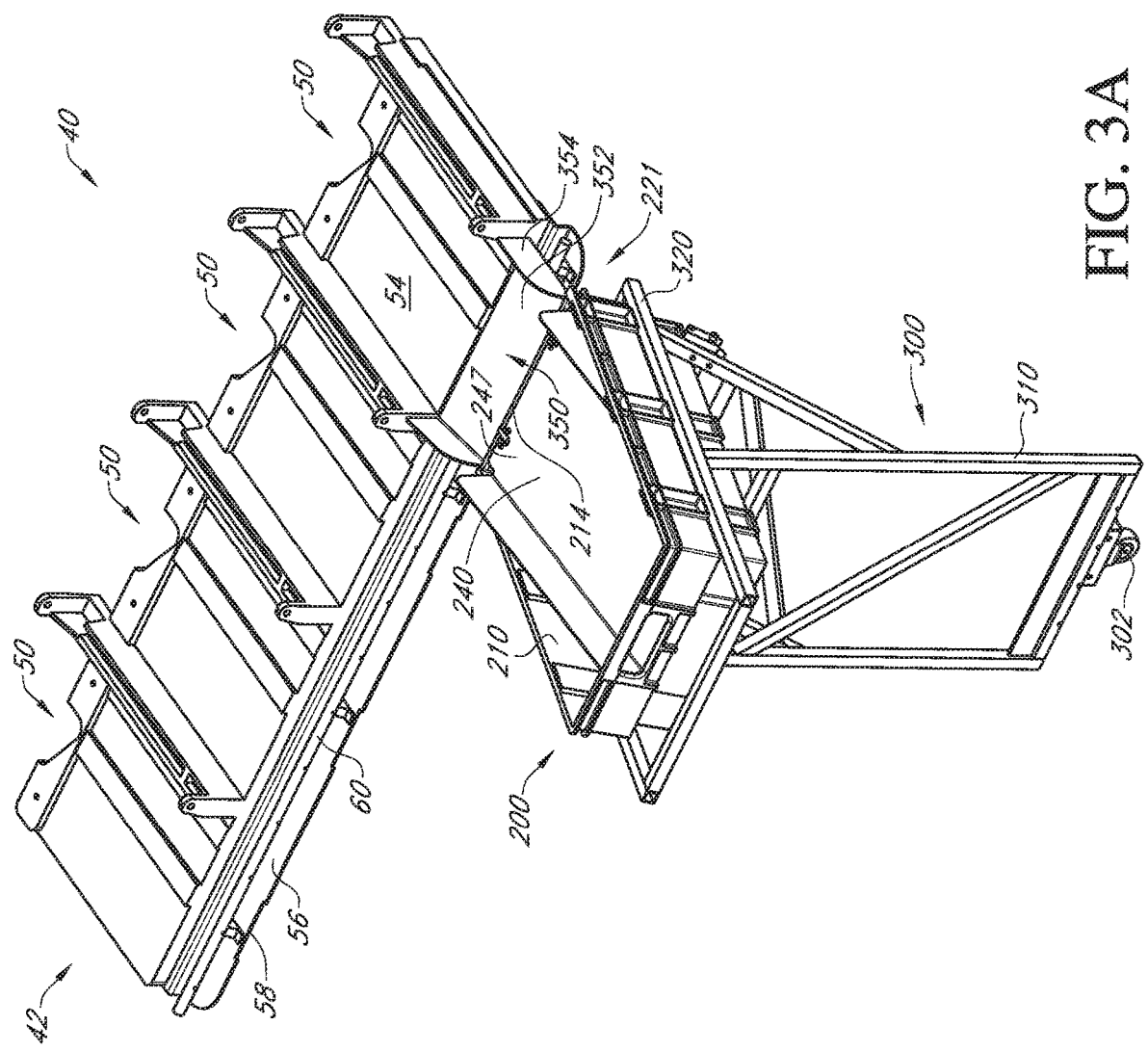

TRANSFORMABLE TRAY AND TRAY SYSTEM FOR RECEIVING, TRANSPORTING AND UNLOADING ITEMS

INCORPORATION BY REFERENCE TO ANY PRIORITY APPLICATIONS

Any and all applications, for which a foreign or domestic priority claim is identified in the Application Data Sheet as filed with the present application, are hereby incorporated by reference under 37 CFR 1.57. This application is a divisional of U.S. application Ser. No. 14/869,843, filed Sep. 29, 2015, which claims the benefit of priority under 35 U.S.C. § 119(e) of U.S. Provisional Application No. 62/058,407, filed on Oct. 1, 2014, and entitled "TRANSFORMABLE TRAY AND TRAY SYSTEM FOR RECEIVING, TRANSPORTING AND UNLOADING ITEMS," the entire disclosures of which is incorporated herein by reference.

BACKGROUND

Field

This application relates to the field of processing, transporting and sorting items. More specifically, this application relates to a tray for use with a tray loader and unloader system for use in processing and sorting items.

Description of the Related Art

In many industrial concerns, convenient handling of large numbers of items is crucial. For example, many items must be received, transported and unloaded for processing or sorting in processing equipment. Some operations involve thousands or millions of items handled daily. Items intended for processing or sorting in processing equipment can be contained in trays or other containers. Items are typically loaded into or unloaded from the processing equipment into trays, which can be time consuming and inefficient if the tray and equipment are not designed to allow easy and efficient loading and unloading of the items between the tray and the various systems.

As an example, mail delivery operations may involve receiving, loading, transporting and unloading thousands of pieces of mail daily. The high volume of mail items means more time spent on these and other processes. Poorly designed systems and components that require inconvenient and time intensive movement of items lead to processing inefficiencies with each item that add up to significant losses of time over the course of day or year.

This is merely one example of an industrial concern that relies on sorting and receiving high volumes of items. Others may include, but are not limited to, retail concerns with large inventories and high daily sales, high volume component manufacturers such as consumer goods, and importing concerns with high volume imports needing sorting and receiving daily.

There is therefore a need for improved systems, devices and methods that allow for efficient and convenient loading, transporting and unloading of high volumes of items to and from associated processing equipment.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods for receiving items.

In a first aspect, a tray for receiving an item is disclosed. The tray comprises a sidewall having at least a front side, the sidewall having a top portion and a bottom portion and defining an internal cavity. The tray further comprises a moveable bottom having a top surface, a bottom surface, a front end and a back end, wherein the front end is moveably coupled with the front side of the sidewall such that the front end of the moveable bottom can move up and down along the front side of the sidewall. A bottom side of the tray is coupled with at least part of the bottom portion of the sidewall and is configured to support the moveable bottom. The moveable bottom is configured to move between a first position and a second position. In the first position, the front end of the moveable bottom is positioned at the top portion of the front side of the sidewall, such that the item may slide into or out of the cavity along the top surface of the moveable bottom. In the second position, the front end of the moveable bottom is positioned at the bottom portion of the front side of the sidewall.

In some embodiments, the moveable bottom is configured to move between the first position and the second position by sliding along the front side of the sidewall. In some embodiments, the first position is for loading and unloading the item into and out of the cavity, respectively. In some embodiments, the second position is for transporting the item within the cavity.

In some embodiments, the bottom side of the tray defines a window that provides access to the bottom surface of the moveable bottom.

In some embodiments, the front side of the sidewall comprises a track configured to receive at least part of the front end of the moveable bottom, wherein the track couples the moveable bottom with the front side of the sidewall.

In some embodiments, the front end of the moveable bottom comprises a projection, and the track is configured to receive the projection. In some embodiments, the track extends partially into the cavity and defines a slot configured to receive the projection. In some embodiments, the moveable bottom is configured to move between the first position and the second position by sliding the projection along the track. In some embodiments, the projection is a pin. The moveable bottom can be configured to move between the first position and the second position by sliding the pin within the slot. In some embodiments, the front side of the sidewall comprises a second track defining a second slot configured to receive a second projection of the front end of the moveable bottom, and wherein the moveable bottom is further configured to move between the first position and the second position by sliding the second pin within the second slot.

In some embodiments, the bottom side defines a window that provides access to the bottom surface of the moveable bottom, and the moveable bottom is configured to move between the first and second positions by lowering and raising the tray relative to an arm that is separate from the tray such that the arm extends through the window and contacts the moveable bottom. In the first position, the moveable bottom may be angled with respect to a plane defined by a bottom edge of the sidewall. In the second position, the moveable bottom may be substantially parallel with respect to a plane defined by a bottom edge of the sidewall.

In some embodiments, the moveable bottom further comprises a center portion and a plurality of side portions coupled with the center portion. The center portion and the plurality of side portions define a channel for receiving the item.

In some embodiments, the sidewall further comprises a first side comprising top and bottom portions and a second side opposite the first side and comprising top and bottom portions. The top portions of the first and second sides each may define a plurality of recesses and a plurality of pockets along interior faces of the first and second sides. The bottom portions of the first and second sides each may comprise a plurality of feet along exterior faces of the first and second sides. The tray may be configured to be stacked on top of a second tray having a plurality of recesses by aligning the feet of the tray with the plurality of recesses of the second tray. In some embodiments, the tray is configured to be nested with a second tray, such that the second tray at least partially receives the tray, by rotating the tray relative to the second tray to align the feet of the tray with the plurality of pockets of the second tray and then receiving the feet of the tray at least partially within the pockets. In some embodiments, the feet of the tray are aligned with the plurality of pockets of the second tray by rotating the tray relative to the second tray. The feet of the tray may be aligned with the plurality of pockets of the second tray by rotating the tray 180° relative to the second tray.

In some embodiments, the moveable bottom has at least one end portion coupled with the back end of the moveable bottom, with the at least one end portion defining at least one space adjacent to the at least one end portion. The at least one end portion and the at least one space may define a comb-like configuration at the back end of the moveable bottom configured to receive in the at least one space a complementary shaped arm for removing the item from the tray. In some embodiments, the at least one end portion does not contact a back side of the tray when the moveable bottom is in the second position. In some embodiments, the moveable bottom has at least one spacer tab extending from the back end of the moveable bottom, with the at least one spacer tab configured to prevent the at least one end portion from contacting a back side of the tray when the moveable bottom is in the second position.

In another aspect, a system for loading an item is disclosed. The system may include a loader comprising a loading shelf, the loading shelf being attached to the loader at an exit point of the loader, and a carriage moveably disposed along a portion of the loader, the carriage configured to support a tray, the tray having a bottom side, a moveable bottom and a sidewall comprising a front side, the moveable bottom configured to move between a first position for loading the item into the tray by sliding the item onto the moveable bottom and a second position for transporting the item within the tray. The loading shelf may be positioned to span a distance between the exit point of the loader and the tray positioned on the carriage. The moveable bottom of the tray may form a surface with the loading shelf such that the item can slide along the loading shelf and onto the moveable bottom.

In some embodiments, the bottom side defines a window that provides access to a bottom surface of the moveable bottom, and wherein the moveable bottom is configured to move between the first and second positions by lowering and raising the tray over an arm coupled with the carriage such that the arm contacts the moveable bottom through the window.

In some embodiments, the loader further comprises an elongated rail along an edge of the loading shelf with which the front side of the tray is configured to couple when the carriage is adjacent to the loader, and the carriage with the tray mounted thereto is configured to move along the rail.

In some embodiments, the loader further comprises an edge support having a plurality of notches configured to couple with at least one of the carriage and the tray and thereby prevent the carriage from moving along the rail.

In some embodiments, the loader further comprises a plurality of bins each comprising a loading shelf and configured to provide the item to be loaded into the tray, wherein the tray is configured to move among the plurality of bins by moving the carriage along a length of the loading shelf.

In some embodiments, the loader further comprises an elongated rail with which the front side of the tray couples when the carriage is adjacent to the loader, wherein the tray is configured to move among the plurality of bins by moving the carriage with the tray mounted thereto along the rail. The loader may further comprise an edge support having a plurality of notches configured to couple with the tray and prevent the tray and the carriage from moving along the rail.

In another aspect, a system for unloading an item from a tray is disclosed. The system comprises a tray support, at least one elongated arm coupled with and extending from the tray support, a tray mount coupled with the tray support and having a surface configured to receive the tray thereon, where the tray mount defines at least one opening extending therethrough, and the at least one opening is configured to receive therethrough the at least one arm, and the tray. In some embodiments, the tray has a moveable bottom, a bottom side defining a window that provides access to the moveable bottom, and a sidewall comprising a front side, where the moveable bottom is configured to move between a first position for unloading the item from the tray by sliding the item along the moveable bottom and a second position for transporting the item within the tray. When the tray moves relative to the at least one arm along a first direction that is perpendicular to the surface of the tray mount, the at least one arm extends through the window of the tray and through the at least one opening of the tray mount to cause the moveable bottom to move from the second position to the first position.

In some embodiments, the at least one arm is configured to move in the first direction. In some embodiments, the tray mount is configured to move in the first direction. In some embodiments, the tray mount is stationary and the at least one arm is configured to move in the first direction. In some embodiments, the at least one arm is stationary and the tray mount is configured to move in the first direction. In some embodiments, the tray mount is configured to lower over the at least one arm. In some embodiments, when the tray moves relative to the at least one arm along the first direction, the at least one arm extends through the window of the tray and through the at least one opening of the tray mount and contacts the moveable bottom to cause the moveable bottom to move from the second position to the first position.

In some embodiments, the system further comprises a second elongated arm coupled with and extending from the tray support, where the tray mount defines a second opening extending therethrough, and where the second opening is configured to receive therethrough the second arm.

In some embodiments, in the first position, the moveable bottom is coupled with a top portion of the tray such that the moveable bottom forms a continuous surface with an unloading surface of the system such that the item may be removed from the tray by sliding the item from the moveable bottom and onto the unloading surface.

In some embodiments, in the first position, the bottom side of the tray is angled with respect to the unloading surface and the movable bottom is angled with respect to the bottom side of the tray. In some embodiments, the system further comprises a side tray mount that is perpendicular to the tray mount, where, in the first position, the tray mount and side tray mount are angled with respect to horizontal and vertical directions and are positioned such that the tray, when placed on the tray mount, is forced by gravity toward the side tray mount.

In some embodiments, the system further comprises at least one gripper coupled to a track and configured to translate along the track to thereby slide the item out of the tray and onto the unloading surface when the tray is in the first position.

In some embodiments, the system for unloading an item from a tray comprises the tray and an unloader. The tray may have a bottom side, a moveable bottom and a sidewall comprising a front side, with the moveable bottom configured to move between a first position for unloading the item from the tray by sliding the item along the moveable bottom and a second position for transporting the item within the tray. The unloader may comprise a mount configured to support the tray and an unloading surface configured to have the item slide thereon from the moveable bottom of the tray. When the tray is supported on the mount and the moveable bottom is in the first position, the moveable bottom may form a continuous surface with the unloading surface such that the item can slide along the continuous surface from the moveable bottom and onto the unloading surface. When the tray is supported on the mount and the moveable bottom is in the first position, the sidewall may be angled with respect to the unloading surface such that the continuous surface is substantially planar.

In some embodiments, the bottom side defines a window that provides access to a bottom surface of the moveable bottom, and the moveable bottom is configured to move between the first and second positions by lowering and raising the tray over an arm coupled with the mount, with the arm configured to contact the moveable bottom through the window. In some embodiments, the arm is configured to move the moveable bottom to the first position by extending through an opening in the mount as the tray is lowered over the arm and thereby pushing a front end of the moveable bottom in an upward direction.

In some embodiments, the mount comprises a second arm configured to angle the sidewall with respect to the unloading surface by extending through an opening in the mount as the tray is lowered over the arm and thereby pushing the sidewall in an upward direction such that the sidewall is angled with respect to the unloading surface and the continuous surface is substantially planar.

In some embodiments, the arm is configured to allow the moveable bottom to move to the second position when the tray is raised over the arm, thereby allowing a front end of the moveable bottom to move in a first downward direction, and the second arm is configured to allow the sidewall to move in a second downward direction when the tray is raised over the second arm.

In another aspect, a method for loading a tray is disclosed. The method comprises positioning an item on a loading shelf, positioning a sidewall of the tray at an angle with respect to the loading shelf, moving a moveable bottom of the tray to a first position such that the moveable bottom and the loading shelf form a continuous surface, sliding the item along the continuous surface from the loading shelf and onto the moveable bottom, and moving the moveable bottom to a second position inside a cavity defined by a sidewall of the tray such that the moveable bottom is adjacent to a bottom side of the tray.

In some embodiments, the method further comprises positioning a sidewall of the tray at an angle with respect to an unloading surface, moving the moveable bottom to the first position such that the moveable bottom and the unloading surface form a second continuous surface, and sliding the item along the second continuous surface from the moveable bottom and onto the unloading surface.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 2L-2O are various views of a bracket that may be used with the tray of FIGS. 2A-2J.

FIG. 3A is a perspective view of the tray of FIG. 2A supported on an embodiment of a carriage and interfaced with an embodiment of a loading surface.

DETAILED DESCRIPTION

Figure 1A:
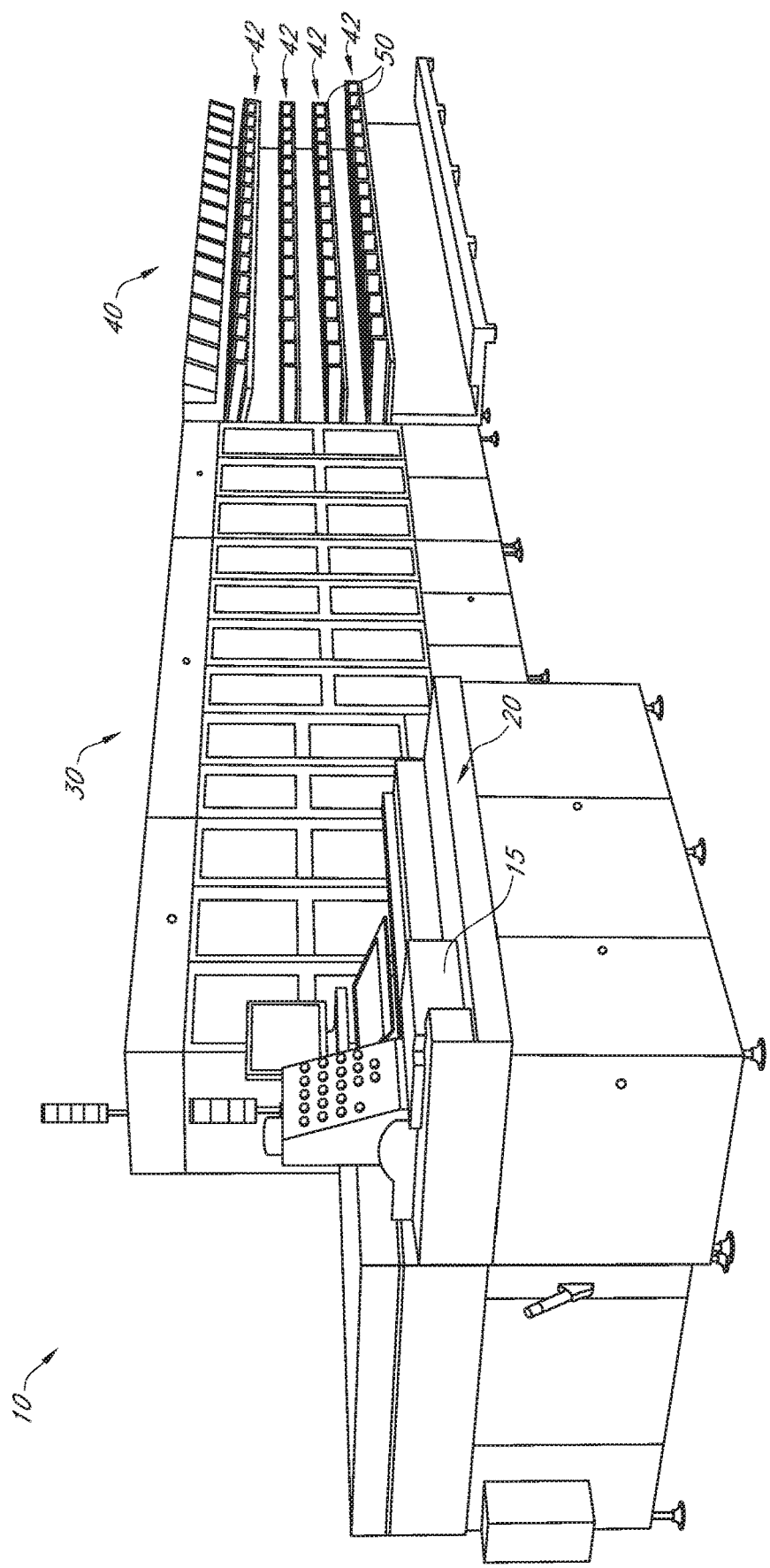
FIG. 1A is a perspective view of an embodiment of a loading system for loading items from a stacker.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Embodiments of the development will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

Systems, devices and methods for loading and unloading an item in a tray are disclosed. The tray may receive the item from an unloading surface that may be located in a facility where high volumes of items must be handled. The items may need to be moved amongst various processing equipment in the facility. For instance, the items may be initially received at an intake system, sorted in a sorter system, and then placed into a loading system for movement of the items to another piece of equipment. The disclosed tray devices, systems and methods provide a convenient and efficient solution to moving the items between the various pieces of equipment. For instance, the items may need to be moved from the loading system to an unloading system.

In some embodiments, the tray may couple with the loading system such that the items can be easily slid from the loading surface and onto a moveable bottom of the tray. The moveable bottom may be moved within the tray into a first position, to form a continuous surface with a loading surface of the loading system for easy loading of the items, and then moved into a second position for transportation of the items within the tray. Once the tray is transported to another piece of equipment, for instance the unloading system, the moveable bottom may be moved again to the first position to form a continuous surface with an unloading surface of the unloading system, for easy unloading of the items onto the unloading surface.

In some embodiments, the items may be slid from the moveable bottom and onto the unloading surface. Further, the tray may have features for stacking multiple trays together for transportation of multiple trays when they each contain items. The tray may also have features for nesting multiple trays together for space-saving storage and/or transportation of the trays with no or fewer items. These are just some features and functions of the disclosed tray devices, systems and methods. Other embodiments are contemplated as within the scope of the present disclosure, as discussed in further detail below.

Turning to FIG. 1A, a perspective view of an embodiment of a loading system 10 is shown. The loading system 10 may be located in a facility were high volumes of items are received and processed. In some embodiments, the illustrated loading system 10 may be located in a mail sorting facility where high volumes of mail items, such as letters and packages, are received and processed.

The loading system 10 may include an intake system 20. The intake system 20 may be a counter or other receiving structure where an item or items 15 are initially brought into the loading system 10. The intake system 20 may provide a surface or surfaces to place the items 15 and/or to analyze the items. For example, the intake system may have a scanner (not shown) that reads a barcode on the items 15 in order to identify various characteristics of the items 15, such as destination. The intake system 20 may further include a computer to facilitate with the intake and processing of the items 15, for example by receiving and sending data to the intake system 20 regarding the received items 15.

The loading system 10 may further include a sorter system 30. The sorter system 30 may be a large storage and conveyor cabinet as shown with various pathways for the items 15 to travel. The sorter system 30 may be located adjacent or otherwise near the intake system 20. As shown, the sorter system 30 may be located next to the intake system 20. In some embodiments, the items 15 may be delivered from the intake system 20 to the sorter system 30. For example, the items 15 may be put on a conveyor (not shown)

which carries the items 15 from the intake system 20 to the sorter system 30. At the sorter system 30, the items 15 may be sorted or otherwise processed. In some embodiments, the sorter system 30 uses data taken at the intake system 20 in order to sort the items 15. For instance, barcodes on the items 15 may be read at the intake system 20 and this data may be used by the sorter system 30 to sort the items 15. The items 15 may travel or otherwise be moved through the sorter system 30 en route to other processing equipment, such as a stacker 40.

The loading system 10 may further include a stacker 40. The stacker 40 may be a structural system with stacked components on which the items may be placed. The stacker 40 may be located near or adjacent to the sorter system 30. The stacker 40 may receive the items 15 from the sorter system 30 and stack the items in various locations of the stacker 40. The stacker 40 may include various bins 50 in which the sorted items 15 may be placed. The bins 50 are discussed in further detail below, for example, with respect to FIG. 1B. As an example, the items 15 may be mail pieces, such as letters and/or packages, that are sorted by the sorter system 30 and then placed into the proper bins 50 in the stacker 40. Once the items are in the proper bins 50, they may then be removed from the stacker 40 and taken to other pieces of equipment in the facility for further processing. Further, the bins 50 may be arranged in one or more rows 42. The rows 42 are shown in a generally vertical arrangement, although other configurations are possible. The bins 50 in a single row 42 may receive items 15 that are grouped together in some manner, for example by recipient and/or geographic destination.

Figure 1B:
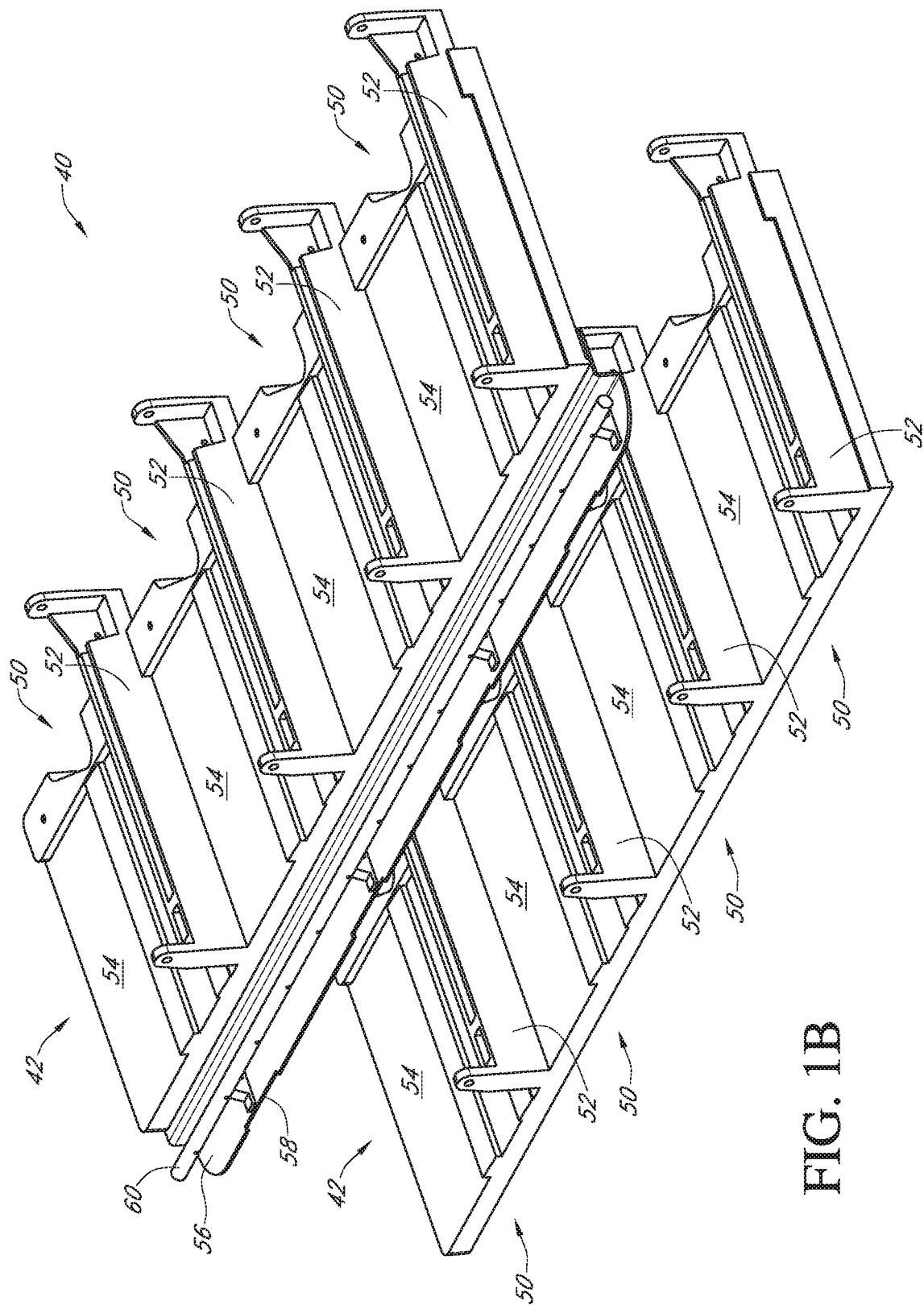
FIG. 1B is a perspective view of part of the stacker from FIG. 1A.

FIG. 1B is a perspective view of a portion of the stacker 40 that includes rows 42 of loading shelves 54. The loading shelves 54 may be generally flat, elongated structures upon which the items may be placed after being sorted in the sorter system 30 and processed in the stacker 40. The loading shelves 54 may be any rigid structure capable of supporting the items. In some embodiments, the loading shelves 54 may be formed from metal. The loading shelves 54 may be formed from other materials as well, including plastics, polymers, other materials and/or combinations thereof.

As shown, there may be two rows 42 of loading shelves 54. However, the stacker 40 may have more than two or fewer than two rows 42 of loading shelves 54. There may be a first set of loading shelves 54 located above or below another set of loading shelves 54. As shown in FIG. 1B, there are eight loading shelves 54, with a first set of four loading shelves 54 located above another set of four loading shelves 54. Furthermore, one or more loading shelves 54 may be a monolithic structure or part formed from a single piece of material. For instance, the four loading shelves 54 in the top row 42 as illustrated in FIG. 1B may be formed from the same sheet of material. Similarly, the four loading shelves 54 in the bottom row 42 as illustrated in FIG. 1B may be formed from the same sheet of material. In some embodiments, the loading shelves 54 may be formed from multiple structures or parts attached or otherwise coupled together. The loading shelves 54 shown in FIG. 1B may be comprised of eight separate loading shelves 54 that are coupled together. For example, the top row 42 may include four components coupled together to form a single, continuous loading shelf 54. Likewise, the lower row 42 may include four components coupled together to form a single, continuous loading shelf 54. These are just some configurations and materials of the loading shelves 54 that may be used. Other suitable configurations and materials may be used.

The loading shelves 54 may be used to load items into trays for transportation to another part of the facility for further processing. For instance, the items may be slid from the loading shelf 54 and into a tray (not shown). The items may be manually or automatically moved. For example, an arm (not shown) may push the items from the loading shelf 54 and slide them into a tray.

The stacker 40 may further include walls 52. The walls 52 may be projecting, structural components located at various locations along the loading surface or surfaces 54. As shown, there are four walls 52 on each row 42 of loading shelves 54. The walls 52 may be elongated structures that separate the loading shelves 54 from one another or that separate different portions or areas of one loading shelf 54 from other portions or areas of the same loading shelf 54. In some embodiments, the walls 52 extend vertically upward from the loading shelves 54. The walls may be formed from a variety of materials, including metal, plastic, polymer, other suitable materials and/or combinations thereof.

The stacker 40 may include one or more bins 50. The bins 50 may be defined by the loading shelves 54 and one or more walls 52. As shown, each bin 50 is defined by two walls 52 and a portion of the loading shelf 54. The bin 50 may therefore be a defined area or location where an item 15 may be placed to await removal from the stacker 40. For example, the stacker 40 may contain items 15 (not shown) that have been sorted and placed into various bins 50. The items 15 may be placed into particular bins 50 according to the final destination of the items 15. For example, the bins 50 in the top row 42 as illustrated in FIG. 1B may contain items intended to be retrieved and sent to one part of the processing facility. Items that may be in the lower row 42 as illustrated in FIG. 1B may be intended for retrieval and movement to a different part of the processing facility. These are just some examples, and the items 15 may be placed in the various bins 50 based on other criteria and other operations may be performed with the items 15.

The stacker 40 may further include an edge support 56. The edge support 56 may be an elongated flat structure located along an edge of one or more loading shelves 54. The edge support 56 may be formed from a metal or other rigid material. In some embodiments, the edge support 56 may be mounted or otherwise coupled with the loading shelf 54. The edge support 56 may also be coupled with a different part or parts of the stacker 40. As shown, the top row 42 of bins 50 as illustrated in FIG. 1B contains the edge support 56 attached to an edge of the loading shelf 54 in that same row 42. The edge support 56 may be fastened with bolts or otherwise attached to the loading shelf 54. As shown, the edge support 56 is mechanically attached to a lower side of the edge of the loading shelf 54. The edge support 56 may provide a support for other parts of the loading system 10, for example a rail 60, as discussed below.

The edge support 56 may define one or more notches 58. The edge support 56 may have portions of material removed along a front edge of the edge support 56 to form or otherwise define the notches 58. As shown, material has been removed from the edge support 56 at locations of the front edge of the edge support 56 that correspond to locations of the bins 50. Therefore, each bin 50 may have a notch 58 defined at a location of the edge support 56 that is in front of a respective bin 50. As will be discussed in further detail herein, the notches 58 on the edge support 56 may be used to position and/or secure a tray to the stacker 40 in front of a bin 50 for receiving items from that same bin 50.

The stacker 40 may further include a rail 60. The rail 60 may be an elongated structure located along a front edge of the loading shelf 54. As shown, the rail 60 may have a cylindrical shape and extend from one end of the loading shelf 54 to the other end. The rail 60 may be formed from a metal, other rigid materials and/or combinations thereof. The rail 60 may provide a structure upon or along which a tray (not shown) may be easily moved among the various bins 50 in a single row 42 of bins 50, as is discussed in further detail herein, for example with respect to FIG. 3. The rail 60 may therefore extend along the front of multiple bins 50 such that a tray (not shown) or other receiving structure may be slid along the rail 60 to receive items from the various bins 50 located in a single row 42. While the top row 42 is shown with the edge support 56 and rail 60, it is understood that other rows 42 may include the edge support 56 and/or rail 60. For instance, the lower row 42 as illustrated in FIG. 1B may include the edge support 56 and/or the rail 60. There may further be multiple edge supports 56 and/or rails 60 such that one or more rows 42 each include the edge support 56 and/or the rail 60. As shown, the rail 60 may be mounted to a top surface of the edge support 56. For example, the rail 60 may contain brackets that are bolted or otherwise secured to the edge support 56.

Figure 2A:
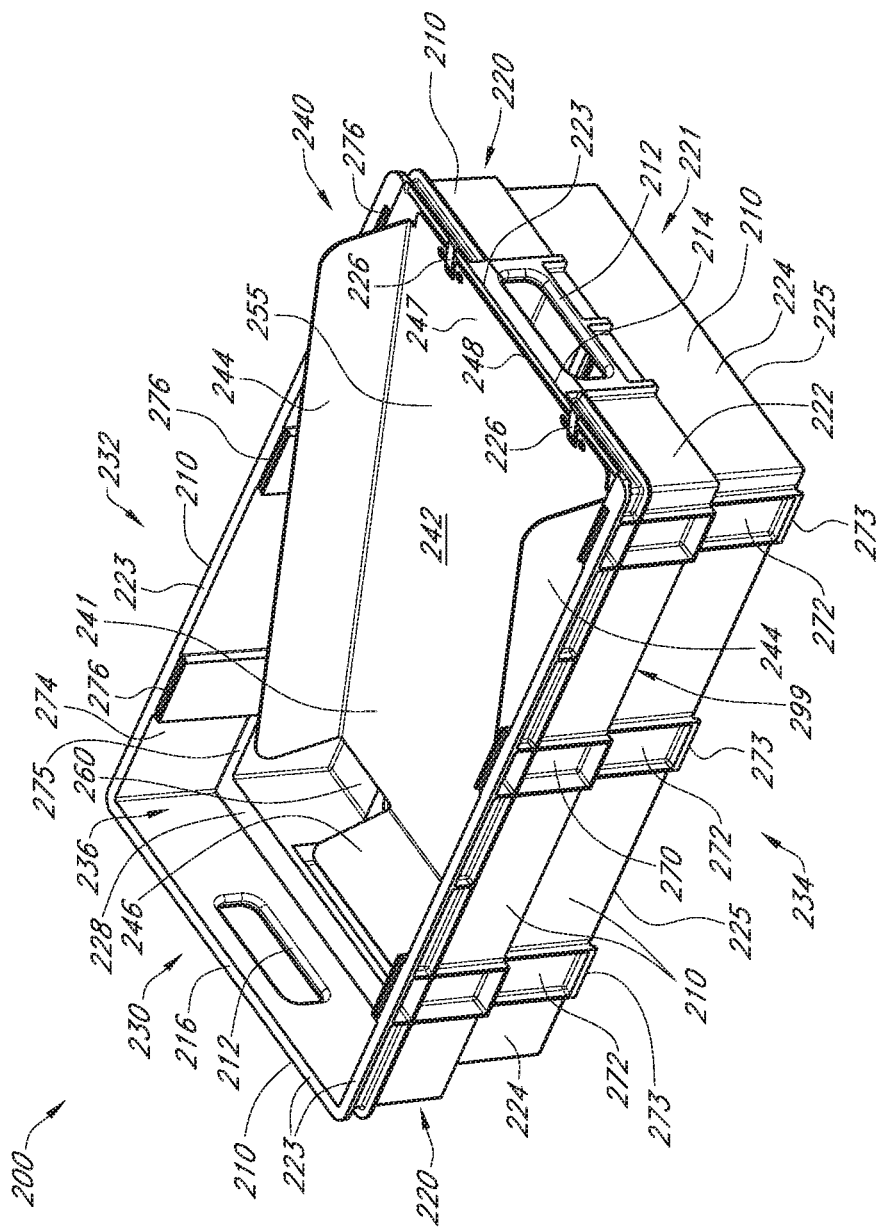
FIG. 2A is a perspective view of an embodiment of a tray, having an embodiment of a moveable bottom oriented in a first position, that may be used with the stacker of FIGS. 1A-1B.
Figure 2B:
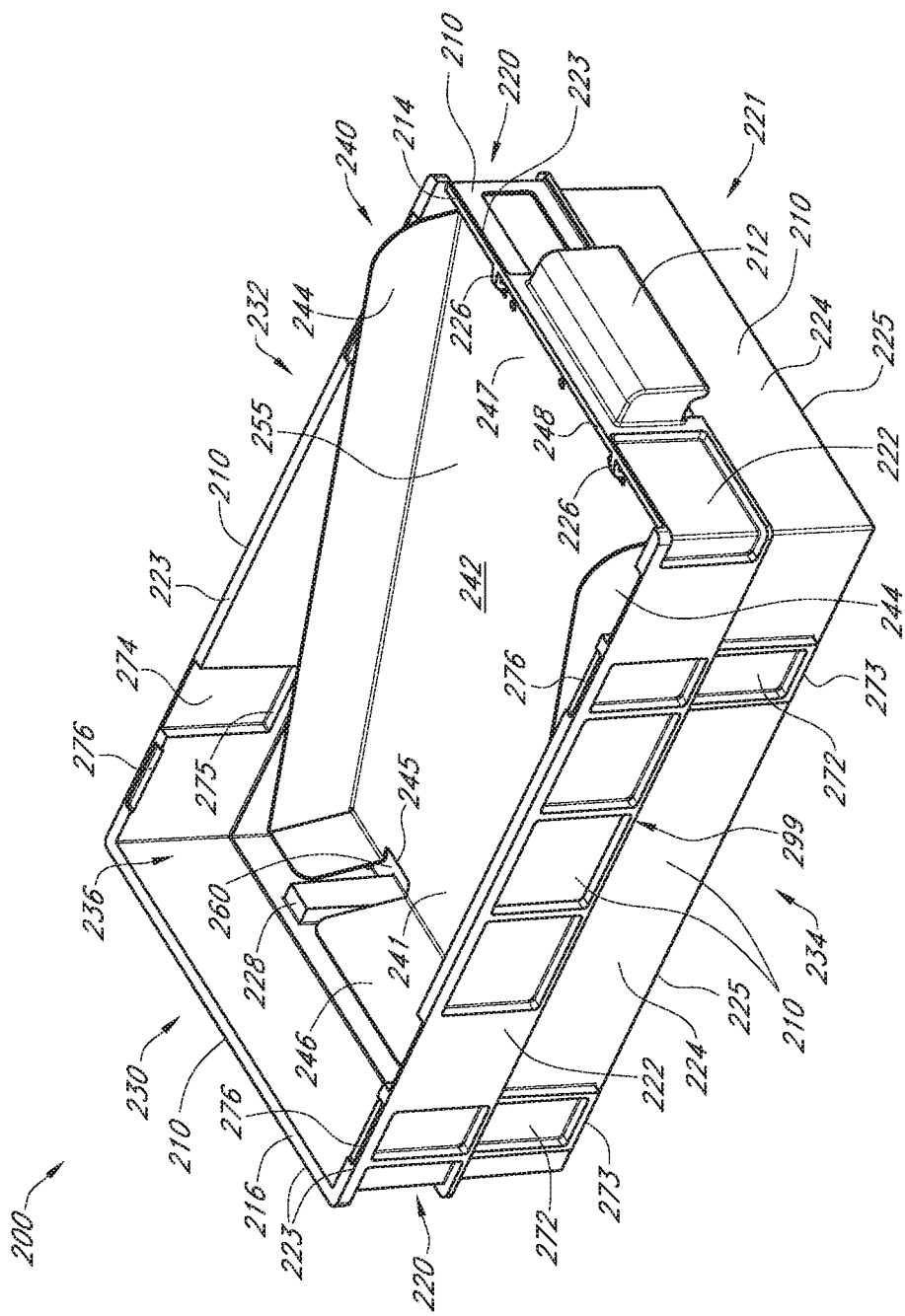
FIG. 2B is a perspective view of another embodiment of a tray, having another embodiment of a moveable bottom oriented in a first position, that may be used with the stacker of FIGS. 1A-1B.

Turning now to FIGS. 2A-2B, two embodiments of a tray 200 are shown. FIG. 2A is a perspective view of an embodiment of a tray 200, having an embodiment of a moveable bottom 240, that may be used with the stacker of FIGS. 1A-1B. FIG. 2B is a perspective view of another embodiment of a tray 200, having another embodiment of a moveable bottom 240, that may be used with the stacker of FIGS. 1A-1B.

Referring to FIG. 2A, the tray 200 may be used with the loading system 10 to receive items from the stacker 40, for example, and transport the items 15 to another piece of processing equipment. The tray 200 may include a body 210. The body 210 may be one or more structural members that form an outer structure of the tray 200. The body 210 may be formed from a rigid material, such as a plastic, polymer, metal, other materials and/or combinations thereof. The body 210 may have a generally square or rectangular profile with outer walls that define a cavity 236 therein. The cavity 236 may be an interior volume of the body 210 of the tray 200 into which items 15 may be placed.

The tray 200 may include a sidewall 220. The sidewall 220 may form some or all of the body 210. The sidewall 220 may be a continuous structure that extends generally along the outer perimeter of the body 210. The sidewall 220 as shown may include four sides. In some embodiments, the sidewall 220 may include more or fewer sides. The sidewall 220 may define the lateral boundaries of the cavity 236. As shown, the sidewall 220 extends along the perimeter of the body 210 and defines an internal boundary of the cavity 236. The sidewall 220 may be formed of any suitable material, such as plastic, polymer, metal, other materials and/or combinations thereof. The sidewall 220 may be about one quarter of an inch (0.25") thick. In some embodiments, the sidewall may be thinner or thicker than one quarter of an inch (0.25").

The sidewall 220 may include a top edge 223. The top edge 223 may extend along the top of the sidewall 220 around the perimeter of the tray body 210. As shown, the top edge 223 extends along all four sides of the sidewall 220. The top edge 223 may be a flat surface, a curved surface, other contours and/or combinations thereof. As shown, the top edge 223 includes generally flat surfaces. Further, the top edge 223 may have varying heights along the perimeter of the tray 200. For example, one section of the top edge 223 may be higher or lower in the vertical direction compared to other portions of the top edge 223 (see FIG. 2H). As is discussed in further detail herein, for example with respect to FIGS. 3-4B, portions of the top edge 223 may be used to form portions of a continuous surface for easily loading and unloading items to and from the tray 200.

The top edge 223 may include a front edge 248. The front edge 248 may be a portion of the top edge 223 near the front of the tray 200. The front edge 248 may have any of the features or functionalities of the top edge 223. Further, the front edge 248 may extend along the front of the tray 200 as well as along the sides of the tray 200. As shown, the front edge 248 is a generally straight portion of the top edge 223 along the front of the tray 200.

The top edge 223 may include a back edge 216. The back edge 216 may be a portion or portions of the top edge 223 that are near the back of the tray 200. As shown, the back edge 216 is a portion of the top edge 223 extending along the back side of the sidewall 220. The back edge 216 may have any of the features or functionalities of the top edge 223 and or of the front edge 248. The back edge 216 may be located at the same or a different height then the front edge 248. In some embodiments, the back edge 216 is located vertically higher than the front edge 248 (see FIG. 2H). Other configurations are possible.

The tray 200 may include a bottom edge 225. The bottom edge 225 may be a bottom edge of the sidewall 220. The bottom edge 225 may extend along the bottom of the sidewall 223 along the perimeter of the tray 200. As shown, the bottom edge 225 extends along the four sides of the sidewall 220 around the lower perimeter of the tray body 210.

The tray 200 may include a front side 221. The front side 221 may be one or more portions of the sidewall 220. The front side 221 may be formed of the same or similar materials as the tray body 210. Further, the front side 221 may form a part of the body 210. The front side 221 may be a generally planar structure forming a wall on the front of the tray body 210. As shown, the front side 221 is generally rectangular and has a thickness. The thickness of the front side 221 may be similar to the thickness of other sides of the sidewall 220. In some embodiments, the front side 221 is about one quarter of an inch (0.25") thick. The front side 221 may also be thinner or thicker than one quarter of an inch (0.25").

The tray 200 may include a back side 230. The back side 230 may be a structural member that encloses the back part of the tray body 210 that is located opposite from the front side 221. The back side 230 may have similar features and functionalities as the front side 221. The back side 231 may form a back part of the sidewall 220. The back side 230 may be formed of a plastic, polymer, metal, other suitable materials and/or combinations thereof. The back side 230 may include portions of the top edge 223 and/or the bottom edge 225. As shown, the back side 230 is a generally planar structure having a thickness with a top portion that includes part of the top edge 223 and a bottom portion that includes part of the bottom edge 225.

The tray 200 may include a left side 232 and a right side 234. The left and right sides 232, 234 may be structural members of the tray body 210 that enclose sides of the tray 200. The left side 232 and the right side 234 may be generally planar structural members. As shown, the left side 232 and the right side 234 are generally rectangular. Other suitable configurations may be implemented. The left and right sides 232, 234 may have the same or similar features and/or functions as the front side 221 and/or the back side 230. The left and right sides 232, 234 may be formed from a variety of materials, including plastics, polymers, metals, other suitable materials and/or combinations thereof.

The front side 221, the back side 230, the left side 232, and the right side 234 may be connected or otherwise coupled together to enclose an interior portion of the tray 200. In some embodiments, the sides 221, 230, 232, 234 are coupled together such that they define the cavity 236. For example, the front side 221 may be located on an opposite end of the tray 200 from the back side 230. Similarly, the left side 232 may be located on an opposite side of the tray 200 from the right side 234. Therefore, the front side 221 may be structurally attached to the left side 232 and to the right side 234. Similarly, the back side 230 may be structurally attached to the left side 232 and to the right side 234.

The various sides may be attached or otherwise coupled in a number of manners. In some embodiments, the sides 221, 230, 232, 234 of the sidewall 220 may be connected with brackets or the like. In some embodiments, the sides 221, 230, 232, 234 of the sidewall 220 may be portions of a single, monolithic or otherwise continuous structure. Therefore, the various sides 221, 230, 232, 234 of the sidewall 220 may be configured in a variety of ways.

The tray 200 may include a top portion 222. The top portion 222 may include an upper portion or portions of the sidewall 220. In some embodiments, the top portion 222 includes top portions of the sides 221, 230, 232, 234 of the tray 200. As shown, the top portion 222 may include upper segments of each of the front side 221, the back side 230, the left side 232 and the right side 234. In some embodiments, the top portion 222 may be the top half of the sides 221, 230, 232, 234. However, the top portion 222 may be more or less than half of the sides 221, 230, 232, 234. The top portion 222 may include the top edge 223. Therefore, the top portion 222 may include an upper part or segment of the various sides 221, 230, 232, 234 as well as the top edge 223. For example, the top portion 222 may include an upper segment of the front side 221 as well as the front edge 214 of the tray body 210. In some embodiments, the top portion 222 further includes upper segments or parts of a track 226, which is discussed in further detail herein, for example with respect to FIGS. 2I-2J. The top portion 222 may include various surfaces of the various sides 221, 230, 232, 234. For example, the top portion 222 may include both interior and exterior surfaces of the sides 221, 230, 232, 234. In some embodiments, the top portion 222 includes interior and exterior surfaces of the front side 221 as well as various surfaces of the top edge 223. Therefore, the top portion 222 is not limited to a particular side or area of the various components of the tray 200.

The tray 200 may further include a bottom portion 224. In some embodiments, there are multiple bottom portions 224. The bottom portion 224 may refer to a lower segment or area of the various sides 221, 230, 232, 234 of the tray body 210. In some embodiments, the bottom portion 224 includes lower segments of the sidewall 220. As shown, the bottom portion 224 may include lower segments of the front side 221, the back side 230, the left side 232 and the right side 234. The bottom portion 224 may further include some or all of the bottom edge 225. As shown, the bottom portion 224 may include the bottom edge 225 along with the lower segments of the various sides 221, 230, 232, 234. In some embodiments, the bottom portion 224 includes portions of the various sides of the sidewall 220 other than the top portion 222. Therefore, the bottom portion 224 may be distinct from the top portion 222. However, in some embodiments, the bottom portion 224 may overlap with the top portion 222. In some embodiments, the bottom portion 224 may further include some or all of a bottom side 260 of the tray body 210, as is discussed in further detail herein, for example with respect to FIGS. 2A-2D and 2F.

The tray 200 may include one or more handles 212. The handles 212 may be a structural component of the tray body 210 by which a person can grab the tray 200. As shown in FIG. 2A, the handle 212 may be formed by one or more portions of the sidewall 220. For example, the handles 212 may be defined by the front side 221 and the back side 230. The front side 221 may have material cut out of it in the top portion 222 to define a handle 212 on the front of the tray 200. Likewise, the back side 230 may have material cut out of it in the top portion 222 to define a handle 212 on the back of the tray 200. There may be two handles 212. In some embodiments, there may be more or fewer than two handles 212.

The tray body 210 may further include one or more feet 272. The feet 272 may be structural protrusions extending laterally outward from one or more sides of the sidewall 220. The feet 272 may be rectangular protrusions extending outward from the right side 234 and from the left side 232 (not shown). The feet 272 may define a space on the inside of the perimeter of the feet 272. As shown, the feet 272 may include a generally rectangular border defining a generally rectangular space therein. The feet 272 may be formed from the same or similar materials as other parts of the tray 200. For example, the feet 272 may be formed from the same material as the part of the sidewall 220 from which they extend, for instance a plastic, polymer, metal, other suitable materials and/or combinations thereof. The feet 272 may be located at various locations of the sidewall 220. There may be two feet 272 each on the right side 234 and on the left side 232 (not shown). One of the feet 272 on the right side 234 may be located near the front side 221 and the other near the back side 230. In some embodiments, the feet 272 are not located symmetrically with respect to the front and back sides 221, 230 but are rather biased to one side or the other. As shown, the locations of the feet 272 on the left and right sides 232, 234 are biased toward the front side 221. Therefore, the feet 272 may be offset or otherwise biased to one or more sides of the tray 200. Other suitable configurations may be implemented.

The locations of the feet 272 may allow for certain functionalities of the tray 200. For example, the locations of the feet 272 may allow for multiple trays 200 to be stacked on top of each other and/or nested together, as is discussed in further detail herein, for example with respect to FIGS. 2Q-2R.

The tray 200 may include one or more pads 273. The pads 273 may be features of the feet 272. As shown, the pads 273 include lower surfaces of the feet 272. In some embodiments, the pads 273 are lower surfaces and/or edges of the feet 272. The pads 273 may provide features for contacting other parts of the tray 200 when multiple trays are stacked or nested. The pads 273 may be formed from the same or similar materials as the sidewall 220 and/or the feet 272, for example plastic, polymer, metal, other suitable materials and/or combinations thereof.

The tray 200 may include one or more pad edges 299. The pad edges 299 may be external protrusions of the sidewall 210. The pad edges 299 may extend along the top portion 222 of the sidewall 210. In addition or alternatively, the pad edges 299 may extend along other portions of the tray 200, such as the bottom portion 224. The pad edges 299 may serve a similar function as the pads 273. In some embodiments, the pad edges 299 of a first tray 200 rest on some or all of the top edge 223 of a second tray 200 into which the first tray 200 is nested. The pad edges 299 may extend along the outside of the sidewall around the entire perimeter of the tray body 210, such that it rests along most or all of the top edge 223 of another tray 200 when nested with that other tray 200. In some embodiments, the pad edges 299 may not be used to nest the trays 200.

The tray 200 may include one or more recesses 276. As shown in FIG. 2A, the recesses 276 may be formed in structural projections of the sidewall 220. FIG. 2A shows four recesses 276 formed in structural features that project from the inside of the sidewall 220 into the cavity 236 toward the interior of the tray body 210. The recesses 276 may also be formed by projections on the outside of the sidewall 220. The recesses 276 may be defined by or otherwise formed in the top of the projections. There may be more or fewer than four projections defining four recesses 276. The locations of the recesses 276 may be biased to one side or the other, such as toward the front side 221 as shown in FIG. 2A.

In some embodiments, the recesses 276 may have a length that is the same or similar as a length of the pads 273 of the feet 272. In some embodiments, the recesses 276 of a first tray 200 may receive the pads 273 from a second tray 200 in order to stack the two trays 200, as is discussed in further detail herein, for example with respect to FIGS. 2Q and 2R.

The tray 200 may include one or more pockets 274. The pockets 274 may be features of the tray 200 formed in or otherwise defined by one or more sides of the sidewall 220. As shown in FIG. 2A, the left side 232 includes two pockets and the right side 234 includes two pockets 274 (not shown). However, there may be more or fewer pockets 274. Further, the pockets 274 may be located on the other side of the tray body 210, for example the front side 221 and/or the back side 230. The pockets 274 may be portions of the various sides of the sidewall 220 where material has been removed. For example, the various sides of the sidewall 220 may have indentations which form the pocket 274. As shown, the pockets 274 heavy a generally rectangular shape and may include a portion of the top edge 223. The pockets 274 may further include edges that are shared with the sidewall 220. The pockets 274 may be in various locations along the respective side of the sidewall 220. As shown in FIG. 2A, the pockets 274 may be biased toward the back side 230. In some embodiments, the pockets 270 274 are located near or adjacent the recesses 276. By biasing the pockets 270 to one side, multiple trays may be nested together, as is discussed in further detail herein, for example with respect to FIGS. 2Q and 2R. These are just some possible configurations of the pockets 274 and the recesses 276. Other suitable arrangements may be implemented.

The pockets 274 may have a width that allows them to receive the feet 272 of another tray 200. For example, the pockets 274 may have a width that allows the pockets 274 to receive generally rectangular shaped feet 272. Further, the pockets 274 may have a depth that allows the feet 272 of another tray 200 to enter and slide into the pocket 274 to allow another tray 200 to nest within the tray 200, as is discussed in further detail herein, for example with respect to FIGS. 2Q and 2R.

The tray 200 may include a bottom side 260. The bottom side 260 may be a side of the tray body 210 that is located at or near the lower part of the tray body 210. The bottom side 260 may be a structural component that can hold the item or items 15, or other parts of the tray. The bottom side 260 may be formed from the same or similar materials as other parts of the tray 200. For example, the bottom side 260 may be plastic, polymer, metal, other suitable materials and/or combinations thereof. The bottom side 260 may further define a window 264, as is discussed in further detail herein, for example with respect to FIGS. 2F and 2I. The bottom side 260 may be a stationary portion of the bottom part of the tray body 210. For example, the bottom side 260 may be a flange or other structural component that extends around the perimeter of the bottom of the tray 200. Therefore, many different configurations and features of the bottom side 260 may be implemented. The bottom side 260 is discussed in further detail herein for example with respect to FIGS. 2F and 2I.

The tray 200 may further include one or more protrusions 228. As shown in FIG. 2A, the protrusion 228 may be an inner edge of one or more of the sides of the tray sidewall 220. The protrusion 228 may provide support or stability to the item (not shown) inside the tray cavity 236. As shown, the protrusion 228 may extend along the back side 230 near the vertical midpoint of the back side 230. The protrusion 228 in FIG. 2A is an elongated protrusion on the interior of the sidewall 220. The protrusion 228 may further run along the left side 232 and/or the right side 234. In some embodiments, the protrusion 228 may also be located on the front side 221. Another embodiment of the protrusion 228 is shown in FIG. 2B. As shown, the protrusion 228 may be elongated vertically and extend up from the bottom side 260.

The tray 200 may further include one or more nesting supports 275. The nesting supports 275 may provide a support for nested trays 200. For example, one or more surfaces of the nesting supports 275 of a first tray 200 may have portions of a second tray 200 resting on or otherwise contacting the top of the surfaces of the support 275 of the first tray 200. The nesting support 275 may extend vertically for only a portion of the sidewall 220, such that when another tray 200 is nested within the cavity 236, the cavity 236 receives part of the other tray 200. In some embodiments, a first tray 200 receives some or all of the bottom portion 224 of a second tray 200 that is nested within the cavity 236 of the first tray. The nesting configuration of trays 200 is discussed in further detail herein, for example with respect to FIGS. 2Q-2R.

As shown in FIG. 2A, the tray 200 may include one or more tracks 226. Only a top portion of the tracks 226 are shown. The tracks 226 may be a structural component of one or more sides of the sidewall 220. In some embodiments, the track 226 is an elongated structure extending vertically on an interior side of one or more of the sides of the sidewall 220. The track 226 may be a protrusion extending towards the interior of the tray 200 into the cavity 236. In some embodiments, the track 226 is formed from the same material as one or more sides of the sidewall 220. As shown, the tray 200 includes two tracks 226 extending vertically along an interior surface of the front side 221. Other configurations and orientations of the track 226 are possible. The track 226 or tracks 226 may provide a structural component that allows for movement of other features of the tray 200, as is discussed in further detail herein, for example, with respect to FIGS. 2I-2J. For instance, the tracks 226 may provide a structure along which a moveable bottom 240 may move.

The tray 200 may include a moveable bottom 240. The moveable bottom 240 may be a structural component of the tray 200 formed from a variety of materials. The moveable bottom 240 may be formed from, for example, plastic, polymer, metal, other suitable materials and/or combinations thereof. In some embodiments, the moveable bottom 240 is a generally planar structure extending for much for most of the length and width of the cavity 236. The moveable bottom 240 may therefore be located either entirely or partially within the cavity 236, depending on its position. The moveable bottom 240 may be one eighth of an inch (0.125") thick. The moveable bottom 240 may be thicker or thinner than one eighth of an inch (0.125"). The moveable bottom 240 may provide one or more surfaces to facilitate receiving items 15 within the cavity 236 of the tray 200, as is discussed in further detail herein, for example, with respect to FIGS. 3-4B.

The moveable bottom 240 may include a center portion 255. The center portion 255 may be a generally planar structure forming a central part of the moveable bottom 240. The center portion 255 may have a generally rectangular shape and a thickness of one sixteenth of an inch (0.063"). In some embodiments, the center portion 255 has other shapes and or thicknesses. The center portion 255 may therefore generally extend for a distance that is similar to the distance between the front side 221 and the back side 230 and/or the distance between the left side 232 and the right side 234 of the tray sidewall 220. The center portion 255 may have other suitable configurations and orientations. The center portion 255 may provide a surface upon which items 15 may be placed for loading and unloading items 15 within the tray 200.

The center portion 255 may include a top surface 242 and/or a bottom surface 243 (not shown). The top surface 242 may provide a feature of the moveable bottom 240 that receives the item 15. The top surface 242 may be generally flat and extend from one end of the center portion 255 to the other end. The top surface 242 may be located on the opposite side of the center portion 255 as the bottom surface 243. Therefore, the thickness of the center portion 255 maybe the distance between the top surface 242 and the bottom surface 243. The top surface 242 and or the bottom surface 243 may refer to portions of the center portion 255. In some embodiments, the top surface 242 and or the bottom surface 243 may be a separate feature from the center portion 255. For example, the top surface 242 may include a surface finish or other feature to facilitate sliding the items 15 on or off the moveable bottom 240.

The moveable bottom may include one or more side portions 244. The side portions 244 may be structural components of the moveable bottom 240 that are located on one or more sides of the moveable bottom 240. As shown, there may be two side portions 244 located on opposite sides of the center portion 255. The side portions 244 may be in other locations. The side portions 244 may be formed from the same or similar materials as a center portion 255. For example, the side portions 244 may be plastic, polymer, metal, other suitable materials and/or combinations thereof. The side portions 244 may extend along sides of the center portion 255 and extend generally vertically therefrom. The side portions 244 may be flaps along the side sides of the moveable bottom 240. The side portions 244 may be entirely within the cavity 236 of the tray 200 or they may extend outside of the cavity 236, depending on the position of the moveable bottom 240.

As shown, portions of the side portions 244 may extend above the top edge 223 of the tray body 210. Therefore, some of the side portions 244 may be lower than the top edge 223 and other parts of the side portions 244 may be higher than the top edge 223. The side portions 244 may be integral with the center portion 255. In some embodiments, the side portions 244 may be separate parts of the moveable bottom 240 that are coupled with the center portion 255. For example, the side portions 244 may be coupled with the center portion 255 by hinges or other mechanical attachments. The side portions 244 may be rigid or flexible. The side portions 244 may be able to move with respect to the center portion 255. For example, the end portions 246 may be able to be rotate about the interface with the center portion 255. For instance, the side portions 244 may be flaps that can move from side to side. The side portions 200 may help guide the items 15 being loaded or unloaded into the tray 200. In some embodiments, the side portions 244 have a height similar to the height of the bottom portion 224 of the tray body 210. However, the side portions 244 may be taller or shorter than the bottom portion 224.

The moveable bottom 240 may include one or more end portions 246. The end portion 246 may be a structural component of the moveable bottom 240 on one or more ends of the moveable bottom 240. As shown, in FIG. 2A, the end portion 246 may be coupled with one of the ends of the center portion 255. The end portion 246 as shown in FIG. 2A may have a generally rectangular and/or planar shape. The end portion 246 may extend for some or all of the width of the center portion 255. As shown in FIG. 2A, the end portion 246 extends for less than the width of the center portion 255. FIG. 2A depicts merely one example of the end portion 246, and other configurations, orientations and shapes are possible.

The moveable bottom may include a front end 247. The front end 247 may include one or more portions of the moveable bottom 240. The front end 247 may include a front portion of the center portion 255. The front end 247 may also include parts of the end portions 246. Therefore, the front end of the moveable bottom 240 may include a foreword part of the center portion 250 and forward parts of the end portions 246. The front end 247 may further include forward portions of the top surface 242 and or forward portions of the bottom surface 243 (not shown). The front end 247 may provide features for movement of the moveable bottom 240 relative to the body 210 of the tray 200, as discussed in further detail herein, for example with respect to FIGS. 2I-2O.

The moveable bottom may include a front edge 248. The front edge 248 may be an edge or edges of the front end 247. As shown, the front edge 248 extends between the side portions 244 along an edge of the front end 247. The front edge 248 may be generally straight or linear. In some embodiments, the front edge 248 may extend along different contours, for example curved, or combinations of curved and straight. Further, the front edge 248 may define various features of the moveable bottom 240. As shown, the front edge 248 extends toward the center portion 255 at two locations. These two locations roughly correspond to the locations of the two tracks 226. The front edge 248 may extend in this direction to form one or more notches 250, as is discussed in further detail herein, for example, with respect to FIGS. 2E and 2P. These are just some examples of the contours and the shapes that the front edge 248 may include. Other contours and shapes are possible.

The moveable bottom may include a back end 241. The back end 241 may refer to a back part of the moveable bottom 248. As shown, the back end 241 may include a back part of the center portion 255. The back end 241 may further include rearward portions of the side portions 244. The back end 241 may be located on an opposite end of the moveable bottom 240 as compared to the front and 247. As shown, the back and 241 is located opposite from the front and 247.

Further, the back and 241 may include portions of the top surface 242 and/or the bottom surface 243 (not shown).

The moveable bottom 240 may include a back edge 245. The back edge 245 may refer to one or more edges of various parts of the moveable bottom 240. As shown, the back edge 245 may include an edge of the back end 241. The back edge 245 may further include one or more edges of the center portion 255. As shown, the back edge 245 may extend along the width of the moveable bottom 240 from one side to the other. As shown, the back edge 245 may extend from one side portion 244 to the other side portion 244. Further, the back edge may have various shapes and or contours. As shown, the back edge 245 may extend towards the center portion 255. The back edge 245 may extend in this or other directions to define one or more features of the moveable bottom 240. As shown, the back edge 245 may extend towards the center portion 255 to define one or more notches 252, as is discussed in further detail herein, for example, with respect to FIGS. 2E and 2P. The notches 252 defined by the back edge 245 may allow the moveable bottom 240 to move further towards the back side 230 of the tray body 210.

FIG. 2B is a perspective view of another embodiment of the tray 200. The tray 200 shown in FIG. 2B may be the same or similar as the tray 200 shown in FIG. 2A but with the following differences. As shown in FIG. 2B, the handle or handles 212 may protrude from one or more parts of the sidewall 220. The handle 212 visible in FIG. 2B extends laterally outward from the front side 221, and another handle 212 (not shown) extends laterally outward from the back side 230. Therefore, many different configurations of the handle 212 are possible.

As further shown in FIG. 2B, the feet 272 may be biased towards the back side 230. There may further be three feet 272 on a single side of the tray body 210.

The recesses 276 may also be formed in or otherwise defined by the top edge 223 of the tray body 210. The recesses 276 may extend along a distance of the top edge 223. As shown in FIG. 2B, four portions of the top edge 223 may define four recesses 276. There may be more or fewer than four recesses 276 defined by the top edge 223. The recess 276 may be a portion of the top edge 223 where material has been removed. In some embodiments, the recess 276 includes a surface that is lower than surfaces of the top edge 223 that are adjacent to the recess 276. The locations of the recesses 276 may be biased toward the back side 230.

As shown in FIG. 2B, the pockets 274 may be biased toward the front side 221. Thus, the pockets 274 may be biased toward different sides in different embodiments.

A protrusion 228 may protrude towards the interior cavity 236 and provide stability to an item 15 placed inside the tray cavity 236. In FIG. 2B, only one protrusion 228 is shown, however there may be multiple protrusions 228. Further, the protrusion 228 shown in FIG. 2B may, in addition or alternatively, be located along another side of the sidewall 220, such as the left side 232, the right side 234, and/or the front side 221.

As shown in FIG. 2B, the end portion 246 of the moveable bottom 240 include multiple segments. The end portion 246 may have a middle segment and two end segments (only one of the end segment are shown) with a longer middle segment and shorter end segments. Further, the end portion 246 may define a space in between the various segments, such as a notch 252, as discussed in further detail herein, for example, with respect to FIGS. 2E and 2P. The space or spaces defined by the end portion 246 may receive a protrusion 228. Because the protrusion 228 may extend into the cavity 236, the spaces defined by the end portion 246 may allow the moveable bottom 240 to move further back in the tray body 210 towards the back side 230.

The moveable bottom 240 may be in a variety of positions. As shown in FIGS. 2A-2B, the moveable bottom 240 may be in a first position. In the first position, the moveable bottom 240 may be angled with respect to the body 210 of the tray 200. In some embodiments, in the first position the front end 247 may be coupled with the top portion 222.

The front end 247 may be coupled with the top portion 222 in a variety of ways. In some embodiments, in the first position the front end 247 of the moveable bottom 240 may be near the top edge 223 of the tray body 210. As shown, in the first position the front end 247 may be adjacent to the top edge 223. In some embodiments, in the first position the first edge 248 of the moveable bottom 240 may be near the top edge 223 of the tray body 210. In some embodiments, the front edge 248 may be adjacent to the top edge 223.

In some embodiments, in the first position the front edge 248 may contact one or more parts of the tray body 210. For example, in the first position the front edge 248 may contact an interior surface and/or top surface of the front side 221. In some embodiments, in the first position the moveable bottom 240 may form a continuous surface with the top edge 223. For example, the center portion 255 of the moveable bottom 240 in the first position may form a continuous surface with the top edge 223 of the tray body 210. By continuous surface it is meant that the center portion 255 is contacting or is otherwise near the top portion 222 of the tray body 210 such that an item 15 may be easily and essentially uninterruptedly slid across the interface.

Figure 2C:
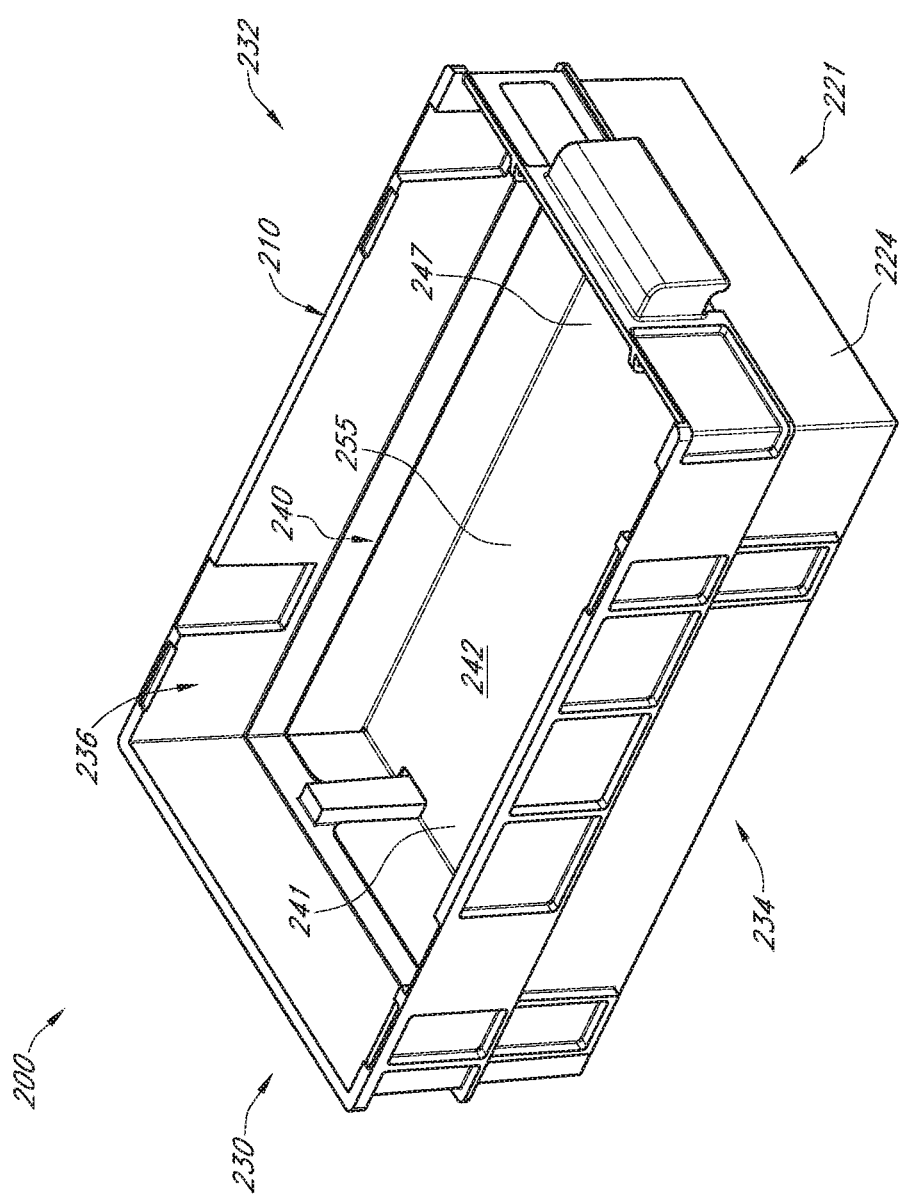
FIG. 2C is a perspective view of the tray of FIG. 2B with the moveable bottom oriented in a second position.
Figure 2D:
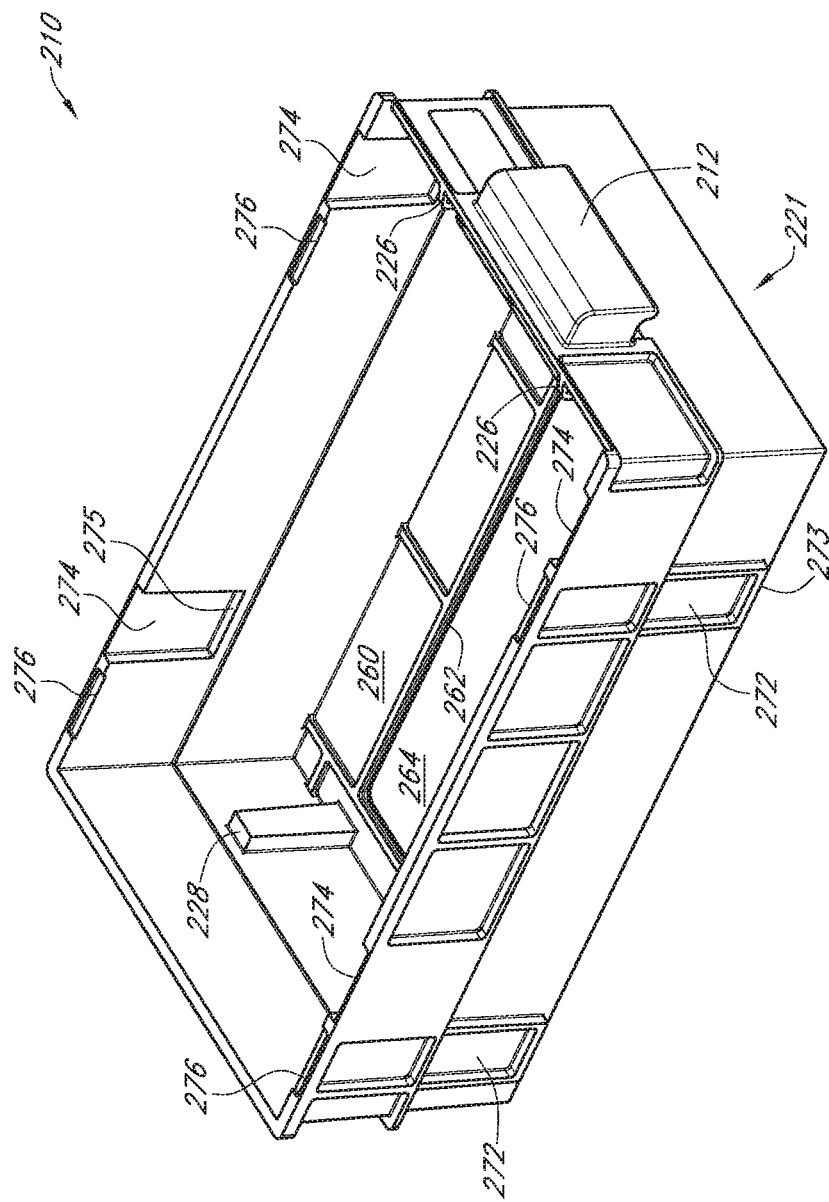
FIG. 2D is a perspective view of the tray of FIG. 2B without the moveable bottom.
Figure 2E:
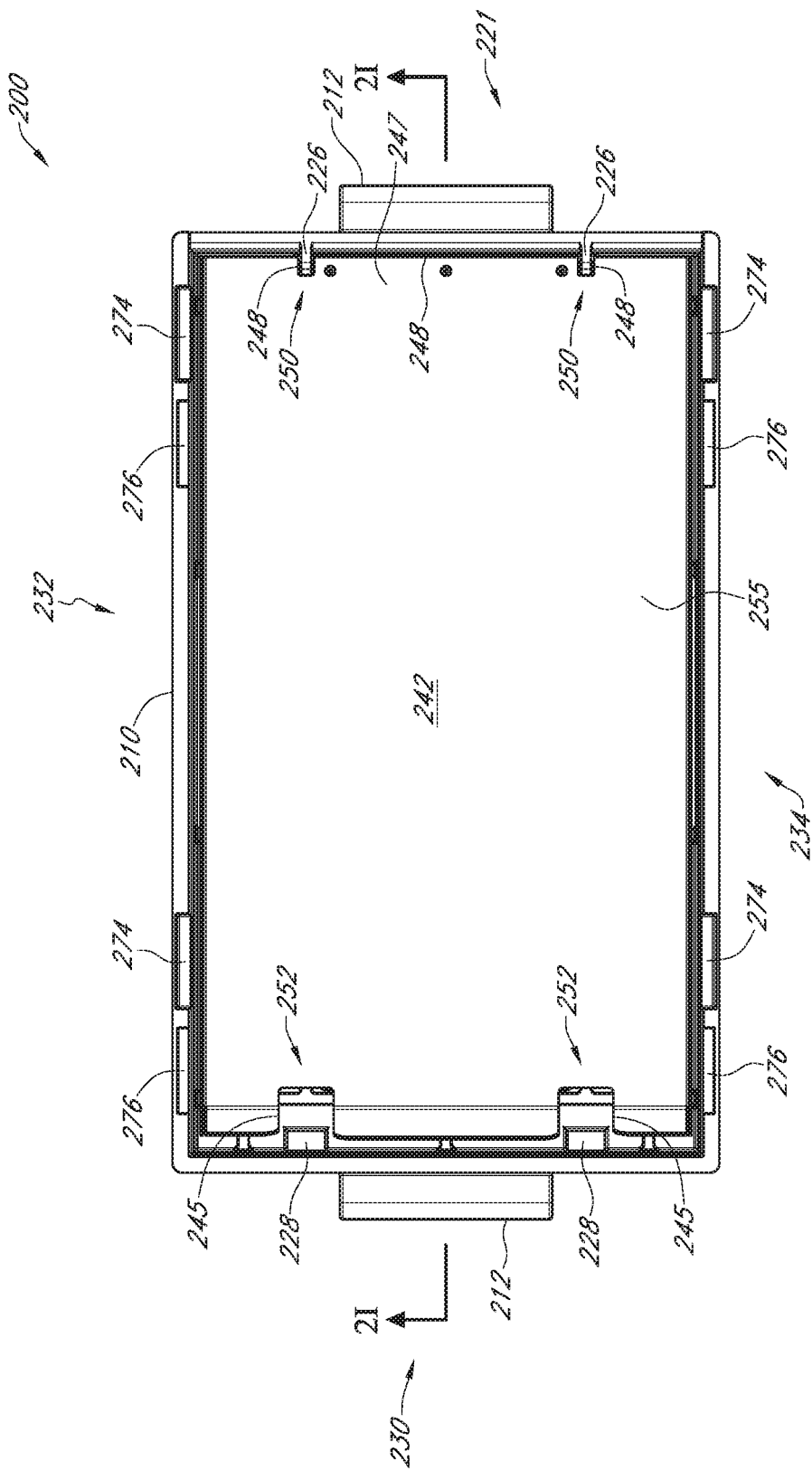
FIG. 2E is a top view of the tray of FIG. 2B.
Figure 2F:
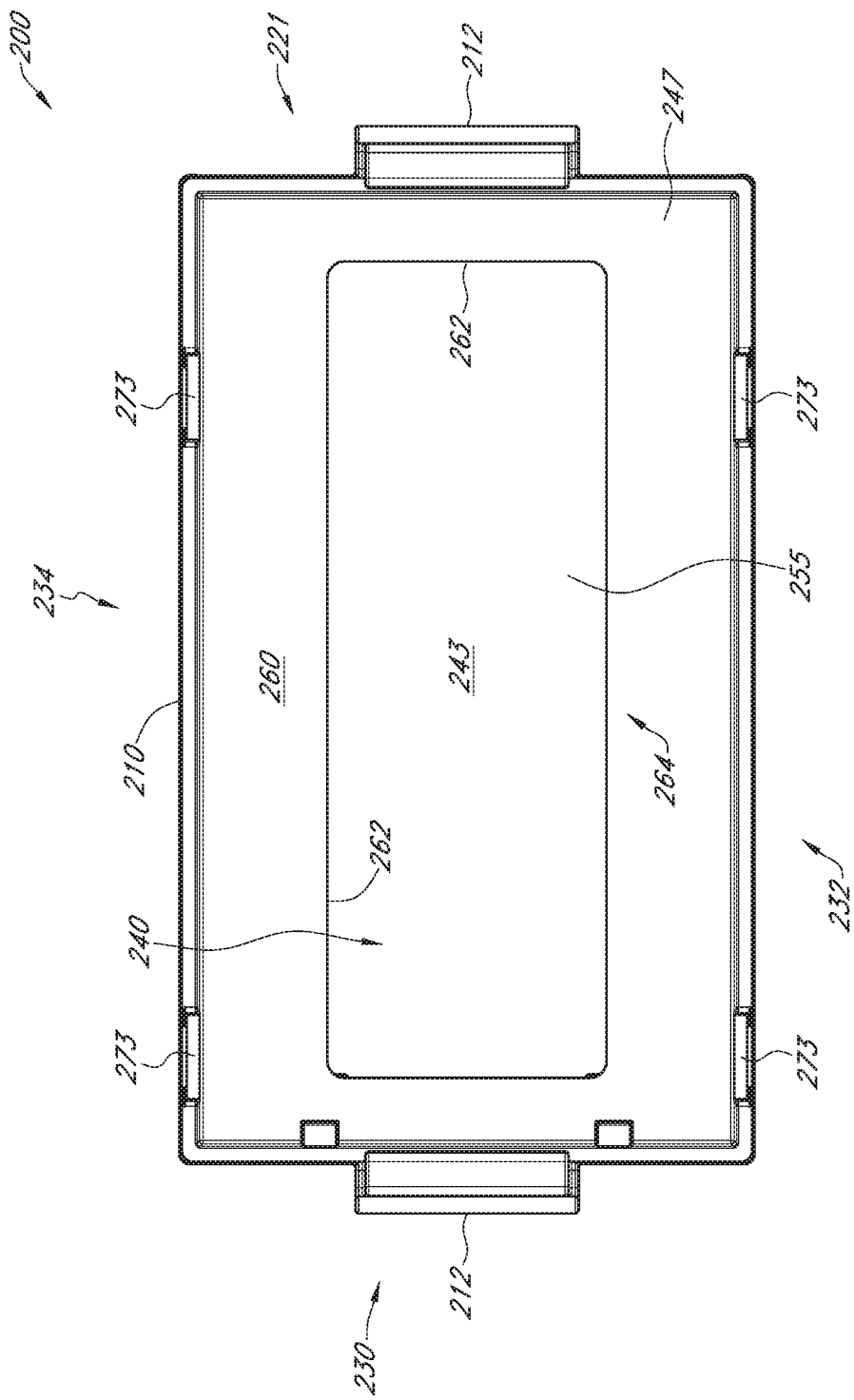
FIG. 2F is a bottom view of the tray of FIG. 2B.
Figure 2G:
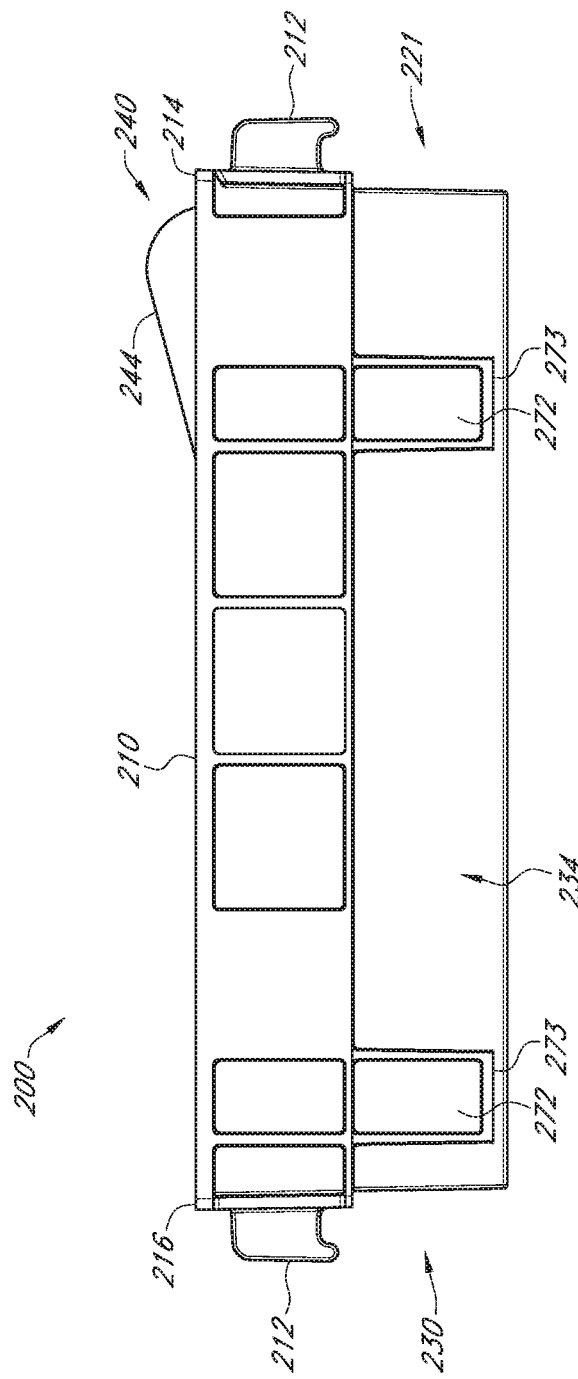
FIG. 2G is a right side view of the tray of FIG. 2B.
Figure 2H:
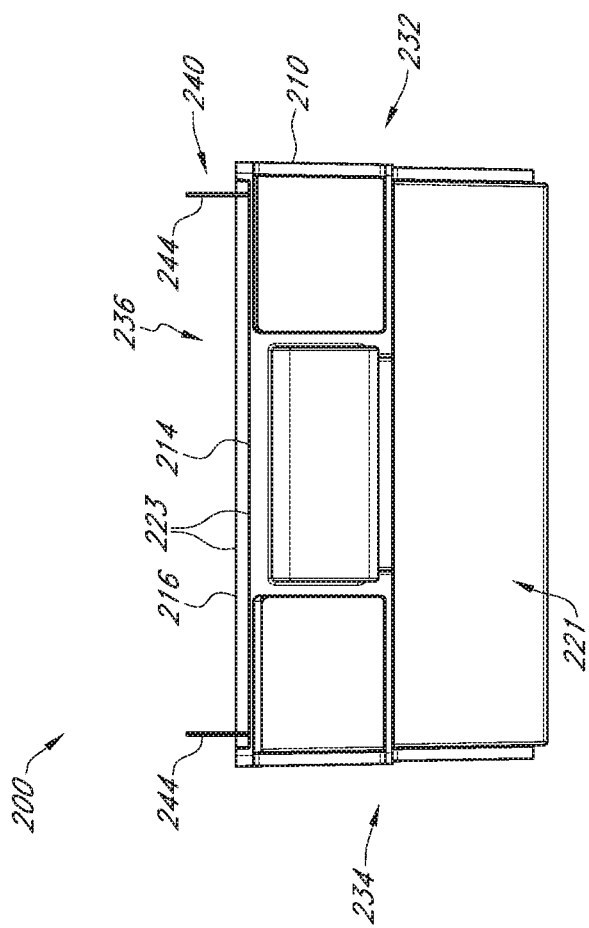
FIG. 2H is an end view of the tray of FIG. 2B.
Figure 2I:
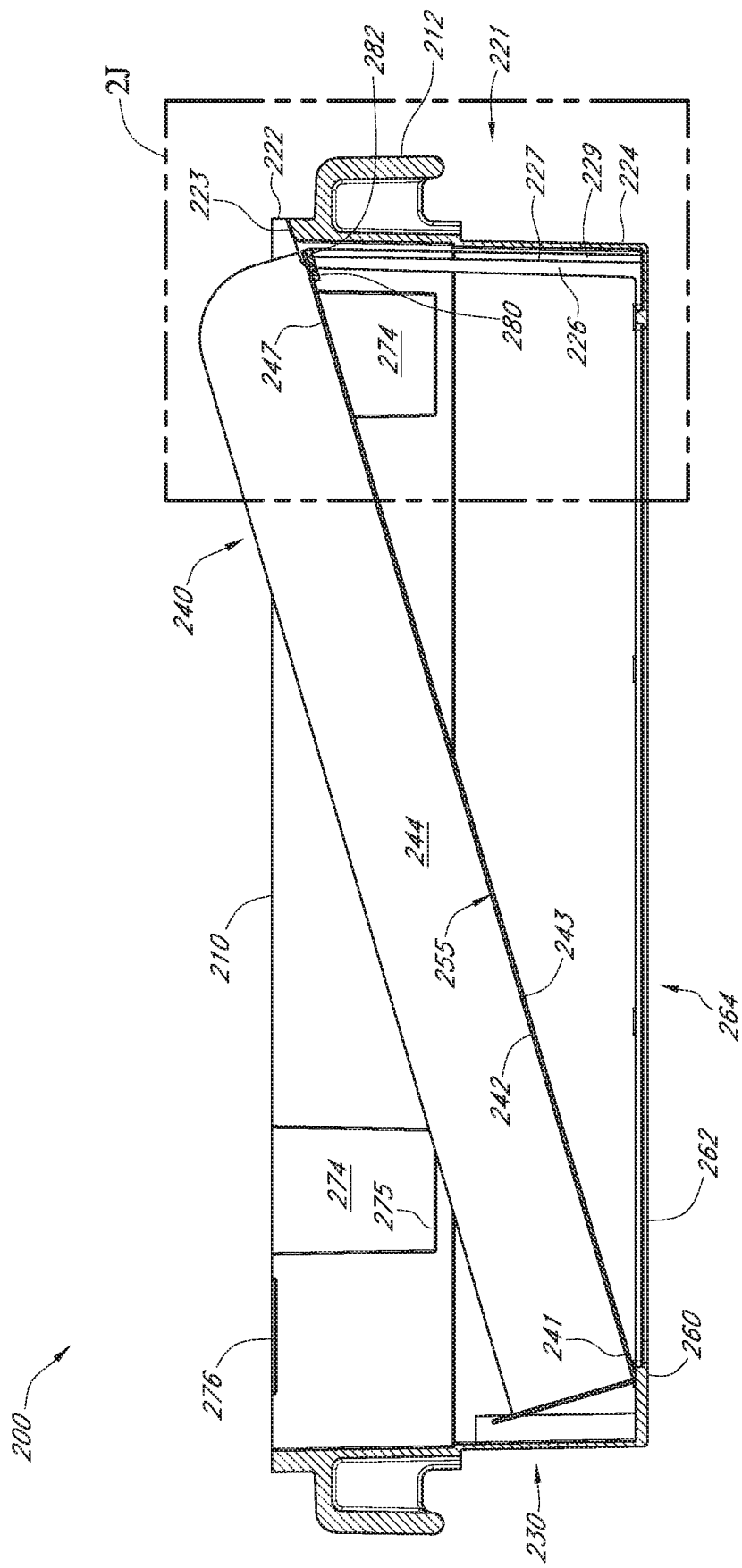
FIG. 2I is a cross section view of the tray of FIG. 2B as taken along the line 2I-2I as indicated in FIG. 2E, where the moveable bottom is oriented in the first position.
Figure 2J:
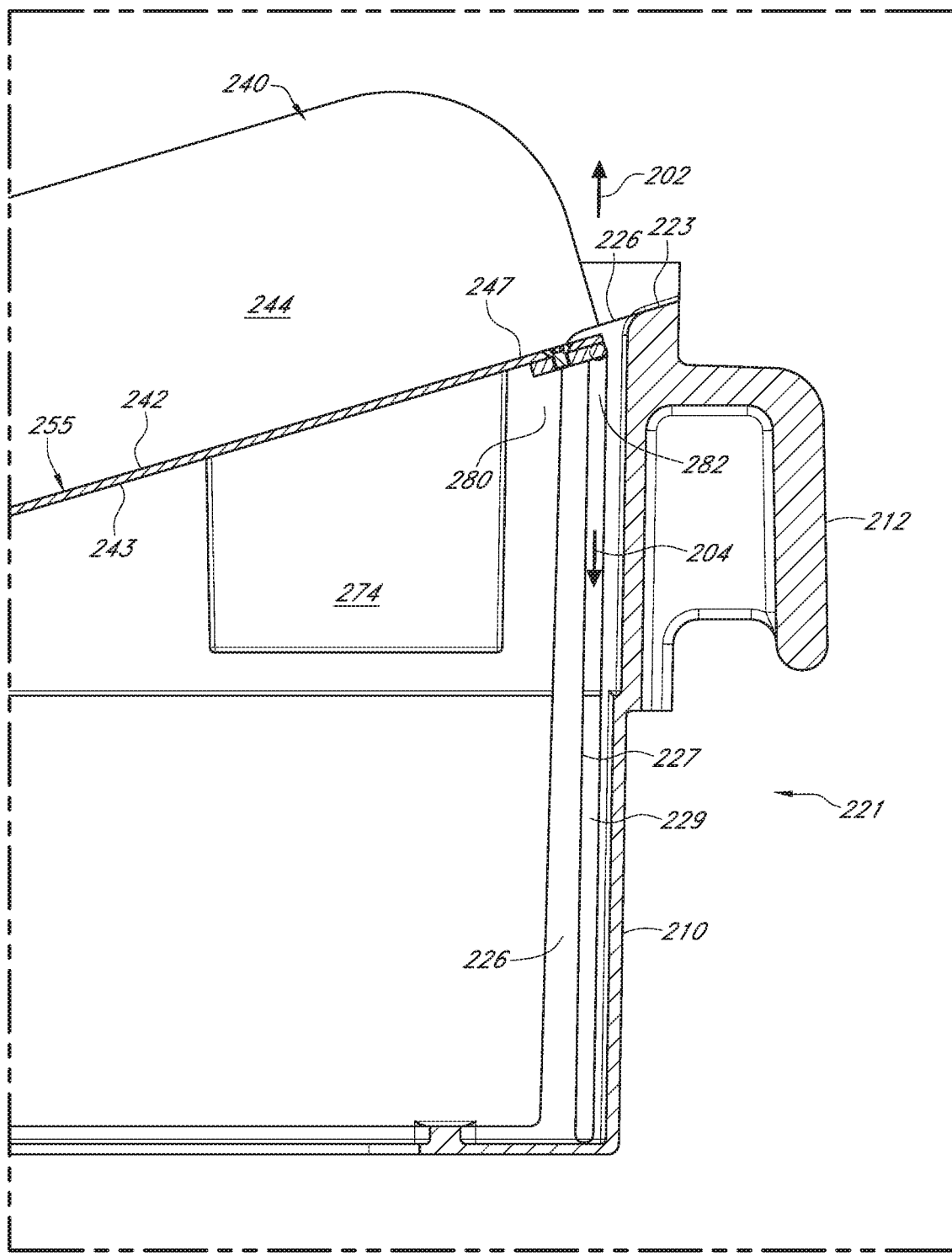
FIG. 2J is a detail view of the cross section of the tray taken from the area 2J as indicated in FIG. 2I.

As is discussed in further detail herein, for example, with respect to FIGS. 2I-2J, these or other features of the front end 247 of the moveable bottom 240 may be coupled with the top portion 220 of the tray body 210. As is discussed, in some embodiments, in the first position the front end 247 of the moveable bottom 240 may be coupled with the top portion 222 via the track 226.

In the first position, the back end 241 of the moveable bottom 240 may be near the bottom portion 224 of the tray body 210. In some embodiments, the back end 241 of the moveable bottom 240 may be resting on or otherwise contacting the bottom side 260, as is discussed in further detail herein, for example, with respect to FIG. 2I. The first position, and associated movements of components of the tray 200 to achieve the first position, are discussed in further detail herein, for example with respect to FIGS. 4C-4D.

Figure 2K:
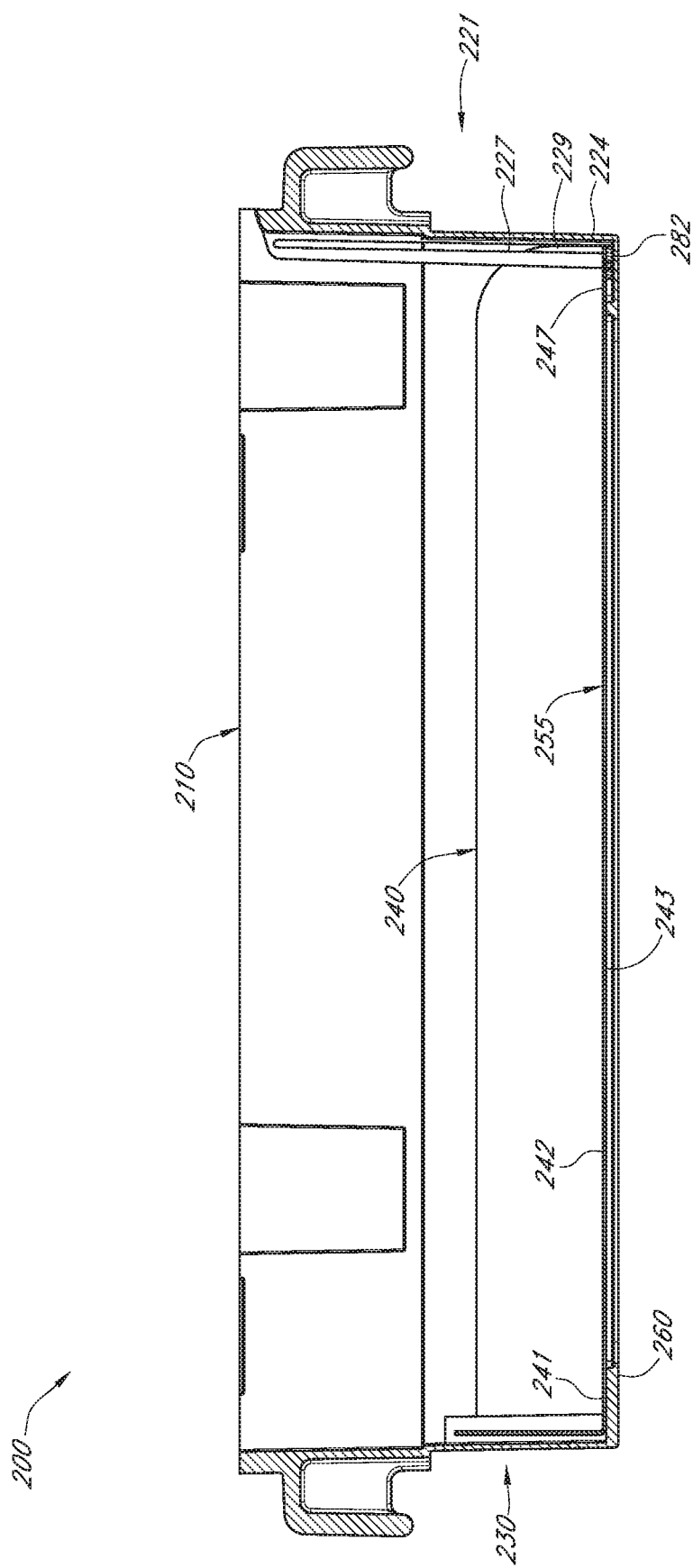
FIG. 2K is a cross section view of the tray of FIG. 2B as taken along the line 2I-2I as indicated in FIG. 2E, where the moveable bottom is oriented in the second position.

As shown in FIGS. 2C and 2K, the moveable bottom 240 may be in a second position. Referring to FIG. 2C, a perspective view of the tray 200 with the moveable bottom 240 oriented in the second position is depicted. As shown, in the second position the moveable bottom 240 may be received into a lower area of the cavity 236. In some embodiments, the moveable bottom 240 in the second position may rest on the lower parts or features of the tray body 210. For example, in the second position the moveable bottom 240 may rest on the bottom side 260 (not shown). In some embodiments, the center portion 255 of the moveable bottom may contact the bottom side 260. In some embodiments, the bottom surface 243 of the moveable bottom may rest on top of the bottom side 260.

The back end 241 of the moveable bottom 240 may be located physically closer to the back side 230 of the tray body 210 in the second position as compared to the first position. In some embodiments, the back end 241 may slide along the bottom side of 260 as the moveable bottom 240 moves from the first position to the second position, or vice versa. In the second position, in some embodiments, the end portion 246 of the moveable bottom 240 may butt up against an interior surface of the back side 230 of the tray body 210. In some embodiments, in the second position the back edge 245 of the moveable bottom may contact various features of the tray body 210, for example the protrusions 228 and/or the back side 230. In some embodiments, in the second position segments of the side portions 244 may also contact the back side 230. In some embodiments, in the second position the front end 247 of the moveable bottom 240 may be coupled with the bottom portion 224 of the tray body 210, as is discussed in further detail herein, for example, with respect to FIG. 2K. These are merely examples of how the moveable bottom 240 may be oriented within the tray body 210 in the second position. Other suitable configurations and arrangements may be implemented.

In the second position, the moveable bottom 240 may therefore lay flat near the lower parts of the tray body 210 such that the volume of space within the cavity 236 above the moveable bottom 240 may be greater as compared to this same volume with the moveable bottom 240 in the first position. The tray 200 may be used for transporting items within the cavity 236 when the moveable bottom 240 is in the second position. The second position, and associated movements of components of the tray 200 to achieve the second position, are discussed in further detail herein, for example with respect to FIGS. 4C-4D.

FIG. 2D is a perspective view of an embodiment of the tray body 210. The embodiment shown may be used with the tray 200 shown in FIG. 2B and/or other embodiments. As shown, the tray 200 is depicted without the moveable bottom 240. The tray body 210 may include an inner edge 262. The inner edge 262 may be a part of the bottom side 260. As shown the inner edge 262 may define an inside edge of the bottom side 260. The inner edge 262 may extend continuously along portions of the bottom side 260. One or more features may be defined by the bottom edge 262. For example, the bottom edge 262 may define an opening in the bottom side 260. In some embodiments, the inner edge 262 defines a window 264.

The tray 200 may include a window 264. The window 264 may be an opening in the tray 200. As shown, the window 264 may be an opening in the bottom side 260 defined by the inner edge 262. The inner edge 262 may define a window 264 with various shapes and sizes. As shown, the inner edge 262 may define a generally rectangular window 264, the shape of which is more clearly seen in FIG. 2F. The window 264 may provide an access into the cavity 236 through the bottom side 260. As is discussed in further detail herein, for example with respect to FIGS. 2Q-2R, the window 264 may provide access for one or more arms 415 that may move the moveable bottom 240.

The bottom side 260 may include various structural features or components. As shown, the bottom side 260 may include ribs. Other structural features and components of the bottom side 260 may be implemented.

As mentioned, the tray 200 may include one or more nesting supports 275. The nesting support 275 may be a lower portion of the nesting pocket 274. The nesting support 275 may provide a surface or surfaces on which the pads 273 of a second tray 200 may rest. For example, the nesting supports 275 of a first tray 200 may support the pads 273 of a second tray 200 that is nested within the first tray 200, as is discussed in further detail herein, for example, with respect to FIGS. 2Q-2R.

FIG. 2E is a top view of the tray 200. As shown, the moveable bottom 240 is located inside the tray body 210. In some embodiments, the sidewall 220 may completely encapsulate the moveable bottom 240. For example, the moveable bottom 240 may be entirely within the cavity 236 such that the front and 247 of the moveable bottom 240 is on the inside of the front side 221 and the back end 241 of the moveable bottom is on the inside of the back side 230. Similarly, the sides of the moveable bottom 240 may be on the inside of the left side 232 and the right side 234.

As mentioned, the moveable bottom may include a front edge 248 that defines one or more notches 250. As shown in FIG. 2E, the front edge 248 may define two notches 250. In some embodiments, there may be more or fewer notches 250. Further, there may be no notches 250. As shown, the front edge 248 may define two generally rectangular shaped notches 250 that align with the location of the tracks 226. The front edge 240 may therefore define notches 250 that receive the tracks 226. Other configurations are possible. The moveable bottom 240 may move along the tracks 226 with the tracks 226 within the notches 250 defined by the front edge 248.

As mentioned, the moveable bottom may include one or more back edges 245 that define one or more notches 252. As shown, the back edge 245 may define two notches 252 that align with the protrusion 228. In this manner, the notches 252 defined by the back edge 245 may receive the protrusion 228 therein. This may allow, for example, the back end 241 of the moveable bottom 240 to move closer to the back side 230 of the tray body 210. In some embodiments, the notches 252 defined by the back edge 245 allow the back end or ends 241 to contact the inside surface of the back side 230. For example, in the second position the moveable bottom 240 may contact the back side 230. The moveable bottom 240 may also contact the back side 230 in the first position, or any position in between the first and second positions.

As mentioned, and as more clearly seen in FIG. 2E, the nesting pockets 274 and/or the recesses 276 may be biased toward the front side 221 or toward the back side 230. As shown, the nesting pockets 274 may be biased towards the front side 221. Further, the recesses 276 may be biases towards the back side 230. This is merely one arrangement, and other suitable configurations are possible. For example, the recesses 276 maybe biased towards the front side 221. Similarly, the pockets 274 maybe biased towards the back side 230.

FIG. 2F is a bottom view of the tray 200. As shown, both handles 212 are visible. A first handle 212 is on the front side 221, and a second handle 212 is on the back side 230. Further shown is the bottom side 260. The inner edge 262 that defines the window 264 is also more clearly seen. As mentioned, the inner edge 262 of the bottom side 260 may be a continuous edge along an inner perimeter of the bottom side 260. The inner perimeter formed by the inner edge 262 may define an outer perimeter of the window 264. The inner edge 262 may extend along several linear straight portions to form straight sides and ends of the window 264. In some embodiments, the inner edge 262 may have generally straight sides with rounded corners in between. Therefore, the window 264 formed by the inner edge 262 may also have four generally straight sides. As shown, the window 264 is generally rectangular with longer sides and shorter ends. Other shapes and proportions of the window 264 are possible.

As further shown in FIG. 2F, portions of the moveable bottom 240 may be seen through the window 264. In some embodiments, portions of the center portion 255 of the moveable bottom 240 may be accessed through the window 264. Therefore, the moveable bottom 240 may be ask accessed through the window 264. In some embodiments, the bottom surface 243 of the center portion 255 may be accessed through the window 264. In some embodiments, other parts or portions of the moveable bottom 240 may be accessed through the window 264. As is discussed in further detail herein, for example, with respect to FIGS. 2Q-2R, features of the loading or unloading system, such as a arm 415, may contact the moveable bottom 240 through the window 264.

FIG. 2G is a right side view of the tray 200. The tray 200 is shown with the tray body 210 including the moveable bottom 240 therein. The moveable bottom 240 is shown in the first position where the front end 247 of the moveable bottom 240 is coupled with the top portion 222 of the tray body 210. This coupling is not shown in FIG. 2G but is shown and discussed elsewhere herein, for example with respect to FIGS. 2I-2J. In the first position, portions of the moveable bottom 240 may extend or protrude above in a vertical direction beyond the top edge 223 of the tray body 210. In some embodiments, in the first position the side portions 244 may extend above the top edge 223. As shown, portions of the side portions 244 may extend above the top edge 223. In some embodiments, portions of the side portions 244 that are near the front end 247 of the moveable bottom 240 may extend above the top edge 223.

FIG. 2H is a front view of the tray 200. As shown, and as previously discussed, the side portions 244 may extend above the top edge 223 of the tray body 210. In some embodiments, the side portions 244 are planar structures such that viewed from the front of the tray 200 the side portions 244 have a small profile extending upward from the cavity 236 beyond the top edge 223. The side portions 244 may further define the cavity 236. Therefore, the cavity 236 may refer to a volume of space that is enclosed by portions of the side portions 244 extending above the top edge 223.

Further shown in FIG. 2H is the front edge 214 and the back edge 216. In some embodiments, the back edge 216 may be located higher than the front edge 214 when the tray 200 is horizontal. Therefore, as viewed from the front, the back edge 216 may appear above the front edge 214 when the tray 200 is horizontal such that a small sliver of the interior of the back side 230 is visible. This is merely one configuration, and other configurations of the front edge 214 and the back edge 216 are possible.

FIG. 2I is a cross-section view of the tray 200. As shown in FIG. 2I, the moveable bottom 240 is in the first position. As mentioned, in the first position the moveable bottom 240 may be angled with respect to the tray body 210. For example, the center portion 255 of the moveable bottom 240 may be angled with respect to the bottom side 260 of tray body 210. In some embodiments, in the first position the back end 241 of the moveable bottom 240 may be on or near the part of the bottom side 260 that is near the back side 230. In some embodiments, in the first position the front end 247 of the moveable bottom 240 may be at or near the top portion 222 of the front side 221. In some embodiments, in the first position the front end 247 may be coupled with the top portion 222. By "coupled with," it is meant that the front end 247 is mechanically linked, either directly or indirectly, with the top portion 222. For example, the front end 247 may be directly connected to features of the top portion 222, including but not limited to an upper portion of the track 226, the front edge 214, other features of the front side 221, and/or combinations thereof.

In some embodiments, the front end 247 may be coupled with the top portion 222 indirectly by means of intervening parts. For example, the front end 247 of the moveable bottom 240 may be coupled with the top portion 222 by a bracket 280. The bracket 280 may be attached or otherwise coupled with the center portion 255 or other parts of the moveable bottom 240. In some embodiments, the front end 247 may be coupled with the top portion 222 by one or more projections 282. Further details of the bracket 280 and the projection 282 are discussed herein, for example, with respect to FIGS. 2L-2O. In some embodiments, the bracket 280 may be attached to the moveable bottom by fasteners. Other means of attaching may be used, such as bolts, screws, adhesive, other suitable means and/or combinations thereof. The projections 282 may extend laterally outward from the bracket 280 such that they couple with one or more features of the front side 221. In some embodiments, the projections 282 may couple with a slot 229 formed by an inner edge 227 of the track 226.

FIG. 2I further shows a side view of one of the tracks 226. As shown, the track 226 may extend vertically along an interior side of the front side 221 of the tray body 210. The track 226 may extend from the bottom side 260 up to the top edge 223. The track 226 may have the inner edge 227 extending continuously along an inner perimeter of the track 226 to form the slot 229. The slot 229 may therefore be an opening in the structure of the track 226 that may receive the projection 282. In some embodiments, the slot 229 may receive the projection 282 and allow the projection 282 to move within the slot 229 in a vertical direction while preventing the projection 282 from moving substantially in a front to back direction. As shown, the inner edge 227 may define a generally elongated slot 229 with rounded ends and generally straight sides. A close-up of the area 2J in FIG. 2I is given in FIG. 2J.

FIG. 2J is a detail view of the cross section of the tray 200 taken from the area 2J as indicated in FIG. 2I. As shown in FIG. 2J, the projection 282 may be captured within the slot 229 formed by the inner edge 227 of the track 226. The projection 282 may move up or down within the slot 229. For example, the projection 282 may move up in the direction indicated by the up arrow 202, or it may move down in the direction indicated by the down arrow 204. By moving in the direction indicated by the up arrow 202, the moveable bottom 240 may be placed into the first position. By moving down in the direction indicated by the down arrow 204, the moveable bottom 240 may be put into the second position. For example, one or more arms 415 may be brought to extend into the cavity 236 through the window 264, as the tray 200 moves down over the arms 415, in order to push on the moveable bottom 240 and thereby place the moveable bottom 240 into the first position whereby the front end 247 may be coupled with the top portion 222. The one or more arms 415 may retract out of the cavity 236 through the window 264 as the tray 200 is raised over the arms 415 and allow the moveable bottom 240 to move in the direction indicated by the down arrow 204 and thereby couple the front end 247 with the bottom portion 224.

As mentioned, the moveable bottom 240 may couple with the tray body 210 to form a continuous surface. In some embodiments, the front end 247 of the moveable bottom 240 may couple with the top portion 222 to form a continuous surface that includes the moveable bottom 240 and the top edge 223. For example, as shown in FIGS. 2I and 2J, the top surface 242 of the moveable bottom may form a continuous surface with the top edge 223. The top edge 223 may include a top surface of the track 226. By forming a continuous surface, and item 15 may easily slide in and out of the tray 200 along the moveable bottom 240 and the top edge 223.

For example, in the first position, the front end 247 and the top edge 223 may form a continuous surface such that the item 15 is not interrupted when sliding over the interface between the moveable bottom 240 and the tray body 210. As is discussed in further detail herein, for example, with respect to FIGS. 3-4B, this continuous surface may be augmented by parts of the loading system 10 and/or an unloading system 400.

FIG. 2K is a cross-section view of the tray 200 with the moveable bottom 240 oriented in the second position. As shown, in the second position the center portion 255 of the moveable bottom 240 may rest on the bottom side 260 of the tray body 210. In some embodiments, the front end 247 of the moveable bottom 240 may be coupled with the bottom portion 224 of the tray body 210. In some embodiments, the front end 247 may be coupled with the bottom portion 224 by having one or more slots 229 receive one or more projections 282. In some embodiments, the moveable bottom 240 is allowed to fall into the second position by raising the tray 200 thereby removing the arms 415 out of the window 264 of the tray 200. In some embodiments, the moveable bottom 240 may move between the first and second positions by sliding the projections 282 within the slots 229. For example, the moveable bottom 240 may be moved from the second position to the first position by pushing up on the moveable bottom 240 such that the projections 282 slide in an upward direction within the slots 229, such as from the bottom portion 224 to the top portion 222. Similarly, the moveable bottom 240 may be moved from the first position to the second position by sliding the projections 282 in a downward direction within the slots 229, such as from the top portion 222 to the bottom portion 224.

Figure 2L:
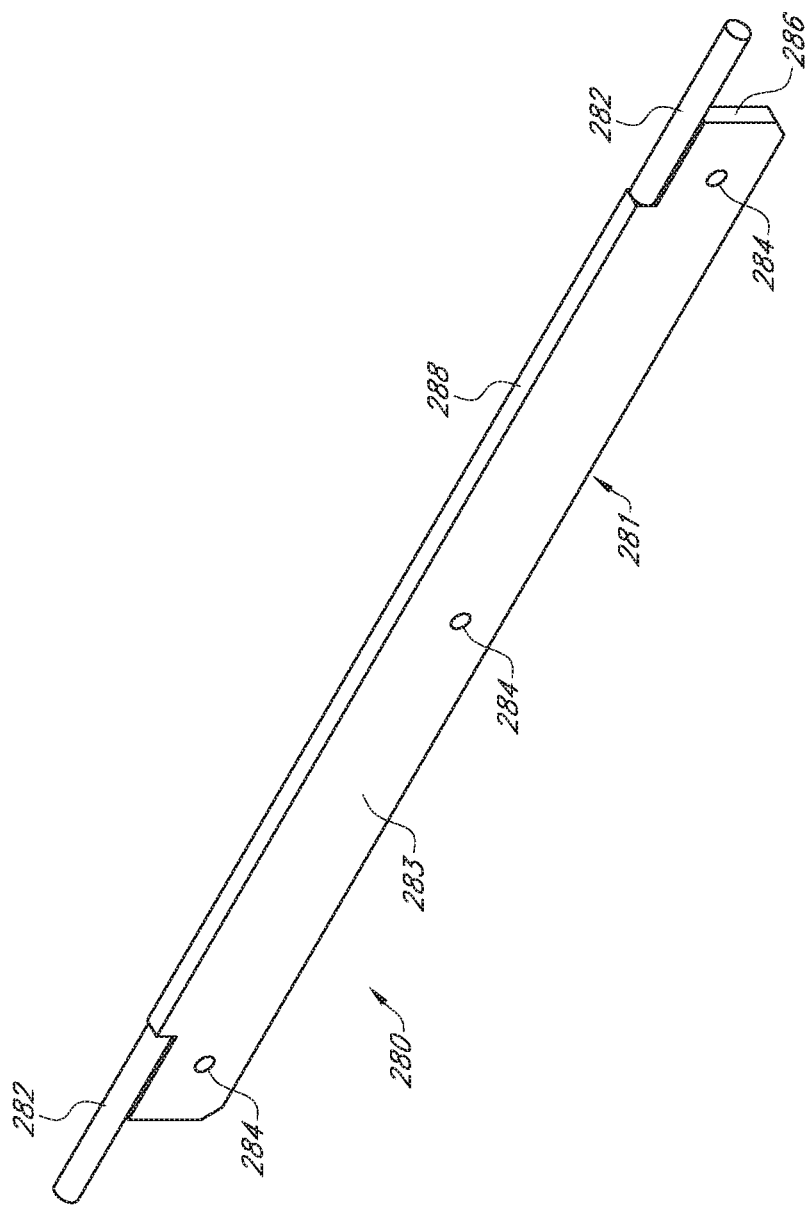
Figure 2M:
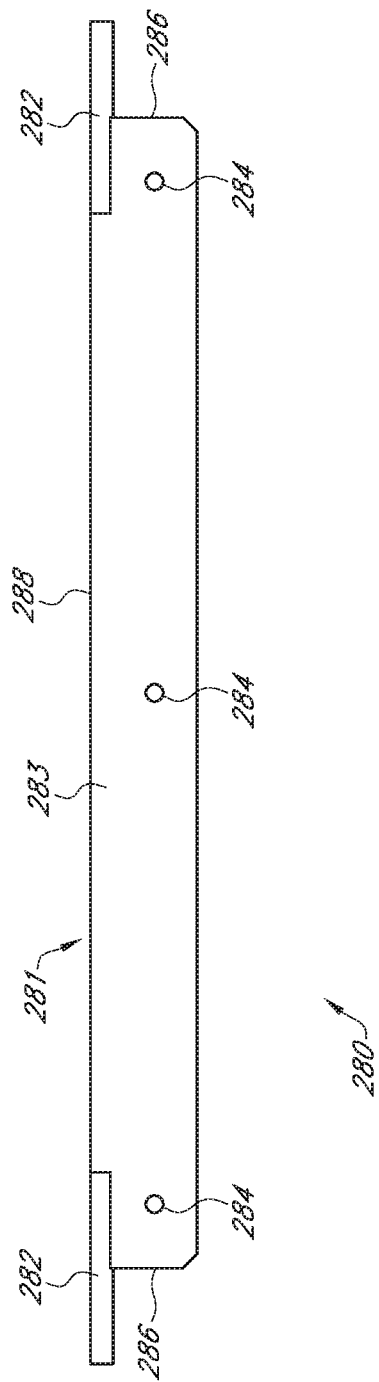
Figure 20:
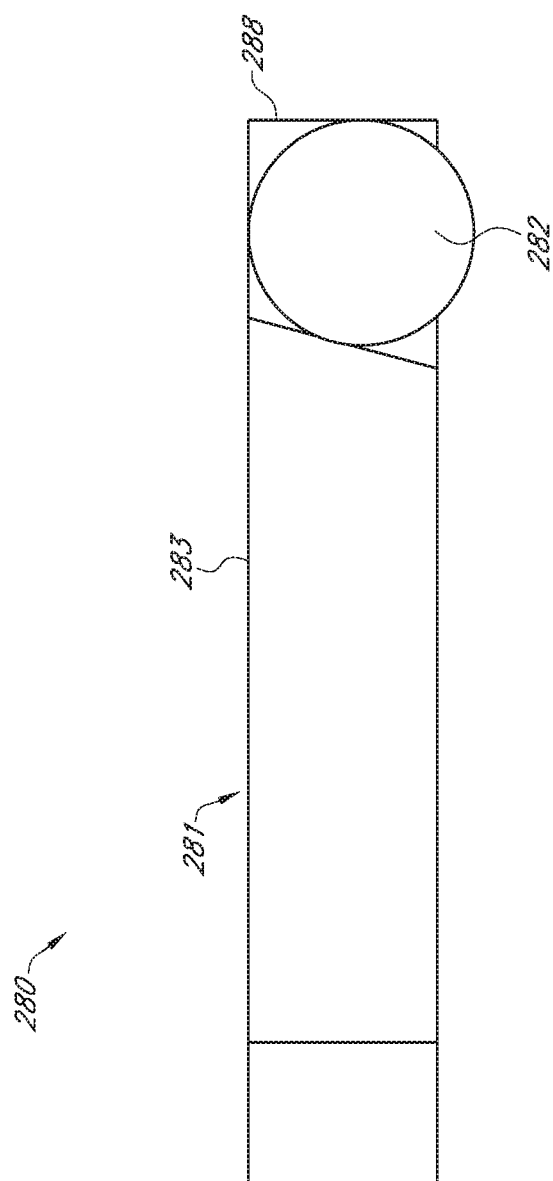

FIGS. 2L-2O are various views of a bracket 280 that may be used with the tray 200. FIG. 2L is a perspective view of the bracket 280, FIG. 2M is a top view of the bracket 280, FIG. 2N is a side view of the bracket 280, and FIG. 2O is an end view of the bracket 280.

Referring to FIGS. 2L-2O, the bracket 280 may include a bracket body 281. The bracket body 281 may be an elongated, rigid structure. The body 281 may be formed of various materials, including plastic, polymer, metal, other suitable materials and/or a combination thereof. The body 281 may include various surfaces or surface features. As shown, the bracket body may include a top surface 283. The top surface 283 may include the top side or sides of the bracket body 281. The top surface 283 may be formed from the same or similar materials as the bracket body 281. In some embodiments, the top surface 283 may include a surface coating and/or finish. The top surface 283 may have a generally rectangular shape. However, the top surface 283 may have a variety of shapes.

The bracket body 281 may include one or more end surfaces 286. The end surfaces 286 may refer to portions of the bracket body 281 on various ends of the body 281. As shown, there may be a first end surface 286 on a first end of the bracket body 281, and there may be a second end surface 286 on an opposite end of the bracket body 281. The end surfaces 286 may be formed from the same or similar materials as the top surface 283. The bracket body 281 may also include a front surface 288. The front surface 288 may be a surface of the bracket body 281 that is on the front side. As shown, the front surface 288 may be an elongated side of the bracket body 281 having a rectangular shape. The bracket body 281 may include other surfaces, for instance, there may be a bottom surface (not shown) opposite the top surface 283. Further, the bracket body 281 may include chamfers or beveled corners, for instance, at one or more corners of the top surface 283 or other portions of the body 281.

The bracket 280 may include one or more projections 282. The projections 282 may be elongated structures extending laterally from the bracket body 281. As shown, the projection 282 may be an elongated cylindrical component extending beyond the end surfaces 286. The projections 282 may be formed from the same or similar materials as the bracket body 281. For instance, the projections 282 may be formed from plastic, polymer, metal, other suitable materials and/or combinations thereof. In some embodiments, the projections 282 are metallic rods. The projections 282 may be solid or hollow or combinations thereof.

The projections 282 may have a circular profile, as shown in FIG. 2O. However, the projections 282 may have a different profile. For example, the projections 282 may have a profile that is partially circular and partially noncircular. The projections 282 may have a profile that includes rounded and straight segments. Therefore, the projections 282 may have a profile with a variety of different shapes.

The projections 282 may be integral parts of the bracket 280. For instance, the projections 282 may be integral with the bracket body 281. In some embodiments, the projections 282 are formed from the same piece of material as the body 281, such that the projections 282 and the body 281 are a single, monolithic part. In some embodiments, the projections 282 may be separate parts from the body 281. For example, the projections 282 may be attached or otherwise coupled with the body 281. The projections 282 may couple with the body 281 in a variety of suitable ways. For example, the projections 282 may screw into the body 281. This is merely one example, and other coupling means may be implemented, such as using fasteners, adhesive, other suitable means or combinations thereof.

The bracket 280 may include one or more holes 284. The holes 284 may extend through the bracket body 281 in a direction that is perpendicular to the plane of the top surface 283. As shown, there may be three holes 284. In some embodiments, there may be more or fewer than three holes 284. Further, the holes 284 may be spaced equal distances from each other, or they may be located at unequal distances from each other. The holes 284 may be threaded holes, through holes, or combinations thereof. The holes 284 may allow for the bracket 280 to be coupled with the moveable bottom 240. In some embodiments, the bracket 280 is coupled with the moveable bottom 240 by use of fasteners. For example, fasteners may be used to secure the bracket 280 to the moveable bottom 240 by inserting fasteners through the holes 284 in the bracket body 281 and through the holes 254 in the moveable bottom 240. This is merely one example of how the bracket 280 may be coupled with the moveable bottom 240. Other suitable coupling means may be implemented.

The bracket 280 may allow for the moveable bottom 240 to be coupled with the tray body 210. In some embodiments, the bracket 280 couples the front end 247 of the moveable bottom 240 to the front side 221 of the tray body 210. In some embodiments, the front end 247 may be coupled with the front side 221 by extending the projections 282 through the slots 229 of the tracks 226. In the first position, the front end 247 of the moveable bottom 240 may be coupled with the top portion 222 of the tray body 210 where the projections 282 extend through respective slots 229 of the tracks 226 at upper portions of the tracks 226. This may be done, for example, by pushing up on the moveable bottom through the window 264 of the tray body 210. In some embodiments, in the second position the front end 247 of the moveable bottom 240 may be coupled with the bottom portion 224 of the tray body 210 with the projections 282 extended through the slots 229 of the tracks 226 at lower portions of the track 226. The bracket 280 may also couple the moveable bottom 240 to the front side 221 in various positions other than the first and second positions. For example, the bracket 280 may couple the front end 247 to the front side 221 such that the moveable bottom is in a position that is in between the first and second position.

In some embodiments, the bracket 280 may be integral with the moveable bottom 240. For example, the bracket 280 and the moveable bottom 240 may be formed from the same piece of material such that the bracket 280 and the moveable bottom 240 are a single, monolithic part. Therefore, the moveable bottom 240 may include the bracket body 281 and or the projections 282. In some embodiments, the moveable bottom 240 includes projections 282 coupled directly with the center portion 255 or other portions of the moveable bottom 240. Therefore, many different configurations are possible—the projections 282 may be indirectly coupled with the moveable bottom 240, the projections 282 may be integral with the moveable bottom 240, or other configurations may be implemented. Thus the descriptions of one or more embodiments of the bracket 280 and the moveable bottom 240 are not meant to be limiting.

Figure 2P:
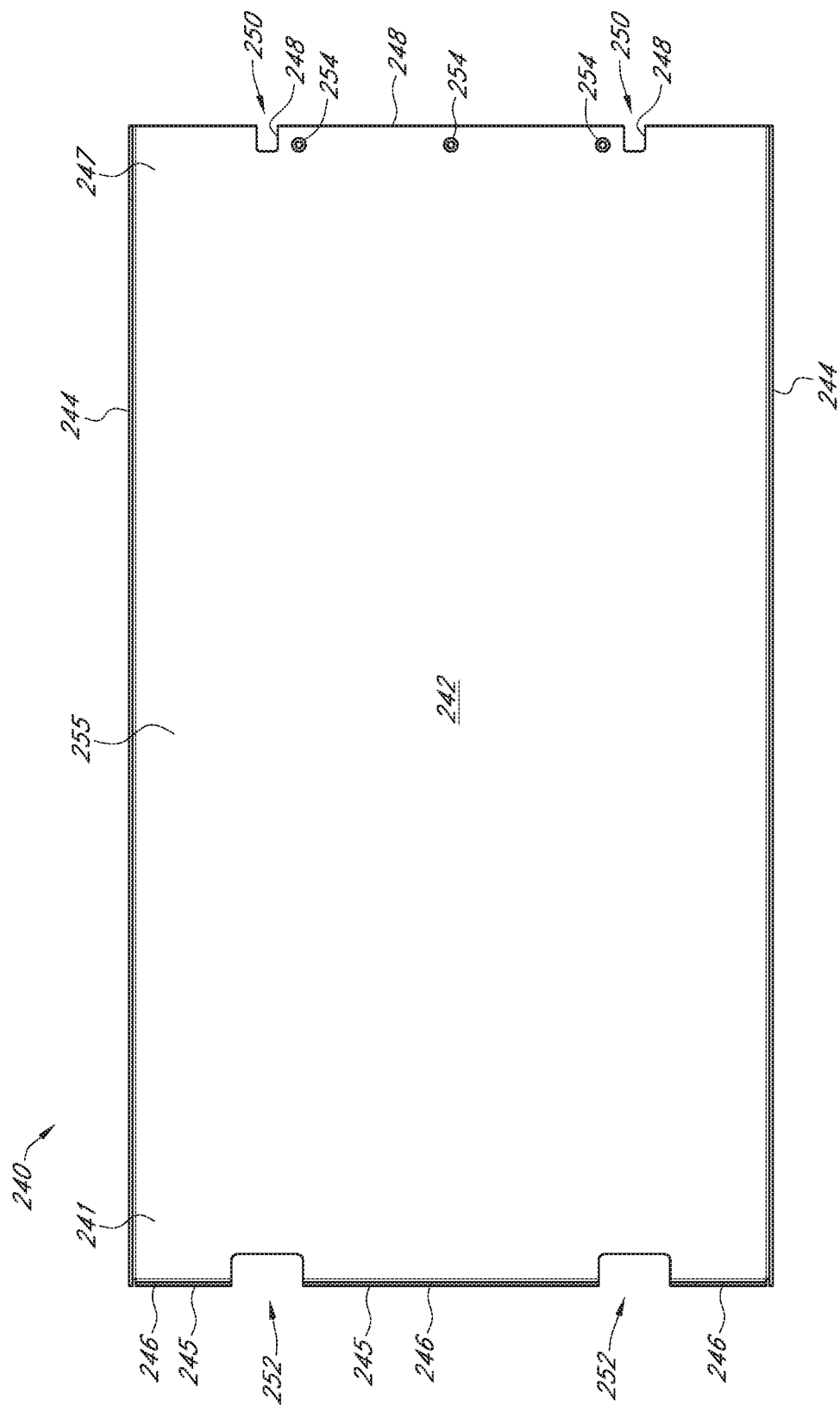
FIG. 2P is a top view of the moveable bottom of FIG. 2B.

FIG. 2P is a top view of the moveable bottom 240. As mentioned, the moveable bottom may have a generally rectangular shape. As shown, the center portion 255 including the top surface 242 may be generally rectangular. Other suitable shapes may be implemented. Further, the side portions 244 may extend along the length of the moveable bottom 240 from the back edge 245 to the front edge 248. Further, the moveable bottom 240 may include an end portion 246 that includes three different segments. The end portion 246 may include a longer center segment and two shorter outside segments. The various segments of the end portions 246 may extend between one side portion 244 to the other side portion 244.

The various outside edges of the moveable bottom 240 may define or otherwise form one or more notches. In some embodiments, the front edge 248 may extend between the side portions 244 along an edge of the first end 247. The front edge 248 may be generally straight with portions that extend towards or into the center portion 255 to form or define one or more front notches 250. As shown, the front edges extend toward the center portion 255 at two locations to form a generally rectangular or square front notch 250. The front notches 250 formed by the front edge 248 may be located symmetrically with respect to two side portions 244. However, other shapes of the front notches 250 as well as locations may be implemented. Similarly, the back edge 245 may define or otherwise form one or more back notches 252. The back edge 245 may be generally straight and extend into or towards the center portion 255 at various locations to form the one or more back notches 252. As shown, there may be two back notches 252 formed by the back edge 245. The back notches 252 may be generally rectangular or other shapes and may be located in various positions.

The various notches of the moveable bottom 240 may allow the moveable bottom 240 to move along features of the tray body 210. In some embodiments, the front notches 250 formed by the front edge 248 allow the front and 247 of the moveable bottom 240 to move over one or more tracks 226 of the tray body 210. In some embodiments, the back notches 252 formed by the back edge 245 allow the back and 241 of the moveable bottom 240 to move over one or more protrusions 228. This is merely one example of how the one or more notches may facilitate movement of the moveable bottom 240. Other arrangements and configurations of the various notches and features of the tray 200 may be implemented.

Figure 2Q:
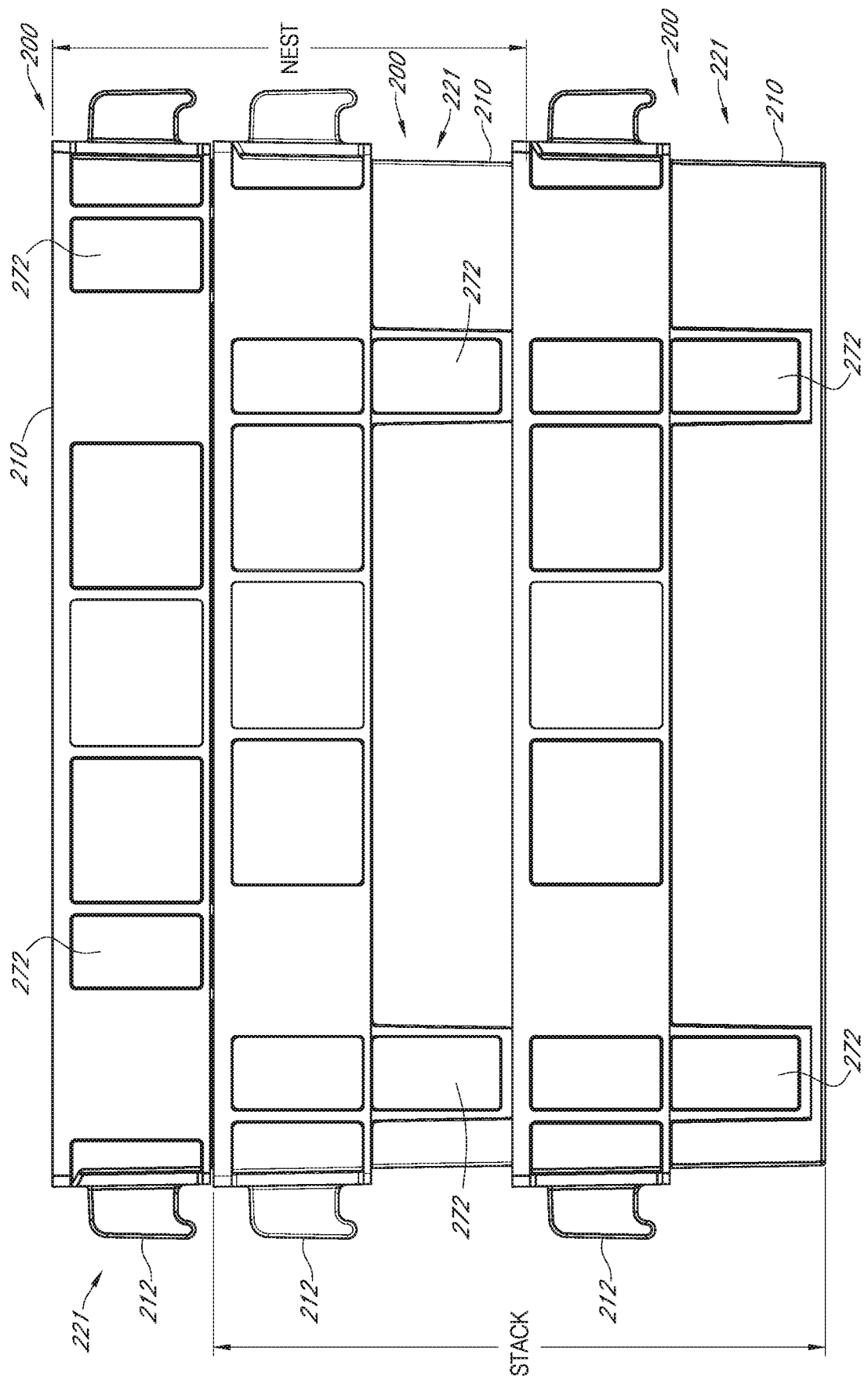
FIG. 2Q is a side view of several trays in nested and stacked configurations.
Figure 2R:
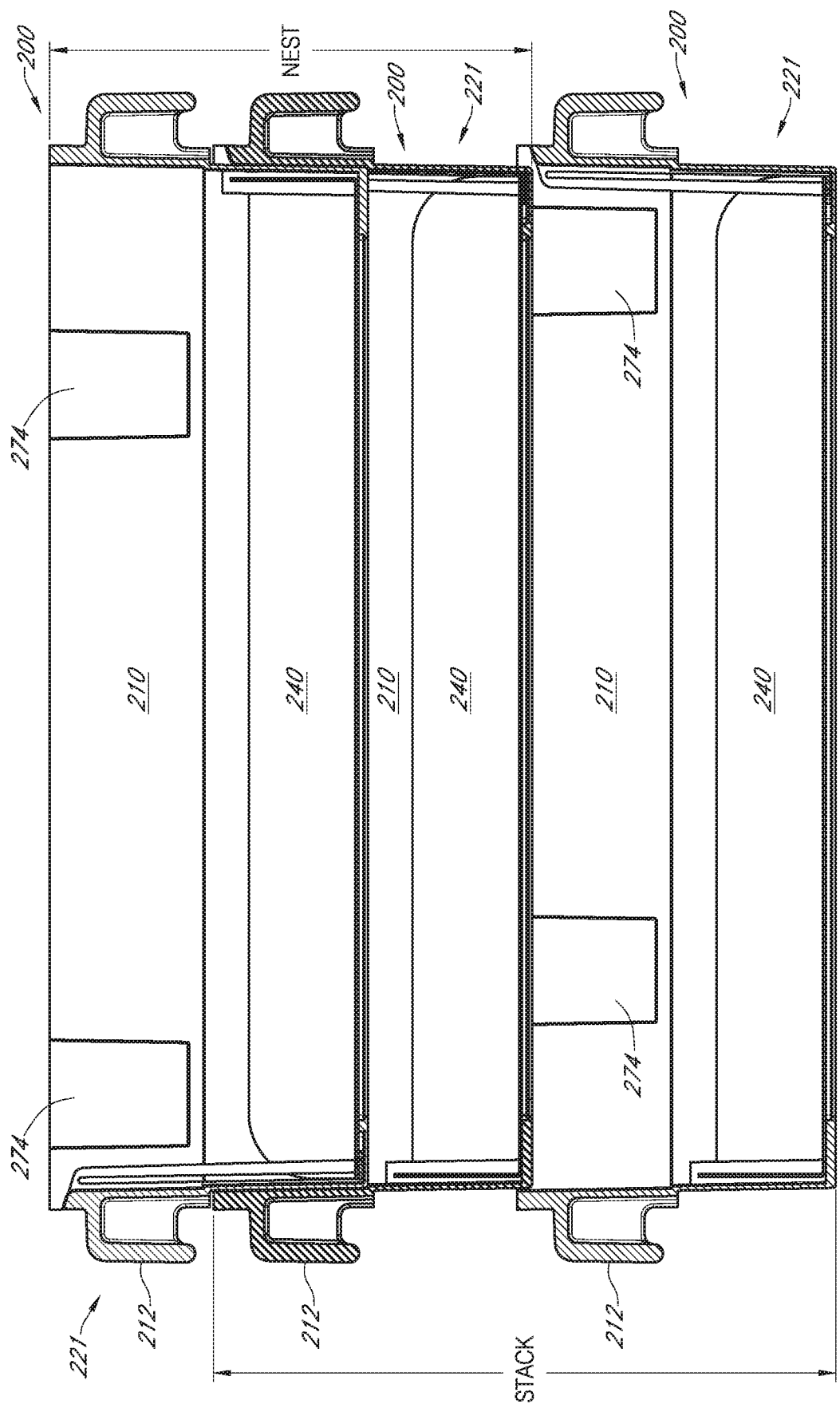
FIG. 2R is side cross section view of the several trays of FIG. 2Q.

FIGS. 2Q and 2R show several trays 200 assembled together in different configurations. FIG. 2Q is a right side view of the several trays 200 and FIG. 2R is a cross-section view of the several trays 200. As mentioned, the trays 200 may be assembled in a variety of manners. In some embodiments, the trays 200 may be nested together. As shown, the two top trays 200 as illustrated in FIGS. 2Q and 2R are nested together. In some embodiments, more than two trays may be nested together. For example, a third tray 200 may be nested with the top tray 200. By nesting two or more trays 200 together, the several trays 200 may be assembled such that a lower tray 200 receives a portion of the upper tray 200. As shown, the uppermost tray 200 may be received by the middle tray 200 as illustrated. In some embodiments, the bottom portion 224 of the top tray 200 may be received into the cavity 236 of the middle tray 200. In some embodiments, when a first tray 200 is nested on top of a second tray 200, the feet 272 of the first tray may be received within the pockets 274 of the second tray 200. In some embodiments, there are four feet 272 coupled with the first tray 200 that are received by four corresponding pockets 274 of the second tray 200. The feet 272 of the first tray 200 may slide into the pockets 274 of the second tray 200 such that the pads 273 of the feet 272 may rest on the nesting supports 275 of the pockets 274.

The trays 200 may be brought into position to be nested together by rotating the first tray 200 with respect to the second tray 200. In some embodiments, the first tray 200 may be rotated 180° relative to the second tray 200. As shown, the nested trays 200 may be arranged such that the front side 221 of the first tray 200 is located opposite from the first side 221 of the second tray 200. As shown in FIGS. 2Q and 2R, the top two trays 200 are nested together such that the front side 221 of the top tray 200 is on the left side as illustrated, while the front side 221 of the middle tray 200 is on the right side. The trays 200 may be rotated relative to each other in order to nest together due to biasing of the feet 272 and/or the pockets 274. For example, by biasing the feet towards the back side 230 and by biasing the pockets 274 toward the front side 221, the trays 200 may be rotated 180° relative to each other in order to nest together.

The trays 200 may also be stacked together. As shown in FIGS. 2Q and 2R, the bottom two trays 200 are stacked together. The trays 200 may be stacked together by receiving the feet 272 of a first tray 200 into the recesses 276 of a second tray 200. For example, as shown the feet 272 of the middle tray 200 may be received by the recesses 276 of the bottom tray 200. In some embodiments, the pads 273 of the feet 272 of a first tray 200 are received by the recesses 276 of the second tray 200. By stacking the trays 200, the cavity 236 of the bottom tray 200 may be mostly or completely unoccupied by the middle tray 200. That is, with the first tray 200 stacked on top of the second tray 200, the first tray 200 may not extend into the cavity 236 of the second tray 200. In some embodiments, the first tray 200 stacked on top of the second tray 200 may extend only a small amount into the cavity 236 of the second tray 200. In this manner, the stacked trays 200 may be transported together while one or both of them contain items 15. In some embodiments more than two trays 200 may be stacked together such that three or more trays each contain items 15 and may be transported together.

The trays 200 may be stacked by orienting the trays 200 in the same direction. In some embodiments, the respective sides of two trays 200 may be directly above or below each other in order to stack the trays 200. For example, the front side 221 of the middle stacked tray 200 may be directly above the front side 221 of the bottom stacked tray 200. The other sides of the trays 200 may similarly align. Therefore, in some embodiments, the trays 200 may be stacked by not rotating them relative to each other.

Stacking the trays 200 may take up more space as compared to nesting the trays. By nesting the trays together, the trays 200 may be transported together in a space-saving manner. Because a lower tray 200 may receive part of an upper tray 200 when the trays are nested, less space is taken up by the several trays 200 as compared to the space taken up by the stacked trays 200. As shown in FIGS. 2Q and 2R, the vertical dimension for the nested trays 200 is smaller than the vertical dimension for the stacked trays 200, as indicated, respectively, by the arrow labeled "nest" and the arrow labeled "stack." It is further noted that the middle tray 200 as illustrated in FIGS. 2Q and 2R is nested with the top tray 200 and stacked with the bottom tray 200. Therefore, combinations of the various assembled configurations, such as stacked and nested, may be implemented with three or more trays 200.

The trays 200 may further have lateral stability in the nested and/or stacked configurations. In the nested configuration, the top nested tray 200 may be prevented by the bottom nested tray 200 from moving laterally or in a generally sideways direction. Similarly, in the stacked configuration, the top stacked tray 200 may be prevented by the bottom stacked tray 200 from moving laterally or in a generally sideways direction. For instance, in the stacked configuration, the recesses 276 of the bottom stacked tray 200 may receive the pads 273 or feet 272 of the top stacked tray 200 such that the recesses 276 prevent lateral movement of the pads 273 and/or the feet 272. Similarly, in the nested configuration, the sidewall 220 of the bottom nested tray 200 may prevent lateral movement of the top nested tray 200 by preventing the sidewall 220 of the top nested tray body 210 from moving laterally. In some embodiments, the top portion 222 of the sidewall 220 of the lower nested tray 200 may prevent lateral movement of the upper tray 200 by preventing the bottom portion 224 of the sidewall 220 of the top nested tray body 210 from moving laterally.

FIG. 3 is a perspective view of the tray 200 supported on an embodiment of a carriage 300 and interfaced with an embodiment of a loading shelf 54. As shown, the carriage 300 may support the tray 200 by receiving the tray 200 within, on or otherwise by a mounting frame 320. The mounting frame 320 may be a rigid structural component sized to receive the bottom portion 224 of the tray 200. The mounting frame 320 may be formed from a variety of materials, such as metal or other suitable materials. The mounting frame 320 may position the tray 200 so that the tray 200 may receive items 15 from the loading shelves 54. The mounting frame 320 may be supported by a support structure 310. The support structure 310 may provide a rigid, structural component that positions the mounting frame 320. The support structure 310 may be formed from any rigid material, such as metal or other suitable materials. The support structure 310 may be coupled with one or more wheels 302. As shown, the support structure 310 may be coupled with one wheel 302 that allows the carriage 302 roll. In some embodiments, the carriage 300 may roll in a direction along the row 42 of bins 50.

The tray 200 may have the moveable bottom 240 oriented in this first position in order to receive items 15 therein. The moveable bottom 240 may be oriented in the first position in a variety of ways. In some embodiments, the carriage 300 may include one or more arms 415 (not shown). The arms 415 may push up on the moveable bottom 240 through the window 264 of the bottom side 260 of the tray body 210 as the tray 200 is lowered into the carriage 300. For example, the front end 247 of the moveable bottom 240 may be pushed up by the arms 415 as the tray 200 is lowered over the arms 415 such that the front end 247 couples with the top portion 222 of the front side 221 of the tray body 210. In some embodiments, the tray 200 may interface with the loading shelves 54 by angling the tray body 210 with respect to the loading shelves 54. As shown, the tray body 210 is angled with respect to the plane of the loading shelves 54 such that in the first position the center portion 255 of the moveable bottom 240 is generally in the same plane as the loading shelves 54. In some embodiments, the arms 415 may angle the tray body 210 and/or the moveable bottom 240 when loading an item 15.

In some embodiments, the tray 200 may couple directly to the loading shelves 54. For example, the front edge 214 or other features of the top portion 222 of the tray 200 may butt directly up against the loading shelves 54. This is merely one example of how the tray 200 may couple directly with the loading shelves 54. Other configurations are possible.

In some embodiments, the tray 200 may indirectly couple with the loading shelves 54. For instance, the tray 200 may couple with the loading shelves 54 by means of a channel 350. As shown, the channel 350 may be between the tray 200 and the loading shelf 54. In some embodiments, one end of the channel 350 may couple to the top portion 222 of the tray body 210, and the opposite end of the channel 350 may couple with the loading shelf 54. The channel 350 may include a sliding surface 352. The sliding surface 352 may be positioned in between the moveable bottom 240 and the loading shelf 54 such that a continuous surface is formed by the loading shelf 54, the sliding surface 352 and the moveable bottom 240. For example, a continuous surface may be formed by the front end 247 of the moveable bottom 240, the sliding surface 352 of the channel 350 and the loading shelf 54. In some embodiments, the front edge 214, or other portions of the top edge 223 of the tray body 210, may also contribute to forming the continuous surface. Therefore, a continuous surface between the moveable bottom 240 and the loading shelf 54 may be formed in a variety of ways and with a variety of components. By forming a continuous surface, the items 15 may be easily slid or otherwise moved from the loading shelf 54 to the tray 200, and vice versa.

In some embodiments, the tray 200 may interface with the loading shelf 54 by leaning against various features of the stacker 40. For example, the front edge 214 of the tray body 210 may lean against the channel 350 or other features of the stacker 40. In some embodiments, the tray 200 may lean against the edge support 56. For example, the handle 212 of the tray 200 may be received by the notch 58 formed by the edge support 56. By receiving the handle 212 within the notch 58 of the edge support 56, the tray 200 may be latterly stabilized such that it is prevented from moving in a direction along the length of the row 42. Therefore, the tray 200 may be secured in front of one of the bins 50. To move the tray 200 to another bin 50 within the same row 42, the tray 200 may be pulled, rotated or otherwise moved away from the edge support 56 and rolled to the next bin 50 in the row 42. At the next bin 50, the tray 200 may again be secured by another notch 58 formed by the edge support 56 in front of that next bin 50.

The tray 200 may also move among the bins 50 by sliding along the rail 60. In some embodiments, the tray body 210 may be coupled with the rail 60 such that the tray 200 may slide along the length of the rail 60. In some embodiments, the tray 200 may slide along the rail 60 as the tray 200 is rolled in the carriage 300 using the wheel 302. In some embodiments, the channel 350 may be coupled with the rail 60 and tray 200 such that the channel 350 may slide along the rail 60. The tray 200 may then slide with the channel 350 as the channel 350 moves along the rail 60. These are merely some examples of how the tray 200 may be interfaced with and moved among bins 50 of the stacker 40. Other suitable configurations may be implemented.

Figure 3B:
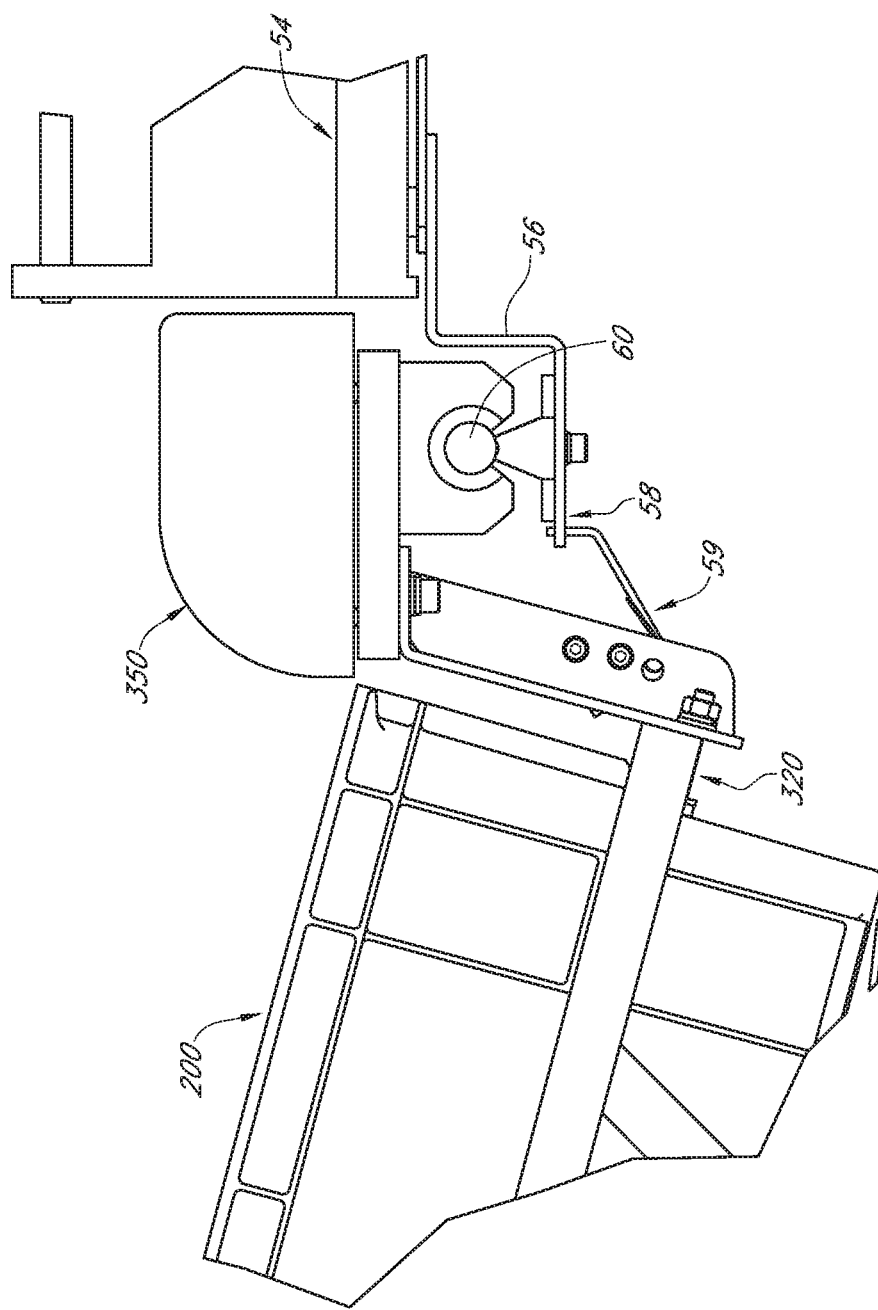
FIG. 3B is a side view of the interface of FIG. 3A between the carriage supporting the tray and the loading surface.

FIG. 3B is a side view of the interface between the carriage 300 supporting the tray 200 and the loading surface 54. In some embodiments, the carriage 300 may include one or more latches 59. The latch 59 may be an elongated, structural member formed from a variety of rigid materials, such as metal, plastic, other suitable materials, or combinations thereof. As shown, there may be a single latch 59. In some embodiments, there may be more than a single latch 59. The one or more latches 59 may couple with the front portion of the carriage 300, such as with the front of the mounting frame 320. In some embodiments, the latch 59 may be a spring-loaded latch 59 that extends outward when the spring is in its natural state. When the carriage 300 is brought up against the edge support 56, the spring-loaded latch 59 may compress towards the carriage 300 such that the spring has stored potential energy. In some embodiments, the latch 59 may be received by the notches 58 in the edge support 56. For example, the latch 59 on the carriage 300 may be freely extended outward until the carriage 300 is leaned up against the edge support 56, wherein the latch 59 is received into the notch 58 in front of a respective bin 50. The notch 58 may stabilize the carriage by receiving the latch 59. By receiving the latch 59, the notch 58 may prevent movement of the carriage 300 along the rail 60 such that the tray 200 inside the carriage 300 is stabilized in front of the bin 50 from which it is receiving items 15. With a spring-loaded latch 59, the latch 59 may push against the notch 58 to ensure that the latch 59 and the notch 58 remain engaged when loading an item 15 into the tray 200 from the loading surface 54 of the bin 50.

Figure 4A:
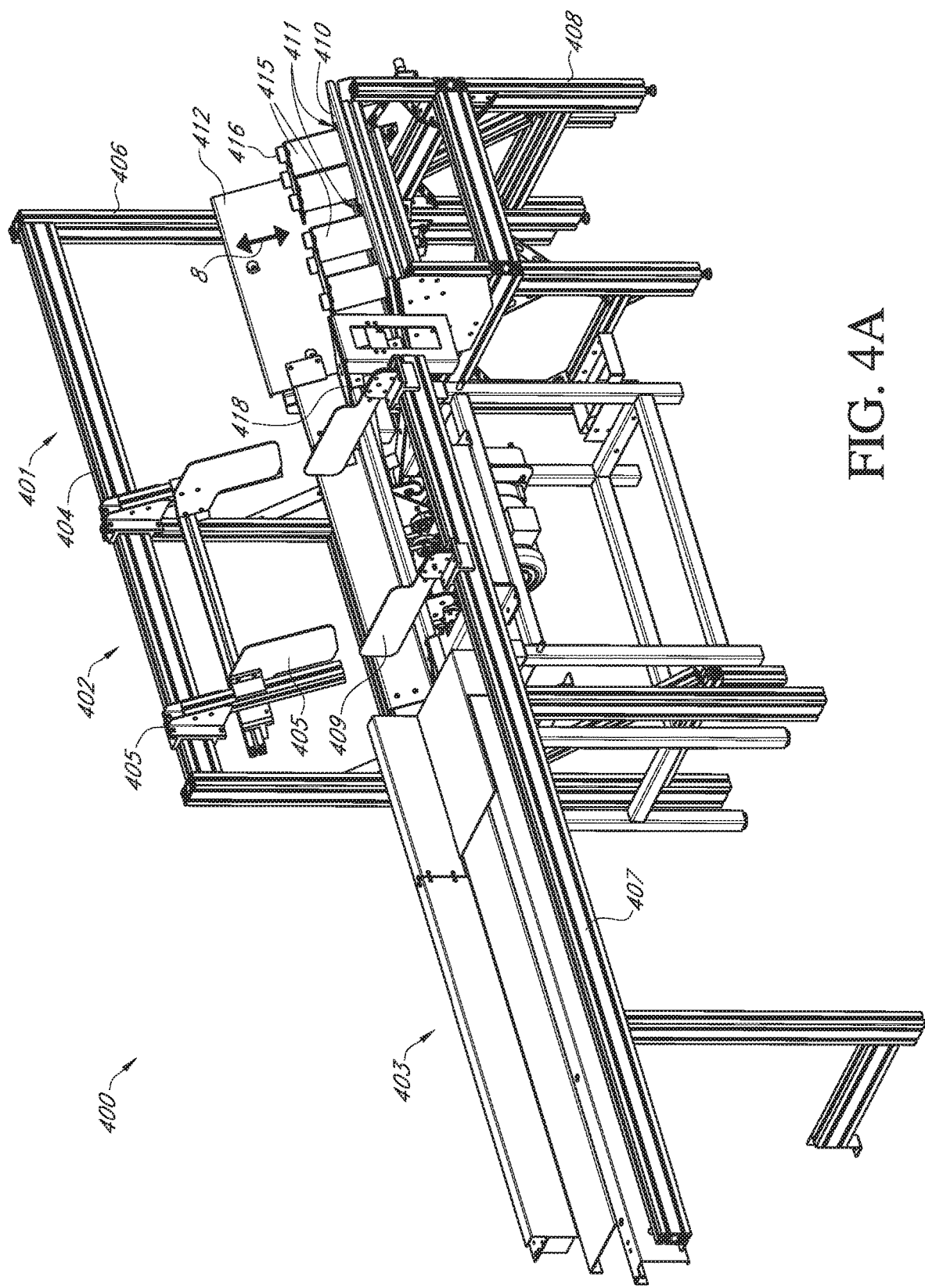
FIG. 4A is a perspective view of an embodiment of an unloading system for unloading items from the tray of FIGS. 2A-2K.

FIG. 4A is a perspective view of an embodiment of an unloading system 400 for unloading items 15 from the tray 200. As shown, the unloading system 400 may include various stations. In some embodiments, the unloading system 400 may include a first station 401, a second station 402 and/or a third station 403. The first station 401 may include a tray support 408. The tray support 408 may be a rigid, structural assembly composed of rigid, structural members configured to support the tray 200 (not shown in FIG. 4A). As shown, the tray support 408 may include several vertical members and several horizontal members that support a lower tray mount 410. The lower tray mail mount 410 may be a planar structure or surface on which a tray 200 may be placed. The lower tray mount 410 may adjacent or otherwise near one or more side tray mounts 412. In some embodiments, the lower tray mount 410 is located at a generally right angle with the side tray mount 412. The lower tray mount 410 and the side tray mount 412 may be formed from a variety of rigid materials, such as metals or other suitable materials. In some embodiments, the lower tray mount 410 may be angled with respect to a horizontal direction, and the side tray mount 412 may be angled with respect to a vertical direction. In this manner, the tray 200 may be set on top of the lower tray mount 410 and be forced by gravity toward the side tray mount 412. This may locate the tray 200 in position for unloading of the items 15.

The lower tray mount 410 may move. In some embodiments, the lower tray mount 410 moves in a direction 8 perpendicular to the plane of its surface. For instance, the lower tray mount 410 and the sidewall 412 may be at right angles, in which case the lower tray mount 410 may move parallel to the planar surface of the sidewall 412. The lower tray mount 410 is shown in a lower position in FIG. 4A. However, the lower tray mount 410 may be raised along the direction 8. In some embodiments, the lower tray mount 410 is coupled with a motor (not shown) that causes the lower tray mount 410 to move up and down. The tray 200 containing the item 15 may be placed on top of the lower tray mount 410 when the lower tray mount 410 is in the raised position. Further details of the raising and lowering of the lower tray mount 410 are discussed herein, for example with respect to FIGS. 4C-4D.

The unloading system 400 may include one or more arms 415. The arms 415 may be elongated, rigid platforms or other structures that are brought to push on various components of the system 400 due to relative movement between the tray 200 and the arms 415. The arms 415 may be formed from a variety of rigid materials, such as metal or other suitable materials. The arms 415 may be entirely beneath the lower tray mount 410 and not contacting the tray 200 when the lower tray mount 410 is in the raised position. In some embodiments, the arms 415 may contact portions of the tray 200 when the lower tray mount 410 is in the raised position The arms 415 may extend through one or more openings 411 in the lower tray mount 410 when the lower tray mount 410 is lowered to a lower position, as illustrated in the configuration shown in FIG. 4A. Therefore, the arms 415 may extend through the openings 411 in the lower tray mount 410. In some embodiments, the arms 415 may include one or more bumpers 416 on the ends of the arms 415. The bumpers 416 may be formed from a rubber or other soft material. The bumper 416 may be fastened to the end of the arm 415 or attached in any suitable manner. The bumpers 416 may provide a contacting member that contacts various features of the system 400, such as the tray 200. As discussed in further detail herein, the arms 415 may be stationary or may move, for example may move up and down along the direction 8.

The unloading system 400 may include one or more unloading surfaces 418. The unloading surface 418 may be a generally planar structure formed from a variety of rigid materials, such as metal or other suitable materials. The unloading surface 418 may provide a surface onto which the items 15 may be unloaded from the tray 200. The unloading surface 418 may be angled with respect to the horizontal direction such that it is generally parallel to the plane of the lower tray mount 410. The unloading surface 418 may be coupled with the tray support 408. In some embodiments, the unloading surface 418 may be coupled with other features of the unlading system 400, either in addition to or instead of the tray support 408.

The unloading system 400 may include various other components to assist with unloading the items 15 from the tray 200. In some embodiments, the unloading system may include a first track 404 extending from the first station 401 to the second station 402. The first track may be formed from a variety of rigid materials, such as metal or other suitable materials. The first track may be coupled with one or more first grippers 405. As shown, there may be two first grippers coupled with the first track 404. The first grippers 405 may be movably coupled with the first track 404 such that the first grippers 405 may translate along the length of the track 404 back-and-forth between the first station 401 and the second station 402. The first gripper 405 may include one or more rigid, planar structures. The first gripper 405 may slide along the first track 404 to the first station 401 and extend away from the first track 404 such that the gripper 405 may extend into the tray 200 located on the lower tray mount 410, where the first gripper 405 may then slide the one or more items 15 out of the tray 200 and onto the unloading surface 418. The first gripper 405 may further slide the items 15 toward the second station 402. The item 15 may then be slid or otherwise moved along a second track 407 to the third station 403 for further processing.

Figure 4B:
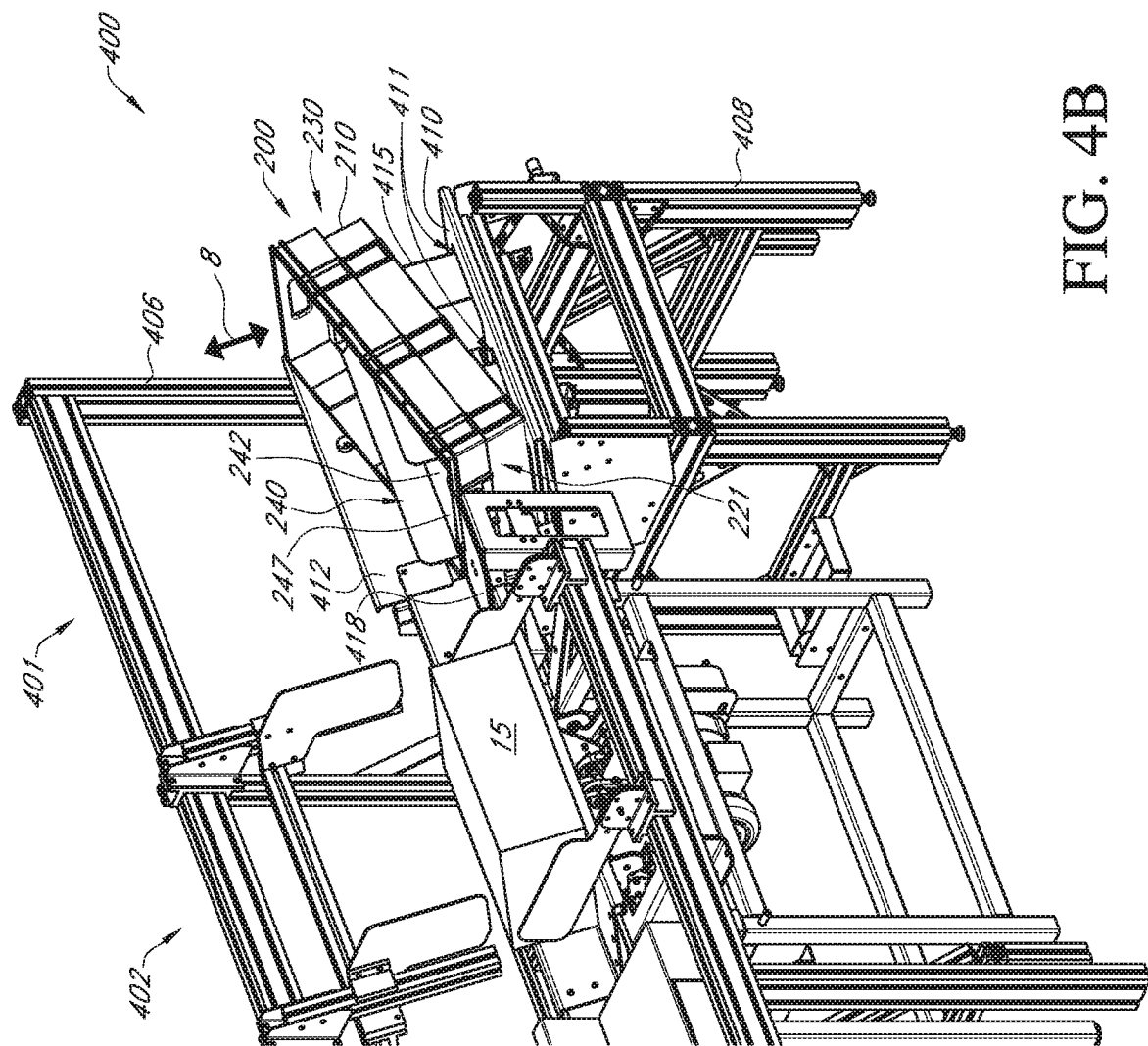
FIG. 4B is a perspective view of the unloading system of FIG. 4A interfaced with the tray of FIGS. 2A-2K.

FIG. 4B shows a portion of the unloading system 400 with a tray 200 mounted thereto. As mentioned, the tray 200 may be placed onto the lower tray mount 410 and moved or allowed to move down against the side tray mount 412. In some embodiments, the lower tray mount 410 is lowered such that the arms 415 are brought to extend through openings 411 of the lower tray mount 410 and push up against the tray body 210 and/or moveable bottom 240, such that the tray body 210 is angled with respect to the horizon and the moveable bottom 240 is angled with respect to the tray body 210. Therefore, in some embodiments, the arms 415 may push or contact the tray body 210 as well as the moveable bottom 240. As shown in FIG. 4B, the lower tray mount 410 has lowered along the direction 8 such that the arms 415 extend through the lower tray mount 410 and are pushing up on the tray 200, such that the back side 230 of the tray body 210 is in a position that is higher than the front side 221. Further, the arms 415 may extend through the window 264 of the bottom side 260 (not shown), when the lower tray mount 410 is lowered, and thereby push up against the moveable bottom 240. In this manner, the lower tray mount 410 and the arms 415 working together may rotate or otherwise move the moveable bottom 240 relative to the tray body 210 such that the front end 247 of the moveable bottom 240 is coupled with the top portion 222 of the tray body 210, i.e. such that the moveable bottom 240 is in the first position.

In the first position, the moveable bottom 240 may be coupled with the top portion 222 of the tray body 210 such that the moveable bottom 240 forms a continuous surface with the unloading surface 418 of the unloading system 400. In some embodiments, the front end 247 may be coupled with the top portion 222 such that the center portion 255 of the moveable bottom 240 forms a continuous surface with the unloading surface 418. In some embodiments, this continuous surface may be further augmented by other components of the system, such as the top edge 223, the front edge 214, top surfaces of the tracks 226, the top surface 242 and/or other components or features. In some embodiments, in the first position the moveable bottom 240 and the unloading surface 408 may be generally parallel with each other such that the continuous surface is generally flat. In this manner, one or more items 15 may be slid or otherwise easily moved from the moveable bottom 240 to the unloading surface 418. As shown, the item 15 has been slid out of the tray 200, over the unloading surface 418 and into the second station 402. The item 15 may then be processed accordingly.

Figure 4C:
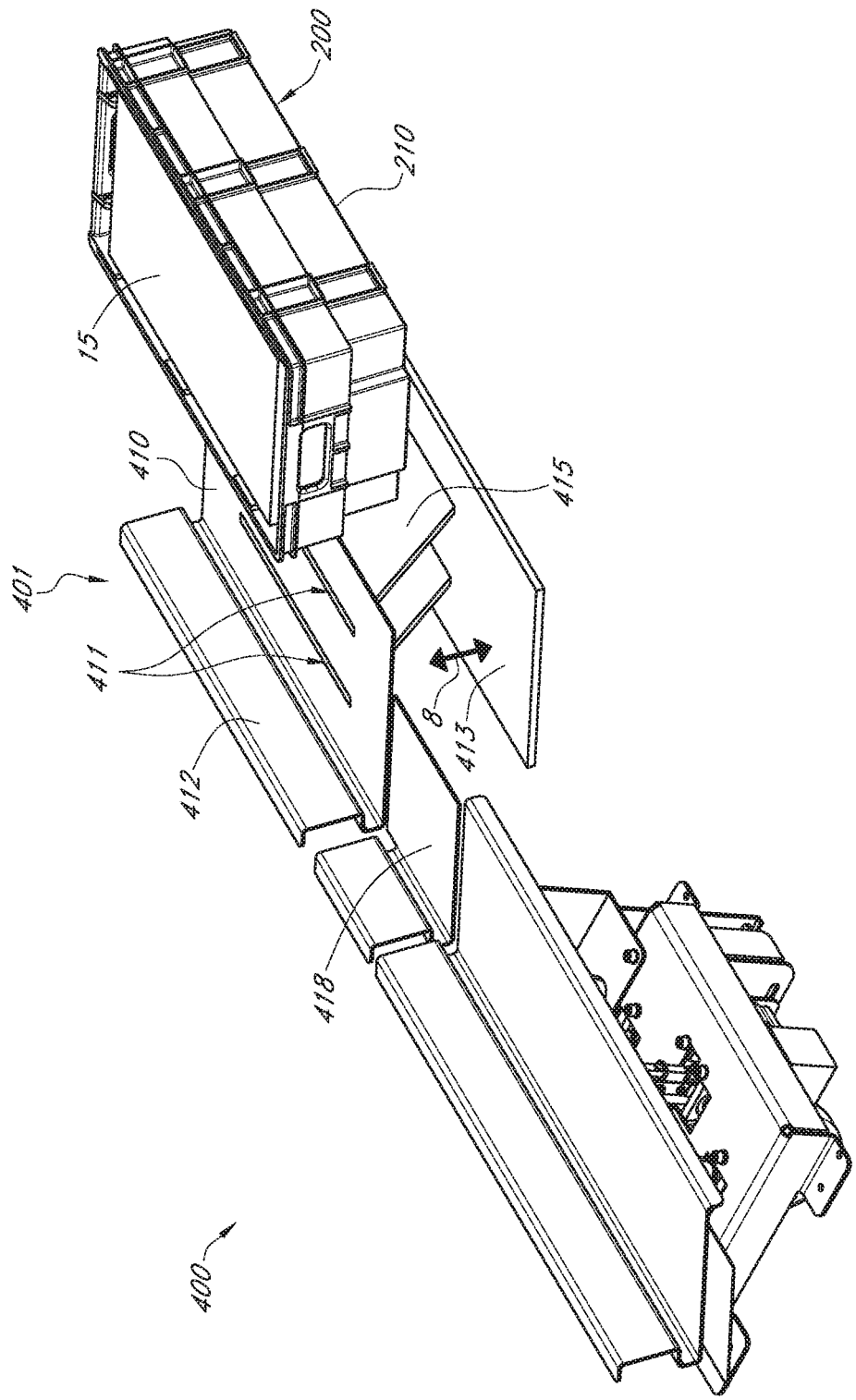
FIGS. 4C-4D are perspective views of another embodiment of an unloading system for unloading items from the tray of FIGS. 2A-2K.

FIG. 4C is a perspective view of another embodiment of the unloading system 400. As shown, the unloading system 400 may include the lower tray mount 410 having one or more openings 411 extending through the mount 410. The lower tray mount 410 may include the one or more openings 411 that extend through the thickness of the lower tray amount 410. The openings 411 may be slots in the lower tray mount 410 that provide a passageway through which the arms 415 may extend when the lower tray mount 410 is lowered over the arms 415. As shown, the lower tray amount 410 is in the raised position and the arms 415 are not yet extending through the openings 411 of the mount 410. The openings 411 may have a variety of shapes and sizes. The lower tray mount 410 and/or the arms 415 may be stationary or may move, for example may move up and down along the direction 8.

The arms 415 may be rigid platforms configured to contact one or more features of the tray 200. The arms 415 are shown as elongated structural members configured to extend through complementary elongated openings 411 in the lower tray mount 410. Therefore, the arms 415 may have a variety of shapes and sizes. The arms 415 may be coupled to a support 413. The support 413 may be a structural component coupled with features of the unloading system 400. In some embodiments, the support 413 may be coupled with the tray support 408 (not shown). Further illustrated is the tray 200 containing the item 15. The tray 200 is shown in a position where it is not yet loaded onto the lower tray mount 410. The tray 200 may be loaded onto the lower tray mount 410, and then the lower tray mount 410 may be lowered with the tray 200 thereon.

Figure 4D:
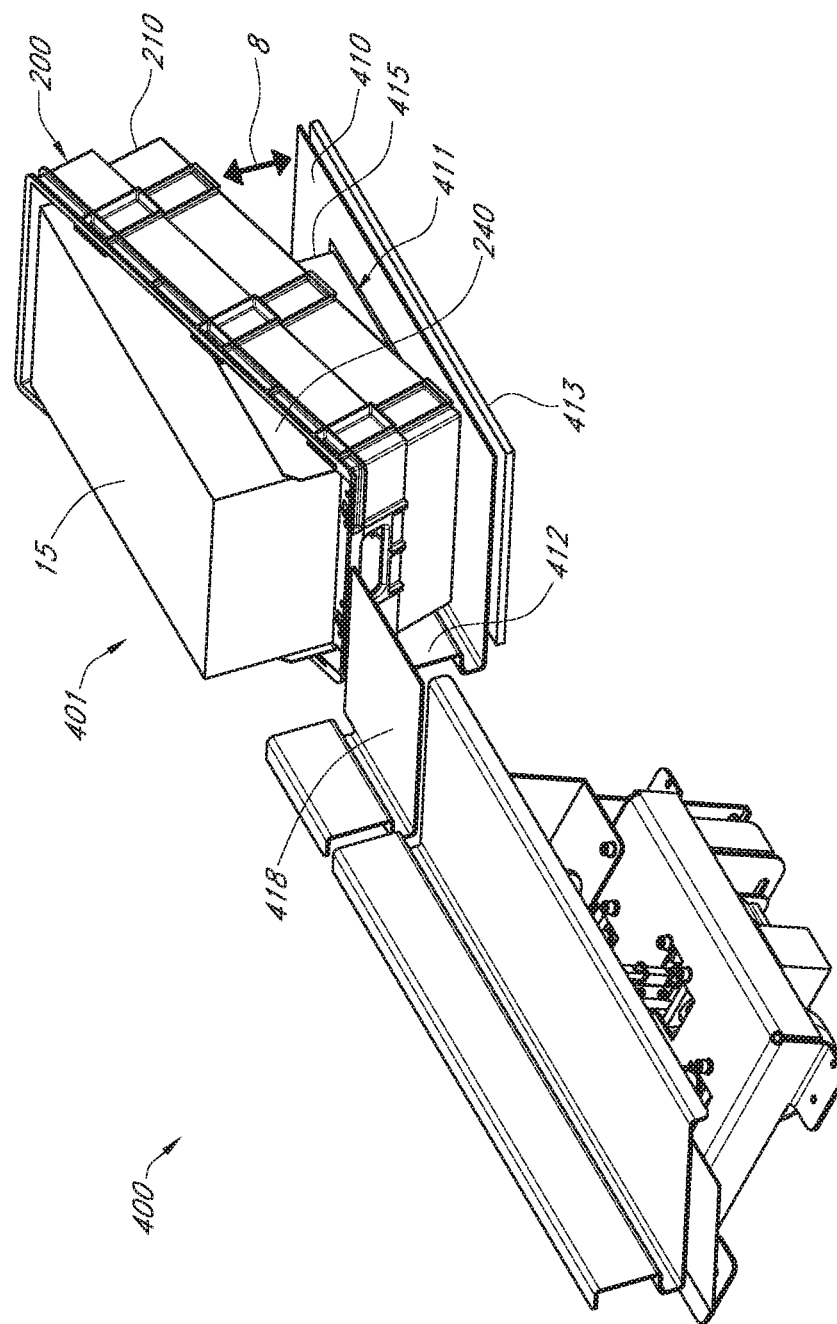

FIG. 4D illustrates the lower tray mount 410 moved into the lower position. This may be, for example, movement along the direction 8. As shown, the tray 200 is located on top of the lower tray mount 410. The lower tray mount 410 is in the lowered position with the arms 415 extending through the openings 411 in the lower tray mount 410. In this manner, the arms 415 may contact various features of the tray 200. By contacting the tray 200, the arms 415 may angle the tray 200 and/or the movable bottom 240. As shown, the tray body 210 is angled with respect to the unloading surface 418, and the movable bottom 240 is angled with respect to the tray body 210, such that the movable bottom 240 and the unloading surface 418 form a continuous surface, which may be planar or substantially planar. In this manner, the item 15 may be easily removed from the tray 200, for example by sliding the item 15 from the movable bottom 240 and onto the unloading surface 418.

Figure 5A:
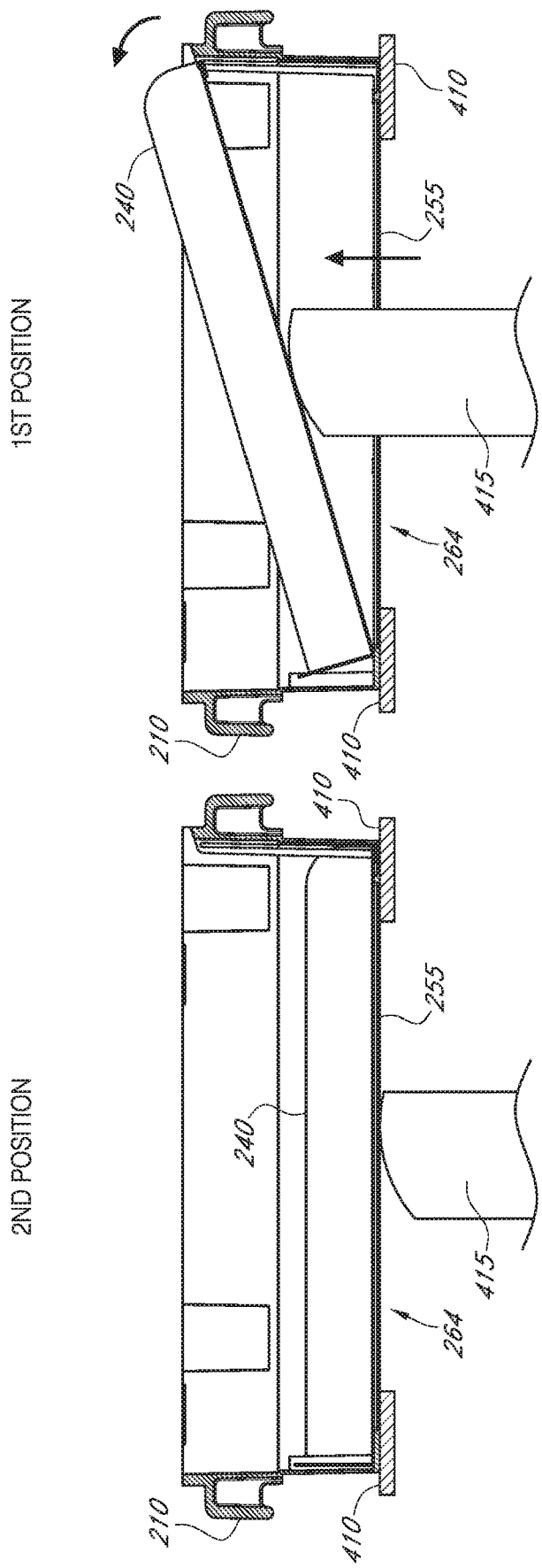
FIGS. 5A-5B are side cross section views of the tray mounted on an unloading system showing the moveable bottom in first and second positions.
Figure 5B:
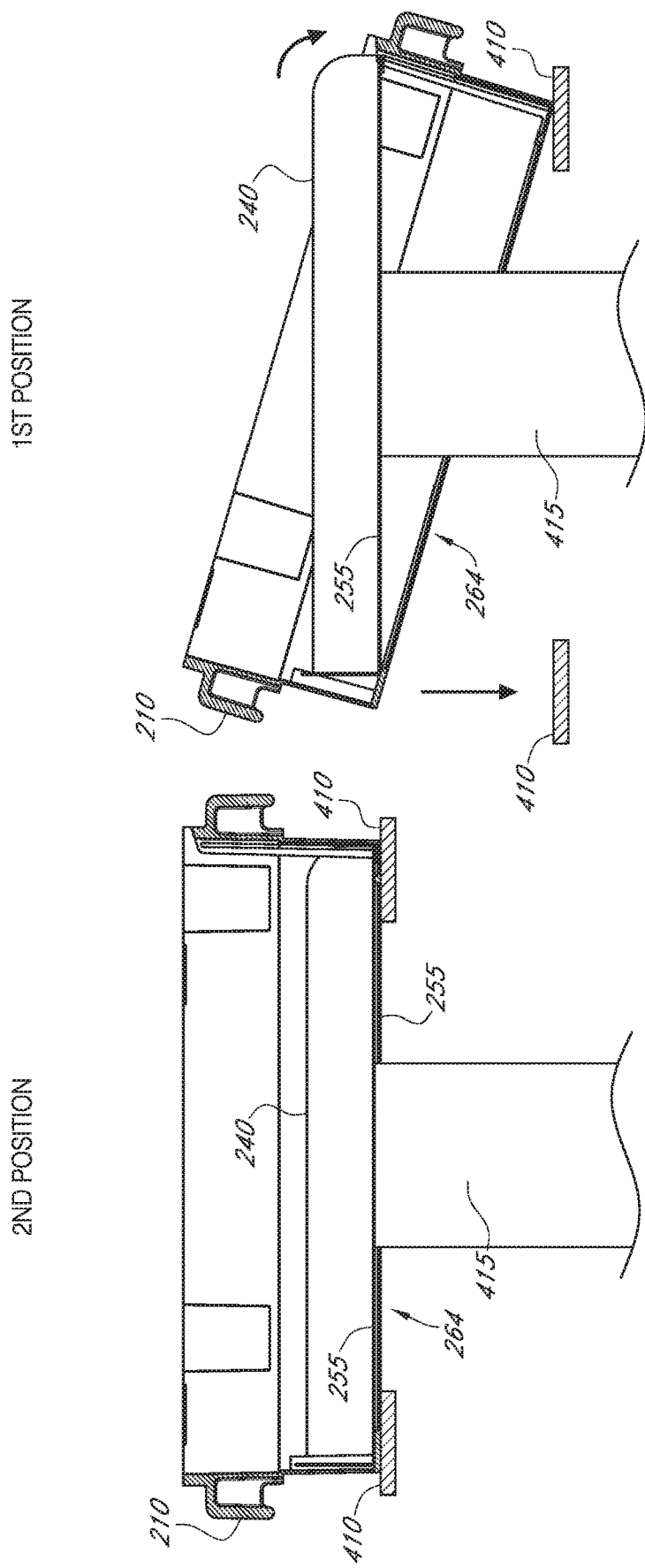

FIGS. 5A and 5B are side cross-section views of the tray 200 and the arms 415 with the movable bottom 240 in the first and second positions. Referring to FIG. 5A, the movable bottom 240 is shown in the second position in the configuration on the left side of the figure as illustrated. In the second position, the arm 415 has not moved the movable bottom 240 with respect to the tray body 210. As shown on the right side of FIG. 5A, the movable bottom 240 is in the first position. As shown, the lower tray mount 410 has been lowered over the arms 415 such that the arms 415 extend through the window 264 of the tray 200 and contact the movable bottom 240. In some embodiments, the lower tray mount 410 is lowered such that the arms 415 contact the center portion 255 of the moveable bottom 240. In this manner, the movable bottom 240 is made to rotate such that it is now at an angle with respect to the tray body 210 as shown. Thus, a first motion to achieve the first and second positions may consist of rotating or otherwise moving the moveable bottom 240 while the tray body 210 remains stationary.

FIG. 5B depicts the tray 200 in a horizontal orientation on the left side of the figure as illustrated. As shown, the tray body 210 is supported by the lower tray mount 410. Further, the arm 415 has not moved the movable bottom 240 with respect to the tray body 210. In the second position, shown on the right side of FIG. 5B as illustrated, the lower tray mount 410 has been lowered over the arms 415 such that the arms 415 are extending through the lower tray mount 410 and are contacting the moveable bottom 240. In this manner, the movable bottom 240 is horizontal while the tray body 210 is angled with respect to the horizon. Therefore, the tray body 210 has rotated such that it is at an angle with respect to the horizon and with respect to the movable bottom 240. As such, the movable bottom 240 is now in the first position. Thus, a second motion to achieve the first and second positions may consist of rotating or otherwise moving the tray body 210 while the moveable bottom 240 remains stationary. In some embodiments, combinations of the first and second motions, shown respectively in FIGS. 5A and 5B, may be implemented to load and unload items 15 into and out of the tray 200.

Figure 6:
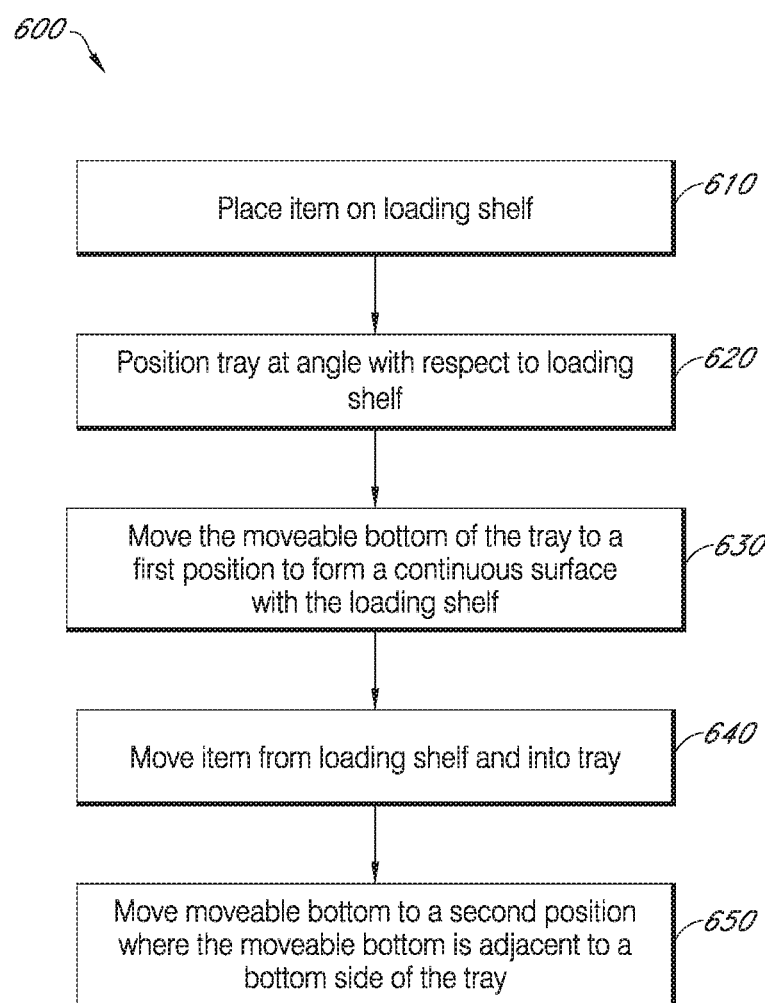
FIG. 6 is a flowchart showing an embodiment of a method for loading one or more items into a tray.

FIG. 6 is a flowchart of an embodiment of a method 600 for loading one or more items into a tray. The method 600 may include loading one or more items 15 into the tray 200 from the loading system 10.

The method 600 begins at block 610 wherein an item is placed on a loading shelf. For example, the item 15 may be placed on the loading shelf 54 of the stacker 40. The item 15 may also be placed various other structures from which the item will be moved into the tray. The item may be placed onto the loading shelf manually, for example by a worker carrying the item to the shelf. The item may also be placed automatically, for example by a sorting system sorting and then the distributing the item to the shelf. In some embodiments, the sorter 30 sorts the items 15 and then distributes them to an appropriate loading shelf 54.

The method 600 next moves to block 620 wherein the tray is positioned at an angle with respect to the loading shelf. This may include positioning the sidewall 220 or tray body 210 at an angle with respect to a plane that includes a top surface of the loading shelf 54. In some embodiments, the tray may be mounted on a supporting structure, such as the mounting frame 320 of the carriage 300, and angled thereon. The tray may be angled on the supporting structure by various components, such as by the arms 415 as described above. The arms 415 or other structures may extend upward as the tray is lowered and thereby contact the tray structure, such as the tray body 210, to angle the tray. The supporting structure may further transport the tray, for example by rolling on the wheel 302 of the support structure 310. The supporting structure may transport the tray to bring it within the vicinity of a loading apparatus, such as the loading system 10.

The method 600 next moves to block 630 wherein a moveable bottom of the tray is moved to a first position such that the moveable bottom forms a continuous surface with portions of the loading shelf. The first position may be a position that is the same or similar as the first position described above, for example with respect to FIGS. 2A-2B and 2G-2J. Block 630 may include, for example, moving the moveable bottom 240 of the tray 200 to form a generally planar surface between the moveable bottom 240 and the loading shelf 54. The moveable bottom may be moved by a variety of components. In some embodiments, the arms 415 may extend upward from the carriage 300 through the window 264 of the tray 200 as the tray 200 is lowered over the arms 415. The arms 415 may contact the front end 247 of the moveable bottom 240 and move the front end 247 upward such that the front end 247 couples with the top portion 222 of the tray body 210. The front end 247 may couple with the top portion 222 in a variety of ways as discussed herein, for example with respect to FIGS. 2I-2J. The moveable bottom may move in block 630 over a variety of paths. In some embodiments, the moveable bottom is rotated. For instance, the front end 247 may move up while the back end 241 moves horizontally toward the front side 221 but does not move vertically, such that moveable bottom 240 essentially rotates about an axis defined by the back edge 245 of the back end 241. In some embodiments of block 630, the arms 415 may move the moveable bottom and/or the tray body 210, as described above, for example with respect to FIGS. 5A-5B.

Block 630 may therefore include action where the front end 247 forms a continuous surface with the loading shelf 54. In some embodiments, the continuous surface is further formed in block 630 by other features of the tray 200, such as by the top edge 223, the front edge 214, an upper surface of the track 226 and/or other features. In some embodiments, the continuous surface is further formed by other features of the loading system 10, such as the channel 350, the sliding surface 352, and/or other features. Further, block 630 may include forming another continuous surface with other loading shelves 54. For instance, block 630 may include rolling the tray 200 in the carriage 300 and sliding the tray 200 along the rail 60 in front of the bin 50. It may further include securing the tray 200 to a notch 58 in the edge support 56 that is in front of the bin 50.

The method 600 next moves to block 640 wherein the item is moved along the continuous surface from the loading shelf and onto the moveable bottom. This may include, for example, moving the item 15 along the continuous surface formed by the loading shelf 54 and the moveable bottom 240. In some embodiments, the item may be moved along the continuous surface as formed by these and other components of the tray 200 and/or loading system 10. The item may be moved in a variety of ways. The item may slide along the continuous surface. It may also be rolled, tossed, pitched, ejected, emitted, moved in other ways, and/or combinations thereof. The item may be moved manually, for example by a person. The item may also be moved automatically, for example by an arm of the loading system. In some embodiments, the item 15 is slid along the continuous surface from the loading shelf 54 and onto the moveable bottom 240. The item 15 may be slid from the loading shelf 54 and onto the front end 247 and/or the center portion 255 of the moveable bottom 240. In some embodiments, the item 15 may also be slid onto the top edge 223, the front edge 214, an upper surface of the track 226 and/or other features of the tray body 210. In some embodiments, the item 15 may also be slid along the channel 350, the sliding surface 352, and/or other features of the loading system 10.

The method 600 next moves to block 650 wherein the moveable bottom is moved to a second position inside the tray such that the moveable bottom is adjacent to a bottom side of the tray. The second position may be a position that is the same or similar as the second position described above, for example with respect to FIGS. 2C and 2K. The moveable bottom may be moved to the second position in block 650 by a variety of components. In some embodiments, the tray 200 may be raised such that the arms 415 are removed from the tray cavity 236 through the window 264 of the tray 200. The arms 415 may be contacting the front end 247 of the moveable bottom 240 as the tray 200 is raised, thereby controllably allowing the front end 247 to fall downward inside the tray 200 such that the front end 247 couples with the bottom portion 224 of the tray body 210.

The front end 247 may couple with the bottom portion 224 in a variety of ways as discussed herein, for example with respect to FIG. 2K. The moveable bottom may move in block 650 over a variety of paths. In some embodiments, the moveable bottom is rotated. For instance, the front end 247 may move down while the back end 241 moves horizontally back the back side 230 but does not move vertically, such that moveable bottom 240 essentially rotates about an axis defined by the back edge 245 of the back end 241. In some embodiments of block 650, the arms 415 may move the moveable bottom and/or the tray body 210, as described above, for example with respect to FIGS. 5A-5B.

Figure 7:
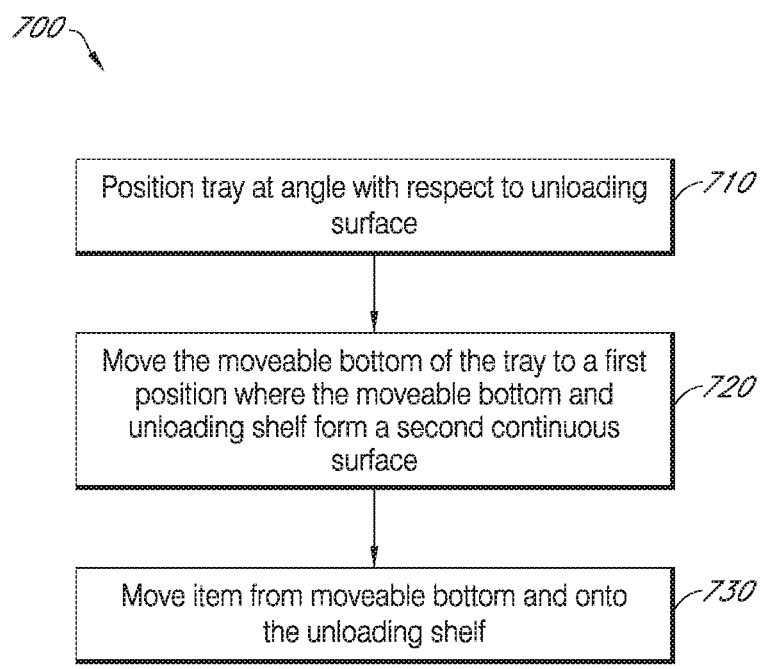
FIG. 7 is a flowchart showing an embodiment of a method for unloading one or more items from a tray.

FIG. 7 is a flowchart of an embodiment of a method 700 for unloading one or more items from a tray. The method 700 may include unloading one or more items 15 from the tray 200 from the unloading system 400.

The method 700 begins at block 710 wherein the tray is positioned at an angle with respect to an unloading surface. Block 710 may include bringing the tray to the unloading surface. The tray may be manually brought to the unloading system 400, for example by rolling the tray 200 in the carriage 300 to the unloading system 400. The tray may be automatically brought to the unloading system 400, for example by a conveyor belt.

In some embodiments, in block 710 the sidewall 220 of the tray 200 may be positioned at an angle with respect to the unloading surface 418 of the unloading system 400. For example, the tray 200 may be placed on the lower tray mount 410 and/or the side tray mount 412, where various components may move the tray body 210 to angle the tray 200. In some embodiments, the tray may be lowered of one or more arms 415 such that the one or more arms 415 extend through the window 264 and contact one or more parts of the tray body 210, such as the bottom side 260 and/or the back side 230. In this manner, the arms 415 may cause the back side 230 of the tray body 210 to move upward with respect to the front side 221, thereby angling the tray body 210.

The method 700 next moves to block 720 wherein the moveable bottom is moved to a first position such that the moveable bottom and the unloading surface form a second continuous surface. The first position may be a position that is the same or similar as the first position described above, for example with respect to FIGS. 2A-2B and 2G-2J. Block 720 may be similar to block 630 of method 600. Block 720 may include, for example, moving the moveable bottom 240 of the tray 200 to form a generally planar surface between the moveable bottom 240 and the unloading surface 418. The moveable bottom may be moved by a variety of components. In some embodiments, the tray 200 may be lowered over one or more arms 415 such that the arms 415 extend upward from the lower tray mount 410 and through the window 264 of the tray 200. The arms 415 may contact the front end 247 of the moveable bottom 240 and move the front end 247 upward such that the front end 247 couples with the top portion 222 of the tray body 210. The front end 247 may couple with the top portion 222 in a variety of ways as discussed herein, for example with respect to FIGS. 2I-2J. The moveable bottom may move in block 720 over a variety of paths similar to those described above with respect to block 630 of method 600.

Block 720 may therefore include forming a continuous surface with the front end 247 and the unloading surface 418. In some embodiments, the continuous surface is further formed by other features of the unloading system 400. In some embodiments, the continuous surface is further formed in block 720 by other features of the tray 200, such as by the top edge 223, the front edge 214, an upper surface of the track 226 and/or other features.

The method 700 then moves to block 730 wherein the item is moved along the second continuous surface from the moveable bottom and onto the unloading surface. This may include, for example, moving the item 15 along the second continuous surface formed by the moveable bottom 240 and the unloading surface 418. In some embodiments, the item may be moved along the second continuous surface as formed by these and other components of the tray 200 and/or unloading system 400.

The item may be moved in block 730 in a variety of ways. The item may slide along the second continuous surface. It may also be rolled, tossed, pitched, ejected, emitted, moved in other ways, and/or combinations thereof. The item may be moved manually, for example by a person. The item may also be moved automatically, for example by the first gripper 405 of the unloading system 400. In some embodiments, the item 15 is slid along the second continuous surface from the moveable bottom 240 and onto the unloading surface 418. The item 15 may be slid from the front end 247 and/or the center portion 255 of the moveable bottom 240 and onto the unloading surface 418. In some embodiments, the item 15 may also be slid from the top edge 223, the front edge 214, an upper surface of the track 226 and/or other features of the tray body 210. In some embodiments, the item 15 may also be slid from the moveable bottom 240 and onto other features of the unloading system 400, such as the third station 403.

Figure 8A:
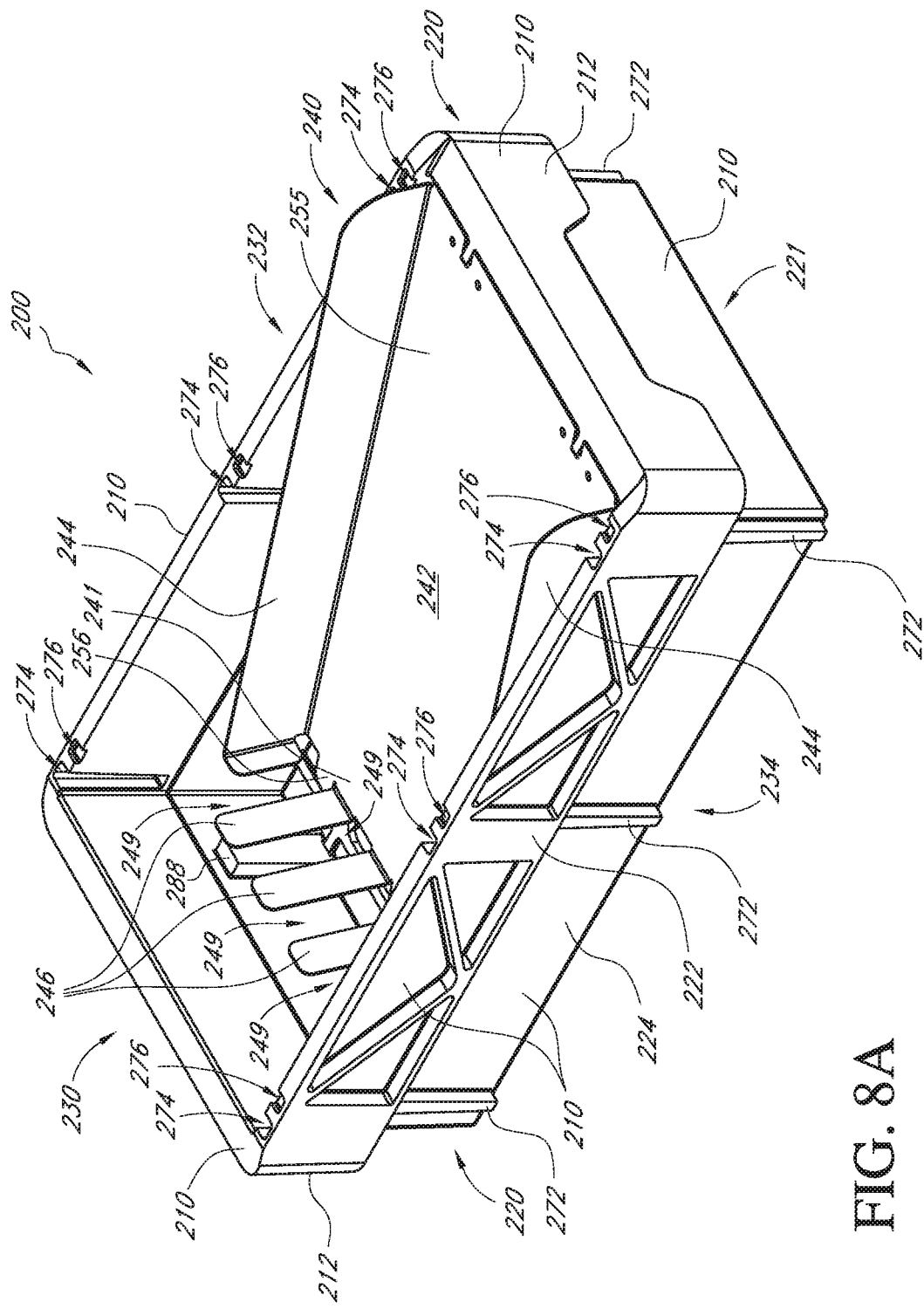
FIG. 8A is a perspective view of another embodiment of a tray, having another embodiment of a moveable bottom oriented in a first position, that may be used with the loading and unloading systems described herein.
Figure 8B:
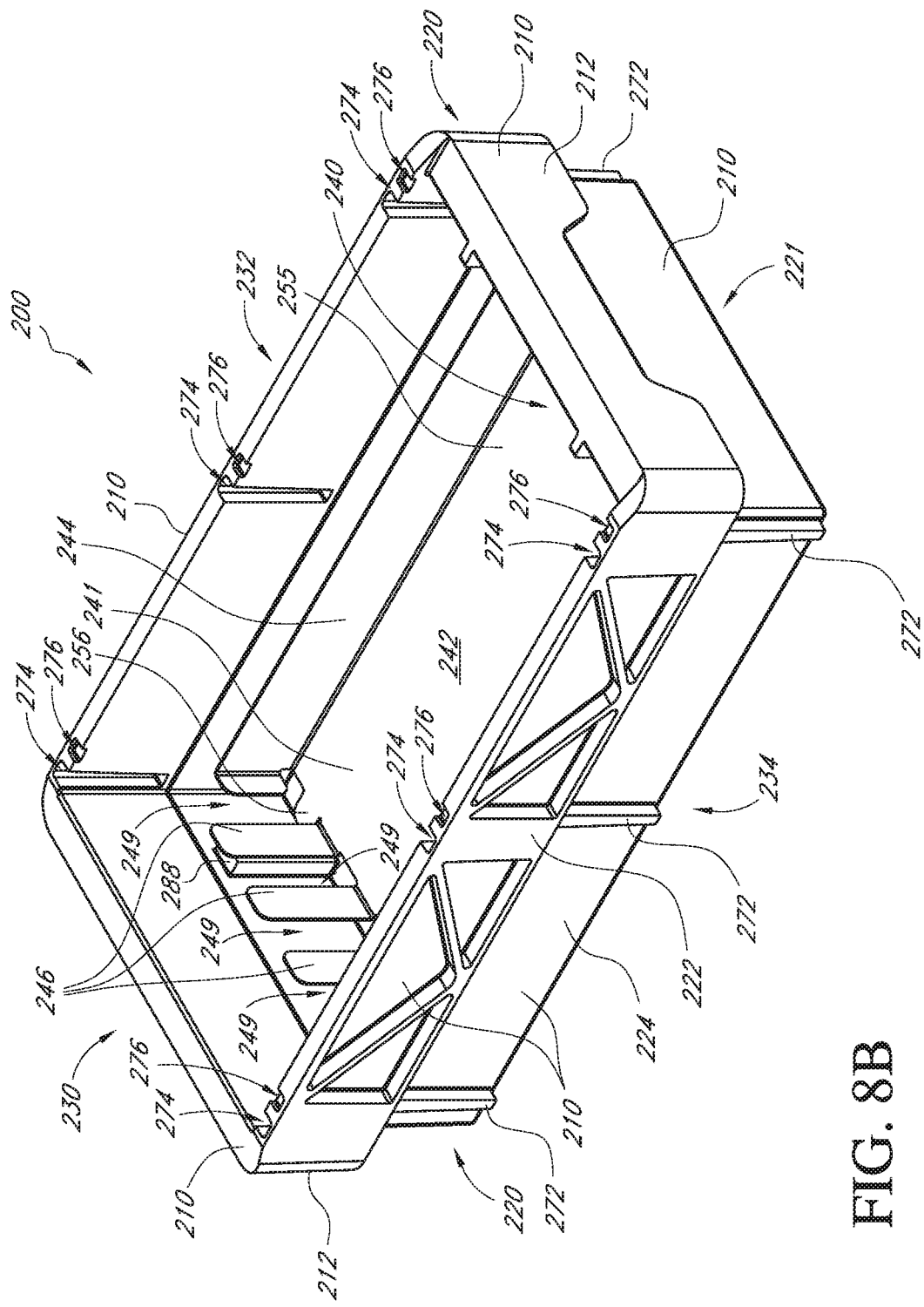
FIG. 8B is a perspective view of the tray of FIG. 8A with the moveable bottom oriented in the second position.

FIGS. 8A and 8B are perspective views of another embodiment of a tray 200, having another embodiment of a moveable bottom 240, that may be used with the stacker of FIGS. 1A-1B as well as used with the loading and unloading systems described herein. The tray 200 in FIG. 8A is shown with the moveable bottom in the first position while tray 200 is shown in FIG. 8B with the moveable bottom in the second position. The tray 200 shown in and described with respect to FIGS. 8A and 8B may have the same or similar features as other trays described herein, for example those shown in and described with respect to FIGS. 2A-2R, except where otherwise noted.

As shown in FIGS. 8A and 8B, the tray 200 may include a body 210 with a sidewall 220 having an upper portion 222 and lower portion 224. The upper portion 222 may define one or more handles 212 at a front side 221 and a back side 230 of the tray 200. The handle 212 may extend along the entire length of the front and back sides 221, 230. The handle 212 may extend from a left side 232 of the tray 200 to a right side 234 of the tray 200 along the front and back sides 221, 230. An elongated handle 212 may facilitate interaction with other machine components, for example robotic arms or track. In some embodiments, a robotic arm may be received underneath the elongated handles 212 to facilitate moving or otherwise handling the tray 200. Such handling may be performed in an automated context. Thus, a component of a robot arm or other similar feature can advantageously interact with the elongated handle 212 to lift or handle the tray. The elongated handle 212 may also assist with handling by humans, for example by providing a larger surface area for a human hand or hands to grab.

The tray body 210 may further include one or more feet 272. The feet 272 may be elongated protrusions extending laterally outward from one or more sides of the sidewall 220. The feet 272 may be elongated, rectangular protrusions extending outward from the right side 234 and from the left side 232. The feet 272 along with pockets 274 and recesses 276 may allow for, respectively, nesting and stacking multiple trays 200 on top of each other. To nest, the feet 272 of a top tray 200 may be received into the pockets 274 of a lower tray 200. The pockets 274 may thus be complementary elongated openings along the inside of the sidewall 210 as shown. To stack, the feet 272 of a top tray 200 may be received into the recesses 276 of a lower tray 200. The recesses 276 may thus be complementary shallow openings along the top edge of the sidewall 210 as shown. As described in further detail herein, the trays 200 may be rotated relative to each other about a vertical axis depending on whether nesting or stacking of trays 200 is desired.

The tray 200 may further include one or more protrusions 228. As shown, the protrusion 228 may be elongated vertically and extend up from the bottom side 260. The protrusion may be located along the inside of the bottom portion 224 of the sidewall 220. There may me be multiple protrusions 228, although only one is visible.

The tray 200 may include a moveable bottom 240. The moveable bottom 240 may have the same or similar features as other moveable bottoms described herein. As shown in FIGS. 8A and 8B, the moveable bottom 240 may include a center portion 255 having one or more side portions 244 extending along the length of the sides of the center portion 255. The moveable bottom 240 may have one or more end portions 246. The end portions 246 may be coupled to the center portion 255. The end portions 246 may be coupled to the center portion 255 at a back end 241 of the moveable bottom 240.

The end portions 246 may form a "comb-" or "finger-like" configuration. The end portions 246 may be elongated and extend upward or otherwise generally away from the back end 241 of the moveable bottom 240. The end portions 246 may be spaced such that the end portions 246 define one or more spaces 249. The spaces 249 may be between the end portions 246. The spaces 249 may also be on the ends or outsides of the outermost end portions 246. For instance, a space 249 may be defined generally between an end portion 246 and the adjacent side portion 244. In some embodiments, there may be four end portions 246 and five corresponding spaces 249. In other embodiments, there may be more or fewer than four end portions 246 and more or fewer than five corresponding spaces 249.

The end portions 246 and corresponding spaces 249 may facilitate movement of items into and out of the trays 200. In some embodiments, an item may be slid onto or off of a top surface 242 of the moveable bottom 240 in the first position shown in FIG. 8A. In some embodiments, a robotic arm may move the item as described. For example, a robotic arm may be inserted into the tray 200 in between the back side 230 and the end portions 246 of the moveable bottom 240. The arm may have a complementary "comb" or "finger" configuration that allows the arm to extend into the spaces 249 and thereby contact an item in the tray. In this manner, the arm could push the item along the moveable bottom 240 and out of the tray. To allow the arm to be inserted in between the end portions 246 and the back side 230 of the tray 200, the moveable bottom 240 may be shortened. In some embodiments, the moveable bottom 240 may have a length that is relatively shorter than the distance between the front and back sides 221, 230 of the tray body 210. Therefore, even when the moveable bottom is rotated into the first position shown in FIG. 8A, there is still a space created in between the end portions 246 and the inside of the back side 230 that will allow a robotic arm to be inserted as described and remove an item from the tray 200. The end portions 246 may also create this space by contacting the front surface 288 that is located on the inside of the back side 230 of the tray 200. As shown, one of the end portions 246 may contact the front surface 288, thus preventing the moveable bottom 240 from moving further toward the back wall 230 and thus leaving a space in between the moveable bottom 240 and the back wall 240. In some embodiments, there may be two front surfaces 288 that contact two corresponding end portions 246. There may also be more or fewer than two front surfaces 288 and corresponding end portions 246.

The moveable bottom 240 may also include one or more spacer tabs 256. In some embodiments, the moveable bottom 240 may include three spacer tabs 256 (more clearly seen in FIG. 8C). The moveable bottom 240 may include more or fewer than three space tabs 256. The spacer tabs 256 may be projections extending from the moveable bottom 240. The spacer tabs 256 may project or extend in a rearward direction from the movable bottom 240. The space tabs 256 may be coupled with the center portion 255. The spacer tabs 256 may be coupled with the back end 241. Thus, in some embodiments, there may be three space tabs 256 coupled with and projecting rearward from the back end 241 of the moveable bottom 240. The spacer tabs 256 may have the same or similar thickness as the center portion 255. The spacer tabs 256 may be generally rectangular or square and/or have rounded corners. A variety of other suitable shapes and configurations may be implemented. The spacer tabs 256 may be rigid or generally rigid. The spacer tabs 256 may be formed from the same material as other portions of the moveable tray 240, for example the center portion 255. In some embodiments, the spacer tabs 256 may be monolithic with the center portion 255. The spacer tabs 256 may thus be extensions of the center portion 255. In some embodiments, the spacer tabs 256 may be separate components that are attached to or otherwise coupled with the remainder of the moveable bottom 240, for example with fasteners, adhesive, or other suitable means. In some embodiments, the spacer tabs 256 may be formed from generally non-rigid material. The spacer tabs 256 may be flexible. The spacer tabs 256 may include multiple materials. For example, the spacer tabs 256 may include a rigid or generally rigid extension having a softer or otherwise less rigid endcap, such as a rubber fitting or component. The spacer tabs 256 may thus have a variety of shapes, configurations, materials and assemblies, and those mentioned and described are merely some examples.

The spacer tabs 256 may assist with providing a spacing behind the moveable bottom 240. As discussed, this spacing may facilitate insertion of an arm, such as a robotic arm, that sweeps or otherwise moves the item out of the tray 200. The spacing may thus be created using at least in part the spacer tabs 256. In some embodiments, the spacer tabs 256 prevent the moveable bottom 240 from moving beyond a specified location toward the back side 230 of the tray 200. In some embodiments, the spacer tabs 256 will contact the inside of the back side 230 and thus prevent the moveable bottom 240 from moving beyond a specified location toward the back side 230 of the tray 200. In some embodiments, the spacer tabs 256 may contact the back side 230 when the moveable bottom 240 is in the second position, as described herein. In some embodiments, outer edges of the spacer tabs 256 may contact the back side 230 when the moveable bottom 240 is in the second position, as described herein. In some embodiments, the spacer tabs 256 may not contact the back side 230 when the moveable bottom 240 is in the first position, as described herein.

Figure 8C:
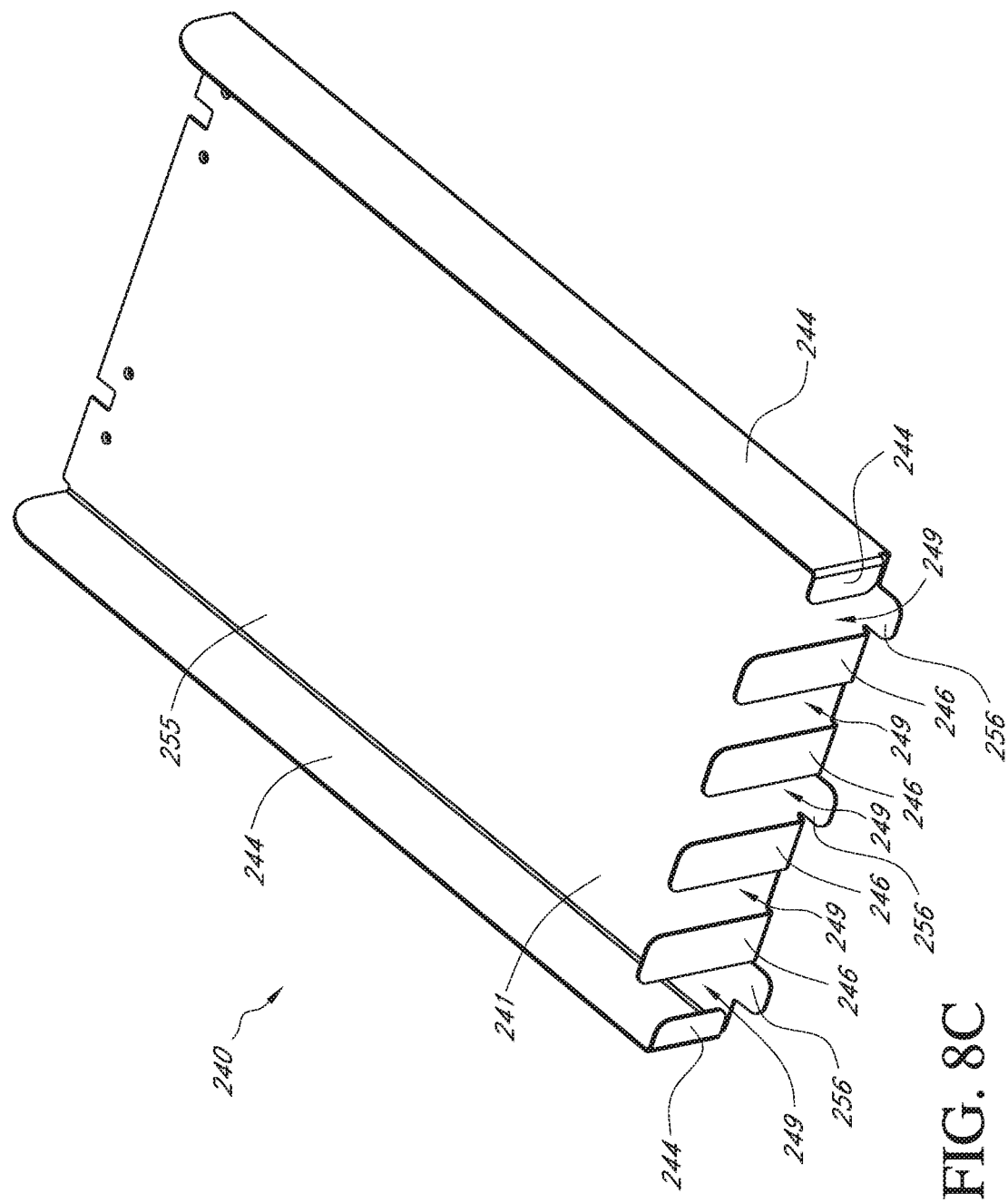
FIG. 8C is a perspective view of a moveable bottom, having a comb-like end configuration, that may be used with the various trays described herein.

FIG. 8C is a perspective view of the moveable bottom 240 from FIGS. 8A and 8B shown in isolation without the tray body 210 or other features of the tray 200. As shown, there may be two side portions 244 extending along two opposite sides of the center portion 255. The side portions 244 may extend toward the back end 241 of the tray 200 and bend or turn inward, as shown. Thus, there may be a rear section of the side portions 244 that are angled with respect to the side sections of the side portions 244. These rearward sections of the side portions 244 along with corresponding adjacent end portions 246 may define the outermost spaces 249. As further shown, there may be four end portions 246 and five corresponding spaces 249. As discussed above, an arm or tool with a complementary shape may extend through the spaces 249 to slide or otherwise move an item off of the center portion 255. As further shown, there may be three spacer tabs 256. There may be a first spacer tab 256 located between a first side portion 244 and a first corresponding adjacent end portion 246, a second spacer tab 256 located between two center end portions 246, and/or a third spacer tab 256 located between a second side portion 244 opposite the first end portion 244 and a second corresponding adjacent end portion 246.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for loading an item comprising:
    a loader comprising a plurality of bins;
    a carriage moveably disposed along a portion of the loader, the carriage comprising:
        a frame configured to support a tray, the tray having a bottom side, a moveable bottom and a sidewall comprising a front side, the moveable bottom configured to move between a first position for loading the item into the tray by sliding the item onto the moveable bottom and a second position for transporting the item within the tray;
        a loading shelf connected to the frame, wherein the loading shelf is positioned to span a distance between one of the plurality of bins and the tray positioned on the carriage; and
    wherein the moveable bottom of the tray forms a surface with the loading shelf such that the item can slide along the loading shelf and onto the moveable bottom.

2. The system of claim 1, wherein the bottom side defines a window that provides access to a bottom surface of the moveable bottom, and wherein the moveable bottom is configured to move between the first and second positions by lowering and raising the tray over an arm coupled with the carriage such that the arm contacts the moveable bottom through the window.

3. The system of claim 1, wherein the loader further comprises an elongated rail along an edge of the loading shelf with which the front side of the tray is configured to couple when the carriage is adjacent to the loader, wherein the carriage with the tray mounted thereto is configured to move along the elongated rail.

4. The system of claim 3, wherein the loader further comprises an edge support having a plurality of notches configured to couple with at least one of the carriage and the tray and thereby prevent the carriage from moving along the elongated rail.

5. The system of claim 1, wherein the loading shelf and tray are configured to move among the plurality of bins by moving the carriage along a length of the loading shelf.

6. The system of claim 1, wherein the loader further comprises an elongated rail with which the front side of the tray couples when the carriage is adjacent to the loader, wherein the tray is configured to move among the plurality of bins by moving the carriage with the tray mounted thereto along the elongated rail.

7. The system of claim 1, wherein the loader further comprises an edge support having a plurality of notches configured to couple with the frame and prevent the tray and the carriage from moving along the rail.

* * * * *